(12) United States Patent
Gross

(10) Patent No.: US 9,536,148 B2
(45) Date of Patent: Jan. 3, 2017

(54) PROPERTY ASSESSMENT AND PROSPECTING TOOL

(71) Applicant: John Nicholas Gross, Berkeley, CA (US)

(72) Inventor: John Nicholas Gross, Berkeley, CA (US)

(73) Assignee: Real Data Guru, Inc., Palo Alto, CA (US)

( * ) Notice: Subject to any disclaimer, the term of this patent is extended or adjusted under 35 U.S.C. 154(b) by 0 days.

(21) Appl. No.: 14/499,061

(22) Filed: Sep. 26, 2014

(65) Prior Publication Data

US 2015/0213315 A1 Jul. 30, 2015

Related U.S. Application Data

(60) Provisional application No. 61/990,429, filed on May 8, 2014, provisional application No. 61/883,609, filed on Sep. 27, 2013.

(51) Int. Cl.
| | |
|---|---|
| *G06K 9/00* | (2006.01) |
| *G06Q 30/02* | (2012.01) |
| *G06Q 50/16* | (2012.01) |
| *G06F 17/30* | (2006.01) |
| *G06T 1/00* | (2006.01) |
| *G06T 5/50* | (2006.01) |
| *G06T 7/00* | (2006.01) |
| *G06Q 30/06* | (2012.01) |

(52) U.S. Cl.
CPC ..... *G06K 9/00637* (2013.01); *G06F 17/30256* (2013.01); *G06Q 30/0261* (2013.01); *G06Q 30/0276* (2013.01); *G06Q 30/0643* (2013.01); *G06Q 50/16* (2013.01); *G06T 1/0007* (2013.01); *G06T 5/50* (2013.01); *G06T 7/0004* (2013.01); *G06T 7/0008* (2013.01); *G06K 2209/21* (2013.01); *G06T 2207/10004* (2013.01); *G06T 2207/30132* (2013.01); *G06T 2207/30161* (2013.01); *G06T 2207/30184* (2013.01)

(58) Field of Classification Search
None
See application file for complete search history.

(56) References Cited

U.S. PATENT DOCUMENTS

| | | | | |
|---|---|---|---|---|
| 4,550,376 | A | | 10/1985 | Maciejczak |
| 5,680,305 | A | * | 10/1997 | Apgar, IV ................... 705/7.28 |
| 5,742,335 | A | | 4/1998 | Cannon |
| 5,794,216 | A | | 8/1998 | Brown |
| 5,842,148 | A | | 11/1998 | Prendergast et al. |

(Continued)

OTHER PUBLICATIONS

Al-Khudhairy et al., "Structural Damage Assessments from Ikonos Data Using Change Detection, Object-Oriented Segmentation, and Classification Techniques", Photogrammetric Engineering & Remote Sensing, vol. 71, No. 7, pp. 825-837, Jul. 2005.

(Continued)

*Primary Examiner* — Aaron W Carter
(74) *Attorney, Agent, or Firm* — PatentBest; Andrew McAleavey

(57) ABSTRACT

A property assessment system includes image processing logic configured to identify building structure attributes from image data and rate their associated condition. The outputs can include property condition ratings, occupancy predictions and similar scores.

23 Claims, 35 Drawing Sheets

(56) References Cited

U.S. PATENT DOCUMENTS

| | | |
|---|---|---|
| 6,904,160 B2 | 6/2005 | Burgess |
| 7,389,181 B2 | 6/2008 | Meadow et al. |
| 7,584,167 B1 | 9/2009 | Bell |
| 7,970,674 B2 | 6/2011 | Cheng et al. |
| 8,046,306 B2 | 10/2011 | Stinson |
| 8,078,436 B2 | 12/2011 | Pershing et al. |
| 8,150,617 B2 | 4/2012 | Manber et al. |
| 8,234,174 B1 | 7/2012 | Eagon et al. |
| 8,289,160 B1 | 10/2012 | Billman |
| 8,497,905 B2 | 7/2013 | Nixon |
| 8,676,680 B2 | 3/2014 | Humphries et al. |
| 8,818,572 B1* | 8/2014 | Tofte et al. .................. 701/2 |
| 8,873,842 B2 | 10/2014 | Robinson et al. |
| 9,098,870 B2 | 8/2015 | Meadow et al. |
| 9,104,782 B2 | 8/2015 | Visioli et al. |
| 2002/0035520 A1 | 3/2002 | Weiss |
| 2003/0101074 A1* | 5/2003 | Suzuki et al. ................ 705/1 |
| 2003/0171957 A1 | 9/2003 | Watrous |
| 2004/0148204 A1 | 7/2004 | Menendez |
| 2004/0162710 A1 | 8/2004 | Schwartz |
| 2004/0254803 A1* | 12/2004 | Myr .............................. 705/1 |
| 2005/0038682 A1 | 2/2005 | Gandee et al. |
| 2005/0154657 A1 | 7/2005 | Kim et al. |
| 2005/0263658 A1 | 12/2005 | Fontana et al. |
| 2006/0091310 A1 | 5/2006 | Furry |
| 2006/0106551 A1 | 5/2006 | Morin et al. |
| 2007/0043770 A1 | 2/2007 | Goodrich et al. |
| 2007/0067180 A1 | 3/2007 | James et al. |
| 2008/0065427 A1 | 3/2008 | Helitzer et al. |
| 2008/0159616 A1* | 7/2008 | Fellinger .................. 382/141 |
| 2009/0006185 A1* | 1/2009 | Stinson ........................ 705/10 |
| 2009/0204443 A1* | 8/2009 | Tucker ................. E04D 11/02 705/4 |
| 2009/0265193 A1 | 10/2009 | Collins et al. |
| 2010/0076881 A1* | 3/2010 | O'Grady et al. ............. 705/35 |
| 2011/0137685 A1 | 6/2011 | Tracy et al. |
| 2012/0284202 A1 | 11/2012 | Dalby |
| 2013/0051661 A1 | 2/2013 | Robinson et al. |
| 2013/0051672 A1 | 2/2013 | Robinson et al. |
| 2013/0298083 A1 | 11/2013 | Bertoldo et al. |
| 2013/0346020 A1* | 12/2013 | Pershing .............. G06Q 10/06 702/156 |
| 2014/0019302 A1 | 1/2014 | Meadow et al. |
| 2014/0040282 A1 | 2/2014 | Mann et al. |
| 2014/0067497 A1* | 3/2014 | Butler .................. G06Q 30/02 705/14.5 |
| 2014/0164260 A1* | 6/2014 | Spieckerman ..... G06Q 30/0278 705/306 |
| 2014/0270492 A1* | 9/2014 | Christopulos et al. ....... 382/159 |
| 2014/0278060 A1* | 9/2014 | Kordari ................ G01C 21/206 701/422 |
| 2015/0051982 A1 | 2/2015 | Latimer |
| 2015/0074018 A1* | 3/2015 | Gill ...................... G06Q 50/16 705/36 T |
| 2015/0110385 A1* | 4/2015 | Schmidt et al. ............. 382/154 |
| 2015/0148060 A1* | 5/2015 | Parab .................... H04W 4/021 455/456.1 |
| 2015/0186953 A1* | 7/2015 | Gross ........................... 382/100 |
| 2015/0213315 A1 | 7/2015 | Gross |
| 2015/0294360 A1 | 10/2015 | Bayliss-McCulloch et al. |
| 2016/0027051 A1* | 1/2016 | Gross ................. G06Q 30/0256 705/14.54 |
| 2016/0048934 A1* | 2/2016 | Gross ................. G06K 9/00637 705/313 |
| 2016/0092959 A1* | 3/2016 | Gross ..................... G06T 7/0008 705/26.62 |

OTHER PUBLICATIONS

Balaguer et al., Autonomous Robotics, vol. 18, pp. 157-169, 2005, "A Climbing Autonomous Robot for Inspection Applicationsin 3D Complex Environments".

Draganfly, "Draganfly V Ti Self-Leveling" Advertisement 2005.

Draganfly, "New Mini RC Helicopter and Video Camera Cuts Aerial Video Costs Using Infrared Self Leveling Technology" Nov. 9, 2006.

Elbehiery et al. Surface Defects Detection for Ceramic Tiles Using Image Processing and Morphological Techniques, World Academy of Science, Engineering and Technology, vol. 5, 2007.

Flanagan et al., Citizen Archivists at Play: Game Design for Gathering Metadata forCultural Heritage Institutions, Tiltfactor.org, Tiltfactor Laboratory, Dartmouth College 2013.

Hartsell, D.R., "Putting the Maverick Fuel-Tank Inspection Robot to the Test" IEEE Robotics and Automation Magazine Jun. 17, 1999.

Higgens & Welch Appraisers, LLC, "Using a "DriveBy" Camera, Thousands of Street Level Parcels Are Being Imaged Daily", www.welchgroup.net, Higgens & Welch Appraisers, LLC, Sep. 2008.

Jafri et al., "A Survey of Face Recognition Techniques", Journal of Information Processing Systems, vol. 5, No. 2, Jun. 2009.

Lever et al., "Benefits of Using Remotely Operated Vehicles to Inspect USACE Navigation Structures" US Army Corps of Engineers Mar. 2007.

Lin et al., "Salt-Pepper Impulse Noise Detection and Removal Using Multiple Thresholds for Image Restoration", Journal of Information Science and Engineering, vol. 22, pp. 189-198, 2006.

Lukac et al., "Vector sigma filters for noise detection and removal in color images", Journal of Visual Communication in Medicine, Image R. 17, pp. 1-26, 2006.

McBride, Dave "Underwater Inspection Using ROV" Mar. 24, 2008.

McMahon et al., "Design of a Roof Inspection Robot—Major Qualifying Project Report", Worcester Polytechnic Institute—Applicant's invention not previously disclosed, Apr. 26, 2007.

Pasupathy et al., "Wireless Electronic Structural Surveillance Sensors Using Inductively Coupled Sacrificial Transducers", Progress in Electromagnetics Research Symposium Abstracts, Marrakesh, Morocco, Mar. 20-23, 2011; Session 2P4bSensor-based Structural Damage Detection: Concrete Applications, p. 514.

Paterson et al., "Building inspection: can computer vision help?" Construction Robotics Unit, The City University London, Automation in Construction vol. 7, pp. 13-20, 1997.

Winkler et al., "Visibility of Noise in Natural Images", Proc. IS&T/SPIE Electronic Imaging: Human Vision and Electronic Imaging IX, vol. 5292, p. 121, 2004.

\* cited by examiner

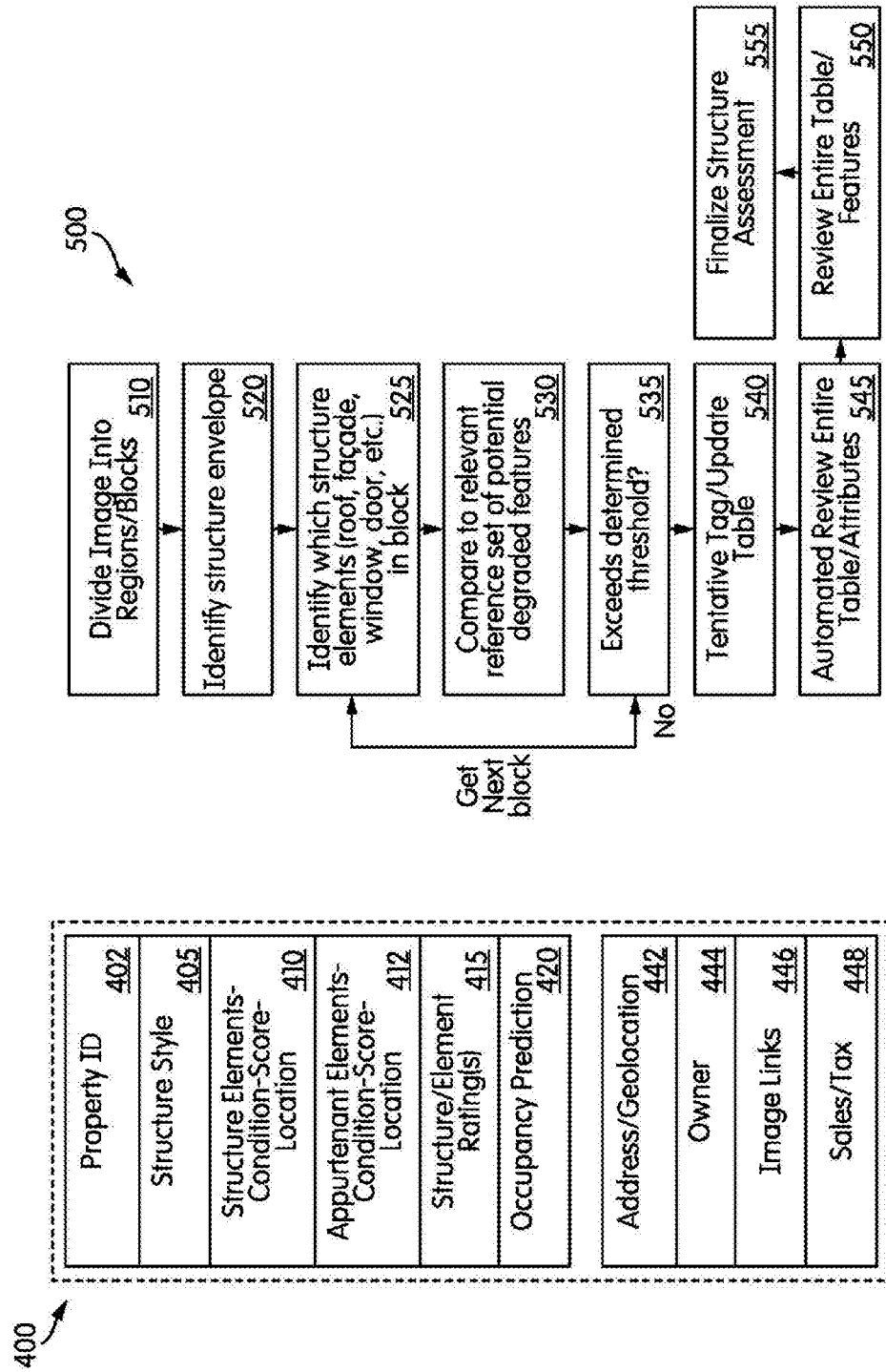

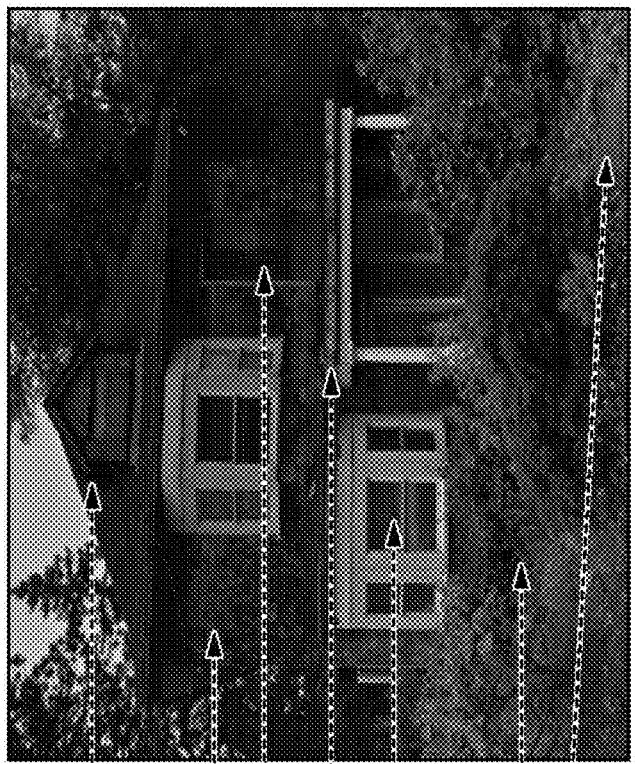

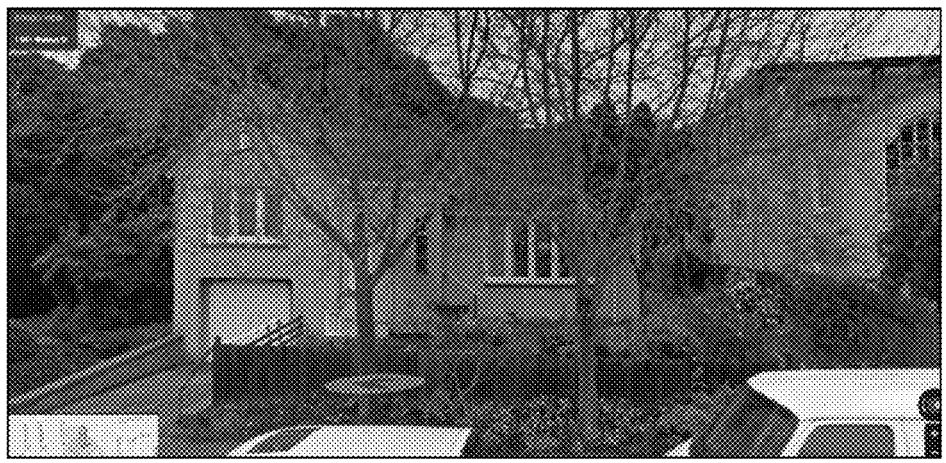
Structure Classifier
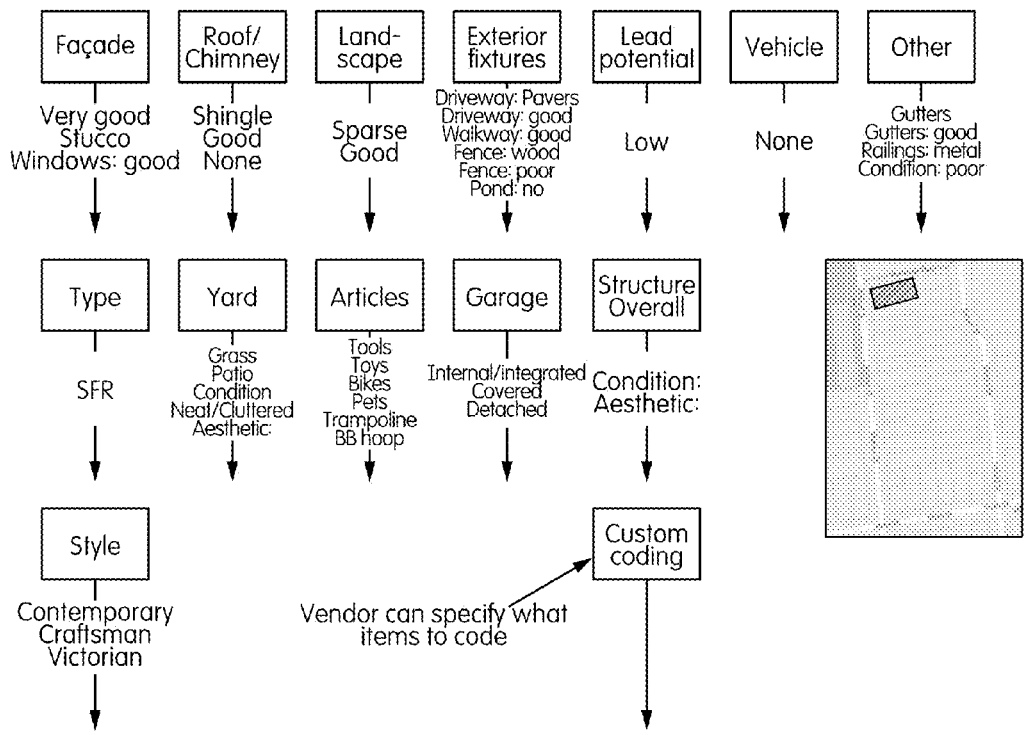
FIG. 11

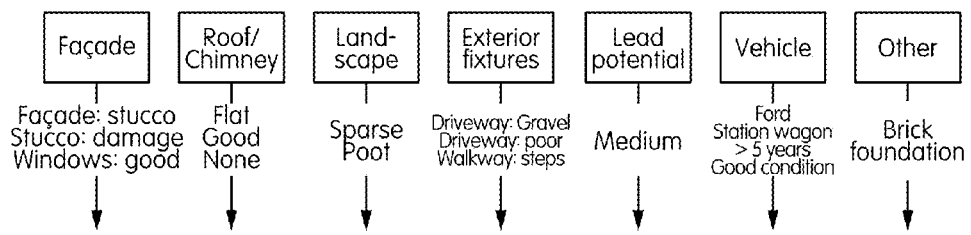
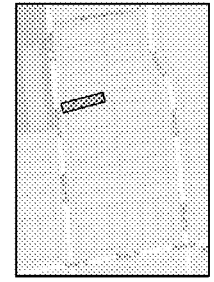
FIG. 12

Structures in block 456 matching conditions: shingle façade below average condition

| Lead # | House Type | House Style | House Size | Lot Size | Façade | Condition | Image | Target? |
|---|---|---|---|---|---|---|---|---|
| 1 | SFR | Craftsman | 1500 sq ft | 8000 sq ft | shingle | poor | see | yes |
| 2 | SFR | Colonial | 3000 sq ft | 14000 sq ft | shingle | poor | see | yes |

Start with a new model kitchen?
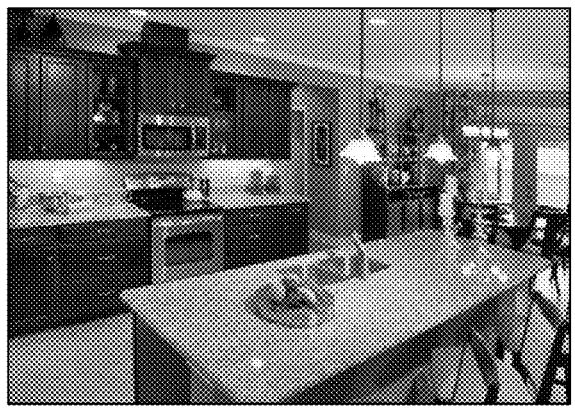
Or Start with your existing kitchen:
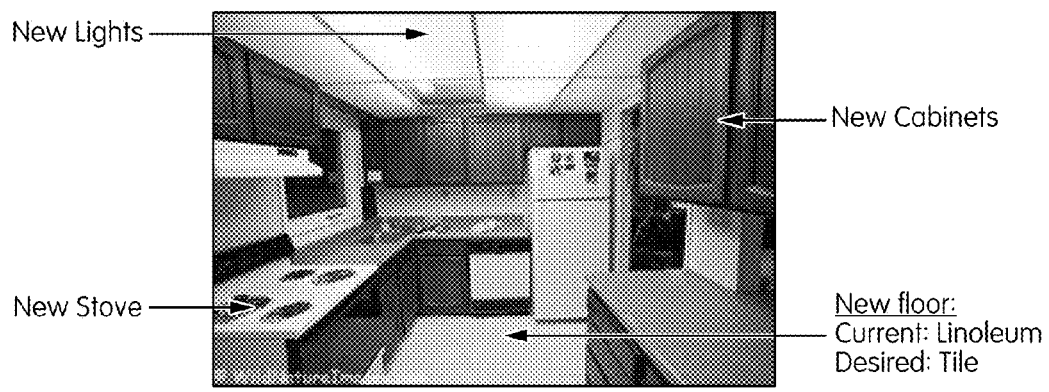
Identify the things you want changed
FIG. 20B

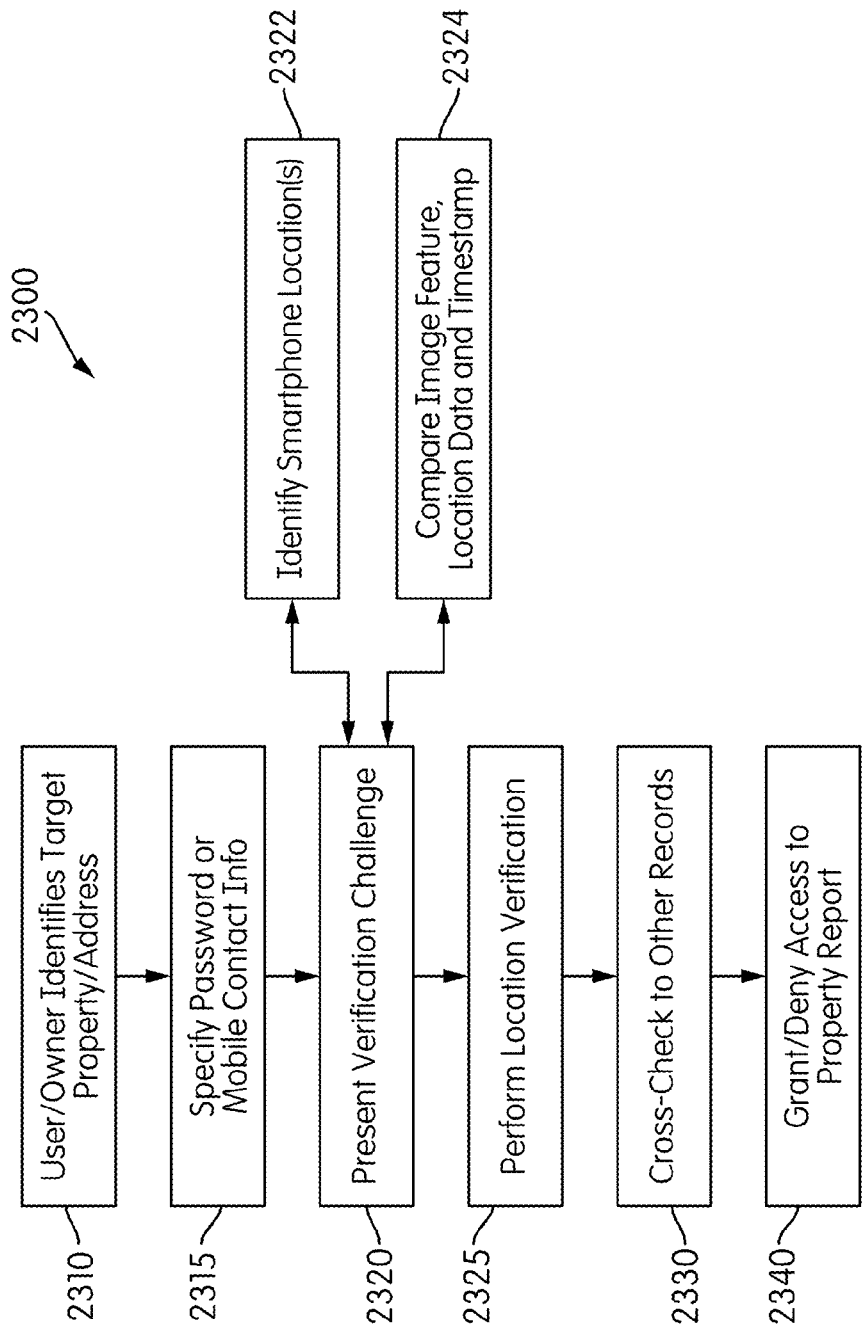

PROPERTY ASSESSMENT AND PROSPECTING TOOL

RELATED APPLICATION DATA

The present application claims the benefit under 35 U.S.C. 119(e) of the priority date of Provisional Application Ser. No. 61/990,429 filed May 8, 2014 and 61/883,609 filed Sep. 27, 2013 both of which are hereby incorporated by reference herein; the instant application is further related to Ser. No. 14/499,057 also filed this instant date and which is also incorporated by reference herein.

FIELD OF THE INVENTION

The present invention relates to automated tools, methods and systems which assess the condition of living structures and other appurtenant real property features. The invention has particular utility in the areas of real estate prospecting, appraisals, insurance, targeted marketing, and similar domains.

BACKGROUND

Competition for housing stock is rapidly increasing in the United States. In some areas turnover of housing is extremely small and cannot satisfy demand. The problem is exacerbated as people live longer and stay in their residences for longer periods than in the past. Young families have significant difficulties finding suitable existing homes for rent or purchase in many desirable areas.

Current and useful information about housing stock is often both incomplete and inaccurate. While some details can be found at governmental websites (tax authorities, planning departments) and at sites such as Zillow, Trulia, Redin, etc., there is no easy mechanism by which a prospective renter or purchaser can search and locate properties that—while not in perfect condition—may be good leads. For example many homes are dilapidated or in poor condition as a result of owners being unable to maintain such properties (or attendant grounds) because of age, poor health, etc. In some instances the structure is not even inhabited. These homes would be excellent leads for housing opportunities but currently go undiscovered and thus unexploited due to inadequate research and assessment tools.

In a similar vein other interested parties would benefit from more detailed knowledge on the types and conditions of housing stock in their areas. For example public agencies should be kept aware of the health and welfare of citizens who may be too elderly to travel on their own, or respond to phone calls. Construction and home building supply, insurance and other providers are also similarly unable to quickly and accurately assess the health of housing stock with current tools.

While some tools have been used in the past to assess buildings, these have been limited and do not address the problems above. For example, generic image databases of real estate properties are shown in U.S. Pat. No. 5,794,216. U.S. Pat. No. 8,078,436 to Pershing et al., and US Publication No. 2003/0171957 to Watrous (both incorporated by reference herein) are all directed to simple overhead, top down aerial inspections of the roofs of structures. Such system typically rely on satellite or other image databases. Billman (U.S. Pat. No. 8,289,160) requires a number of sensors in a house from which he records data such as temperature, water pressure, humidity, etc. to assess a future risk of damage or destruction of the structure. Schwartz (US Publication No. 2004/0162710) requires a manual inspection form for rating a risk of mold. Similarly, Pendergast et al. (5,842,148) incorporates a manual inspection form that is used to assess a risk of damage to a house as a result of physical disturbance such as wind, earthquakes, etc.

U.S. Pat. No. 5,742,335 issued in 1998 to Cannon (incorporated by reference herein) teaches the use of a camera system for surveying a property. The setup is quite complicated, however, and requires extensive manpower to implement. Maciejczak (U.S. Pat. No. 4,550,376 incorporated by reference) similarly uses a complex unmanned apparatus for capturing condition information for a structure. However, in both references little or no automated processing is done of the captured structure information. Cannon for example teaches only that recordings capture over time can be manually examined to detect weathering changes. Despite these older teaching, the state of the art has not improved beyond what is shown therein.

In addition there is a considerable market in the US for home improvement goods and services, such as for example, windows, landscaping, siding, paint, roofing, plumbing and similar products to name a few. Companies in this space have traditionally used generic flyers for marketing purposes, as they have little or no specific structural information for a specific property. Current hard copy advertising materials therefore are represented by the examples shown in FIG. 9. Furthermore, to date such types of entities have not targeted groups of homes in a neighborhood by identifying common issues with structures that could induce or at least incentivize group purchasing behavior.

SUMMARY OF THE INVENTION

An object of the present invention, therefore, is to reduce and/or overcome the aforementioned limitations of the prior art.

DESCRIPTION OF THE DRAWINGS

FIG. 4 illustrates an exemplary structure/format used for collecting and storing parameters associated with real estate leads in accordance with the present teachings;

FIG. 5 illustrates an exemplary method used for processing real estate image information to identify and log key features in accordance with the present teachings;

FIGS. 7A-7E illustrate examples of image processing, feature processing and reporting for a typical building structure that can be performed in accordance with the teachings of the present disclosure;

FIG. 11 identifies examples of structural features, parameters, conditions, etc. that can be identified, assessed, tagged, coded and stored for a particular building structure in a city block in accordance with embodiments of the present teachings;

FIG. 12 identifies further examples of structural features, parameters, conditions, etc. that can be identified, assessed, tagged, coded and stored for another structure in a city block in accordance with embodiments of the present teachings;

FIG. 17B illustrates a typical structure coding as it would be performed in accordance with embodiments of the present invention including as shown in;

FIG. 18B depicts an exemplary embodiment of a query result list for a vendor can be implemented in accordance with the present teachings to facilitate identifying relevant properties matching a particular target structural profile;

FIG. 20B depicts an exemplary graphical interface that may be presented to a user seeking to make home improvements;

FIG. 23 shows a preferred embodiment of a property/structure owner verification process that can be implemented in accordance with the present teachings;

DETAILED DESCRIPTION

Figure 1:
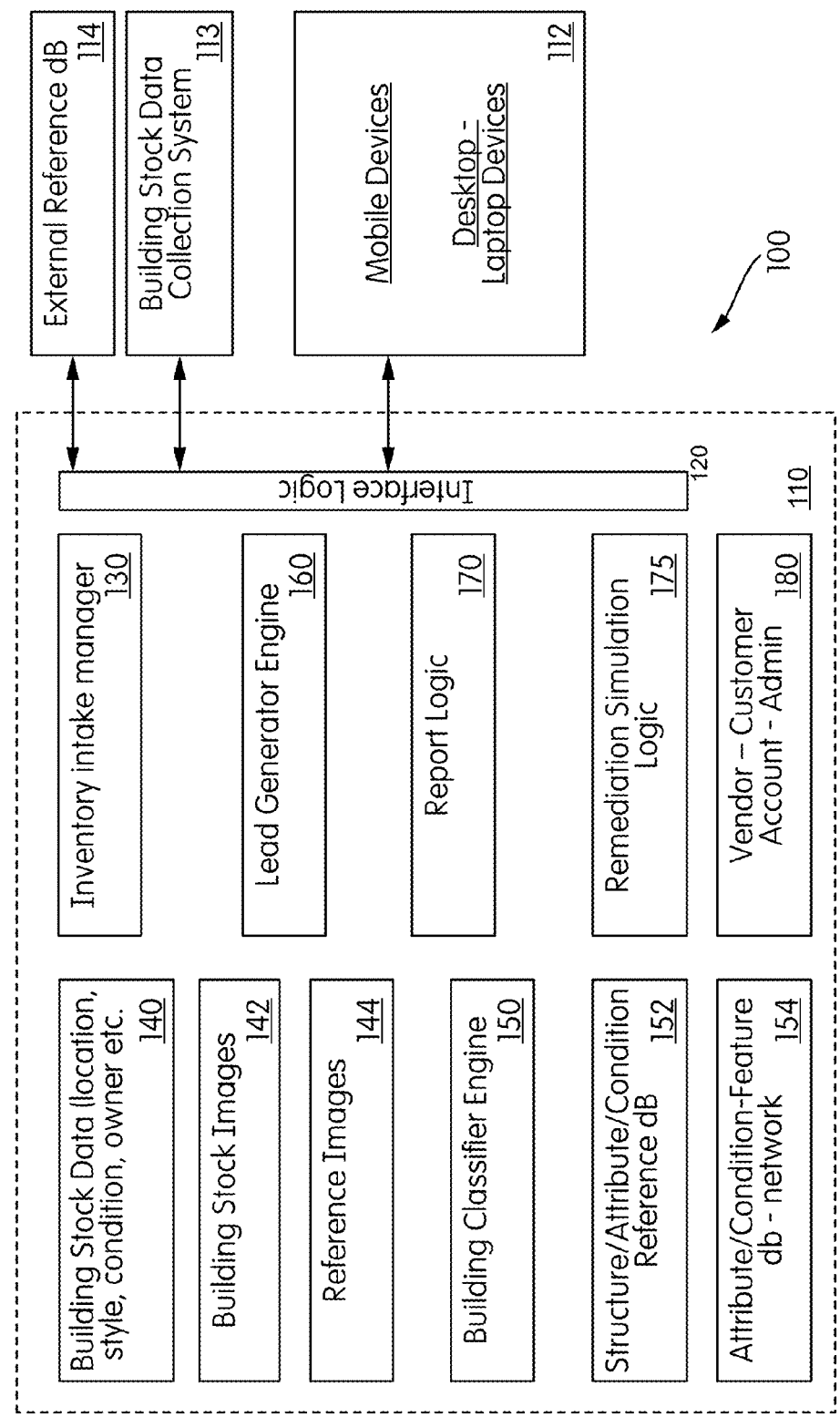
FIG. 1 is an illustration of components of an embodiment of a real estate assessment system of the present invention.

A preferred embodiment of a system 100 for identifying, assessing, rating and reporting on real estate properties, building structures, etc. is depicted in FIG. 1. While the preferred embodiments are presented in the context of single family residential housing structures, it will be understood that the invention has applicability to other types of building structures, such as commercial structures, or any other structure for which there is sufficient visual/machine perceptible information to perform the processes described herein. Since SFR have a high degree of variability— architecturally, aesthetically, etc.—their wear, aging and weathering characteristics are also variable and thus allow for significant differentiation statistically. The terms "property" or "real estate" used herein are intended broadly to denote the entirety of a property opportunity present at a particular site, including any building structures, fencing, walls, landscaping, foliage, trees, public sidewalk features, vehicles, appurtenant structures, etc., the owners/inhabitants, and neighborhood related factors as well such as crime rates, schools, access/convenience to shopping, demographics, economics, and other factors known in the art.

As seen herein, a property assessment server computing system 110 is preferably an online collection of computing machines and accompanying software modules suitable and configured particularly for performing the operations described below. The preferred system 100 interacts through interface logic 120 with outside data sources including a building stock data collection system 113 and an external reference database 114. Building Stock Data Collection system 113 can be any known provider of information (such as for example Google through Google Maps image data) about the properties being assessed, and may be accessed through an API in appropriate instances. At a minimum such entities provide real estate information (images, videos, etc.) sufficient to identify a property at a particular location and perform an assessment such as described below. In other instances the external databases 114 may contain further information concerning the property, such as owner/inhabitant identifications, gps coordinates, liens, taxes, deed recordings, sales transactions, valuations, trends, and other similar types of data maintained at governmental systems and/or conventional real estate sites such as Zillow, Trulia, Redfin, etc. Other types and sources data such as described in the art above can of course be utilized and the invention is not limited in this respect. It will be further understood that while FIG. 1 shows that this data is obtained from third parties, it can of course be collected and retained internally if desired.

System 110 engages with users employing computing devices 112 through interface logic 120 as well. These computing devices 112 may range and include smartphones, PDAs, notebooks, tablets, laptops, desktops, etc. In a preferred embodiment system 110 is part of a website which can be accessed through a conventional browser running on such devices, or alternatively through an app on Android or IOS device.

System 110 includes a number of specialized software modules and storage modules which implement the processes described below, including an Inventory Intake Manager 130, a Building Stock Data Manager 140, a database of Structure Images 142, a Building Classifier Engine 150, a Structure/Feature Reference database 152, a Lead Generator Engine 160, Report Logic 170, and Vendor/Customer Account Admin module 180. Some of the main functions of these modules is as follows:

Inventory Intake Manager 130—preferably includes logic to programmably and periodically locate and catalog new/updated building stock images, new updated property records, etc.

Building Stock Data Manager 140—preferably includes data on each property, including location, style, condition, owners, etc. as gleaned from external systems 113, 114 and as derived from internal classifications/assessments performed internally;

Structure Images 142—preferably includes raw and/or annotated image data of at least outside portions of the structures for the properties in question;

Reference Images 144—preferably includes exemplar-reference image data for a reference set of building attributes/elements and associated conditions, and that is used by a classification engine described below;

Building Classifier Engine 150—preferably processes and evaluates property data, including image data, to identify/assess structures;

Structure/Attribute/Condition Reference database 152—preferably contains reference list of structure types, attribute types, associated economic/physical impairments, scores, etc. to be discovered in target structures;

Attribute/Condition—Feature databases/network 154—preferably contains computed models, templates or patterns developed by a classifier to identify correlations between specific structure attributes, conditions, and image features which can be used to identify specific attribute/condition associated with a particular structure;

Lead Generator Engine 160—preferably interacts with customers and back end systems to identify properties of interest based on selected query parameter criteria;

Report Logic 170—preferably cooperates with lead engine to provide actual report organized and or composed in part under control of a user, a vendor, etc.

Remediation Simulation Logic 175—uses specialized image filtering and other image processing to remediate or simulate visual improvements to building elements in a target structure for the benefit of users;

Vendor/Customer Account Admin module 180: preferably coordinates and manages vendor and customer accounts, including billing, alerts, etc. The functions and features of each is discussed in more detail where appropriate below.

It will be understood that system 110 will likely have other components, modules, etc., and so as to better highlight the key features of the present invention only those aspects most germane to such are presented. Moreover the software modules described (referenced usually in the form of a functional engine) can be implemented from the present teachings using any one of many known programming languages suitable for creating applications that can run on client systems, and large scale computing systems, including servers connected to a network (such as the Internet). Such applications can be embodied in tangible, machine readable form for causing a computing system to execute appropriate operations in accordance with the present teachings. The details of the specific implementation of the present invention will vary depending on the programming language(s) used to embody the above principles, and are not essential to an understanding of the present invention. To the extent it is considered relevant to the present invention, the Applicant specifically disclaims any coverage that may encompass so-called "transitory" subject matter deemed unpatentable under 35 USC 101, including for example any coverage to transitory media or bare transitory propagating signals and the like, or to any pure "abstract" ideas.

Figure 2:
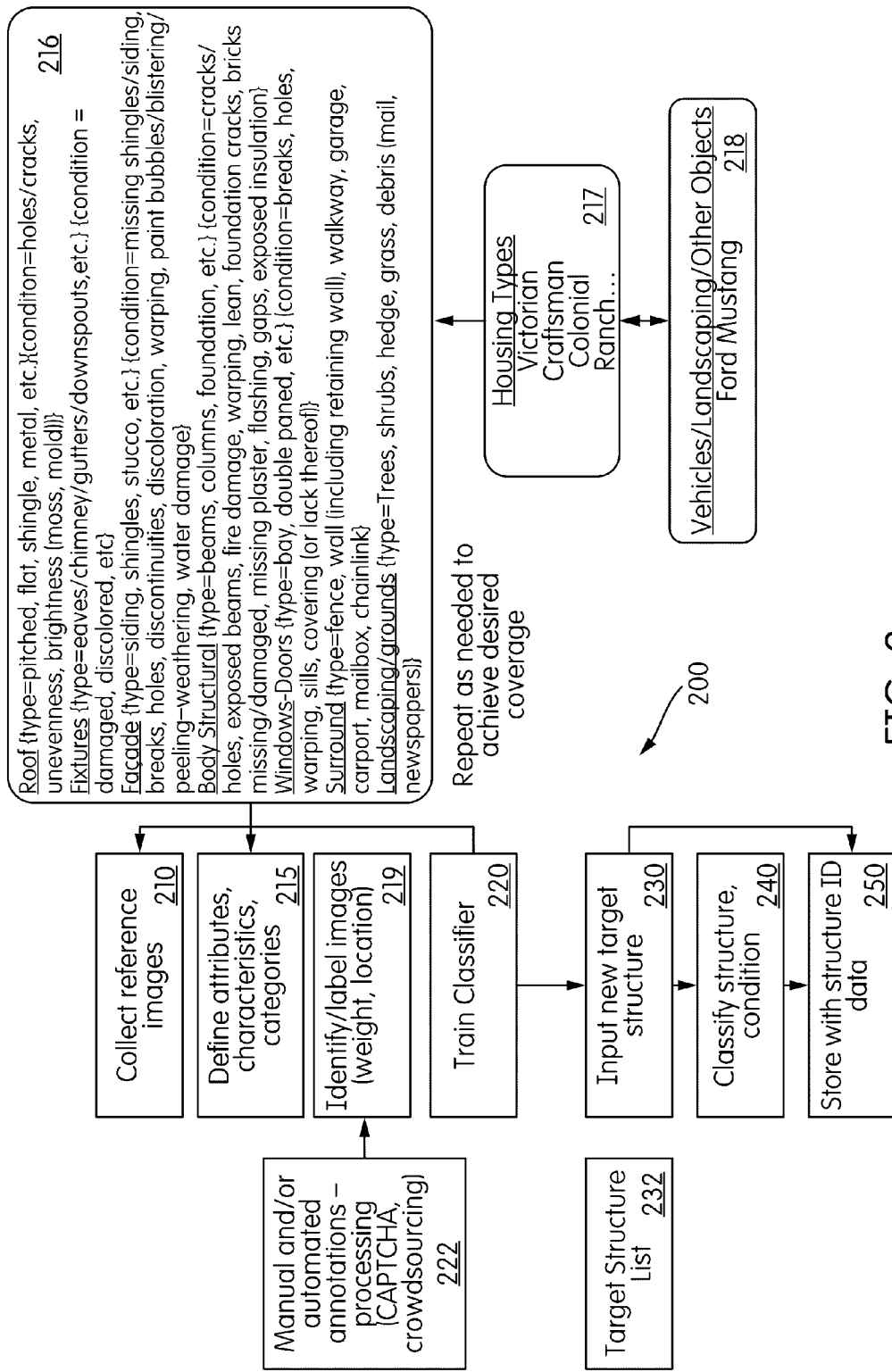
FIG. 2 illustrates an exemplary method used for identifying and assessing real estate in accordance with the present teachings.

FIG. 2 illustrates the main processes 200 used in preferred embodiments of the disclosure, including broadly the two tasks of 1) training the Classifier Engine 150 (FIG. 1) and 2) using it to assess and rate different new properties. A list of basic building elements that can be identified and logged can be found at nyc.gov/html/lpc/html/glossary/glossary.shtml. Other online sources can be consulted of course for a catalog of identified building elements. In the most straightforward case examples of each basic building attribute is captured, such as façade, eaves, windows, balcony, porch, arch, piers, columns, lattices, false timbering, ornamental, etc. along with specific types (i.e., façade (shingle, siding, brick, stone, horizontal boards, vertical boards, etc.) roof {pitched, double pitched, hipped, flat, metal, tile, shingle, slate, parapet, dormer, mansard, fascia, brackets, eaves, pent, pediment, etc.} and so on).

At step 210 a set of reference images for database 144 are collected. The reference images can be captured by human assistants, and/or obtained from a reference image database (s) such as Google Maps (not shown) etc. Preferably a reference set is established which includes sufficient exemplars representing different building elements to be classified. The reference images are also preferably tagged by human annotators to identify each building attribute, an associated condition, a location in the image, etc. Building Stock database 140 should include complete data on each entry in the property database which identifies any and all reference building elements or attributes associated with a particular structure, as well as other data noted above.

Image database 142 preferably includes a current image of the structure in question which is in a form that can be analyzed for building elements. The images can also include annotations (see below) identifying structure elements, defects, severity ratings, locations of identified defects, etc. as annotated automatically by a classifier and/or manually by a human operator.

In addition it is desirable to include image exemplars of the building elements or attributes in various physical conditions or impairment, which form part of reference image set in database 144. The conditions/impairments are each associated with a particular building attribute. Each is also separately identified and classified to make them amenable to query. Thus at step 215 one or more examples of the following structure attributes or elements and related conditions pairs 216 are defined:

Roof {new, missing/damage tile, shingle, metal, holes/cracks, unevenness, brightness (moss, mold))

Fixtures {new, damaged eaves/chimney/gutters/downspouts, leaves in gutters}

Façade {new, missing shingles/siding, breaks, holes, discontinuities, discoloration, warping, paint bubbles/blistering/peeling—aging, weathering, water damage}

Body Structural {new, cracks/holes, exposed beams, fire damage, warping, lean, foundation cracks, bricks missing/damaged, missing plaster, damaged flashing, gaps, exposed insulation}

Windows/Skylights/Doors {new, breaks, holes, warping, sills, covering (or lack thereof)}

Support {leaning/damaged columns, retaining walls}

Surround {new, fence, wall (including retaining wall), walkway (condition, overgrowth), garage, carport, mailbox, chainlink}

Landscaping/grounds {Trees, shrubs, hedge, grass, debris (mail, newspapers)}

Secondary objects {tools, toys}

It will be understood that this is a just a partial list, and that a number of other individual structure attribute/condition pairings can be identified as well, and/or that the attributes and conditions can be logically associated in different ways. To build out database 144 therefore a graphical image (photograph or electronic rendering) of a structure (e.g., a house) with a roof (feature) having missing tiles (condition) is preferably collected and included in the reference image set. Examples of structures with new and broken windows are collected, and so on. In some instances it may be desirable to also include and assign severity weightings (i.e., a scaling factor of any convenient range (1-10, or the like) for the identified condition) as well as damage location data (i.e., an indication in a coordinate grid of where the condition exists for the element on the structure). Consequently each individual reference record of a particular structure attribute may contain a different condition, severity, location, etc. It will be understood of course that a single reference image may have more than one attribute that can be tagged. As noted earlier, in most instances it will be preferable for a human to create the tags for the reference images, including an identification of each building attribute, a condition, and a location thereof.

While the above presents a number of examples, it will be understood that this is not the entirety of attributes that could be extracted for a property, and that others could be captured as desired for any particular application. In some instances the data in the reference set will be augmented by additional data gleaned from external sources and without reference to the images alone. For some applications, rather than resort to actual image data, it may be more convenient or effective to have a human artist creating the renderings identifying a model or reference example of an element, attribute, condition, severity, etc. In this manner the reference set can be made more uniform and potentially yield more predictable and consistent results across different condition types.

Preferably the reference set 144 also includes data/images from different architectural types, so that a nominal House Type 217 including from Victorian, Craftsman, Colonial, Ranch, and other common types can be represented. This allows for embodiments in which users can query and select for distinct housing architectural types.

Since vehicle data can also be processed as part of property assessment, data for such items should also be captured by reference to vehicle types 218. The state of image recognition software at this point is such that identifying vehicle makes, models from photographs is a relatively straightforward task. Other items or objects such as living organisms (persons, animals (pets)) personal property items (bicycles, strollers, carriages, lawn mowers, children's toys, tools, decorations, signs) etc., may be identified in images as well, and can be positively associated and predictive of whether a structure is inhabited. Negatively correlated items such as chain link fences, debris, garbage, newspapers, mail, etc., can also be identified and recorded. Again, it is not necessary to identify the identity of persons, or the object, only a high likelihood of the presence of such item or object. As will be apparent some items/objects may be simply identified as being present and not have a corresponding condition that needs to be logged. Finally it may be possible in some instances to automatically identify and classify types of trees, flowers, plants, etc. from image data alone and by comparison to reference images of such foliage.

The identification/labeling or tagging of the reference images (including any appurtenant data for vehicles, foliage, etc.) at step 219 is preferably done by humans, since they can more quickly identify and log the corresponding architecture type, attribute/condition, and/or augmented data set including severity and location. Nonetheless a machine classifier can provide preliminary or tentative coding based on pre-processing as described herein, to give a significant leg up in such annotation process. This data is preferably stored as part of a structure/attribute/condition database 152 which is correlated to reference images 144 and which is accessible to Classifier Engine 150.

It will be understood that with improved image and computing processing it is also likely to be a task that can be automated with a computing system as well. In some cases it may be possible to crowdsource the tagging of reference images at step 222, including through implementing them as part of a human interactive proof test, or CAPTCHA. For example to gain access to a resource (device, data, etc.), a human may be asked by a computing system to identify (with a mouse or other pointer) where there is a cracked window in a presented image of a house, or if a particular attribute can be found in a particular house in a set of images presented. The system can then sense if the user has identified the feature correctly and use such information as part of the tagging process.

In some applications it may be desirable to scale or normalize the size of the structures in the reference image sets 144 to some optimal processing size (e.g. N pixels by M pixels for a particular structure) prior to training, which can be determined through routine experimentation. Accordingly the reference images in database 144 may be cropped, shrunk or expanded depending on the target desired comparison size. Other customized image processing operations (rotations, noise clean up, etc.) may also be performed to derive and generate an image reference set.

At step 220 the Classifier Engine 150 is trained with the template consisting of the training set of reference images 144 and tags as created and logged in database 152. Objects (and their reduced feature set) can be analyzed in image patterns using a variety of techniques, including statistical processing, neural networks, etc., which can be used to detect and extract features of such attributes. In this instance the attributes identified by the tagging are analyzed in the images to break them down and reduce them into (or extract) smaller distinct features that can be more readily detected. This attribute—condition—feature dataset is stored in the form of models, template or other suitable form in a database or network 154.

Using conventional image processing, each attribute (and related condition qualifier) may be reduced in dimensionality and characterized by a distinct set of pixels, shapes, sizes, proportions, curves, textures, or other mathematically derivable feature from the image. The training results in extraction and optimization of specific features most appropriate for a particular element, so as to minimize classification errors for the attribute in question.

Feature extraction algorithms are well-known in the art, and examples of such that are suitable and/or can be adapted easily for use in the present embodiments is set out in literature such as *A Survey of Face Recognition Techniques*, by Jafri et al. appearing in Journal of Information Processing Systems, Vol. 5, No. 2, June 2009 and incorporated by reference herein. Commercial systems for identifying defects in manufacturing materials could also be adapted for this purpose, such as those offered by Camea's Visual Inspection System and as disclosed in references such as *Surface Defects Detection for Ceramic Tiles Using Image Processing and Morphological Techniques* by Elbehiery et al. appearing in World Academy of Science, Engineering and Technology 5 2007 and incorporated by reference herein. Again it will be understood that the type and amount of training may vary according to the particular attribute and condition to be identified, and thus will be the subject of routine experimentation.

In the end the classifier(s) can be configured to use some form of similar or template matching, probabilistic (Bayesian logic) decision, or a combination thereof. Consequently at step 230 the classifier preferably outputs a score for each entry in a Building Stock images 142 (or other particular unknown target image presented in a list 232) along with a confidence score for each of N possible attributes, M possible conditions for each, and additional information such as an estimated location in the target image. Tentative structure classifications (architecture type, attributes, conditions, etc.) are identified at step 240 and then stored at step 250 along with unique structure id in database 140. For better accuracy it may be useful to employ multiple classifiers trained with different algorithms to give a combined or averaged score to identify the attributes and classify the structure.

As part of the training step 220 noted earlier, a classifier may also be provided with additional data for the reference image structures 210 in question which can be later correlated, including any recorded/estimated economic details (value of the property), occupancy data (inhabited/not inhabited, rented/owned), internal details (size, # of bedrooms, # rooms, etc.) This type of data is available from a number of sources, including commercial real estate entities, government agencies, etc. An output 240 therefore comparing a target structure to a reference structure can also generate a correlation indicating a tentative or predicted value of the structure, an occupancy score/rating, and other similar useful metrics. All of this property related data can be stored as part of prospect database 142 noted above.

In some instances the attribute and/or condition may be determined geometrically and without strict reference to a template or pattern. For example significant aging, extreme weathering, paint peeling, and other types of deformities or damage may be detectable with image filtering and processing without resort to templates per se. An article by Winkler et al. titled *Visibility of Noise in Natural Images*, Proc. IS&T/SPIE Electronic Imaging 2004: Human Vision and Electronic Imaging IX, vol. 5292, p. 121 incorporated by reference herein explains how noise can be inserted into or filtered from images. The pattern of aging, weathering/façade damage for many structures appears as and mimics the effects of general image noise and thus could be detected in a similar fashion. A similar noise reduction process is identified in the aforementioned Elhebierry et al. reference for detecting defects in tile materials and could be adapted for a similar purpose here.

A reference by Lin et al. titled Salt-Pepper Impulse Noise Detection and Removal Using Multiple Thresholds for Image Restoration appearing in the Journal of Information Science and Engineering, Vol. 22, pp. 189-198 (2006) incorporated by reference, discloses optimal techniques for removing certain specific types of noise from images. As this noise again mimics the appearance of aging and/or weathering, one option for detecting aging/weathering in building façades proposed by the inventor therefore is to noise treat the images, and generate a noise reduced version of the same. The amount of "noise" detected in the image can be treated as a proxy for the degree of aging and/or weathering of the building structure. In general preferred embodiments of an image processing process are configured to mimic a human eye's capability of discerning errors, defects and other irregularities in an otherwise homogeneous or regularly textured object.

Figure 6A:
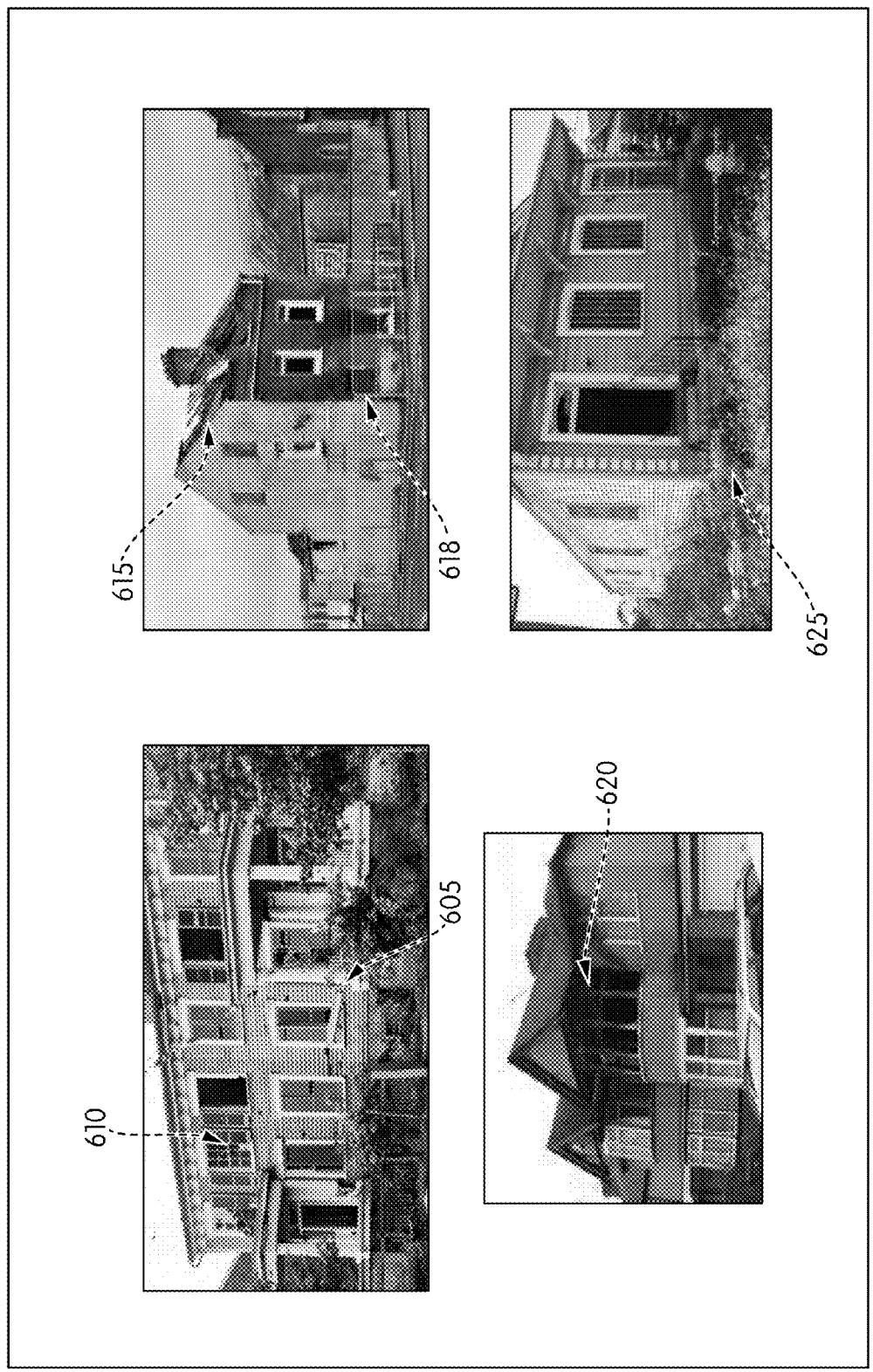
FIGS. 6A-6B illustrate examples of images and features that can be identified and rated in accordance with the teachings of the present disclosure.
Figure 6B:
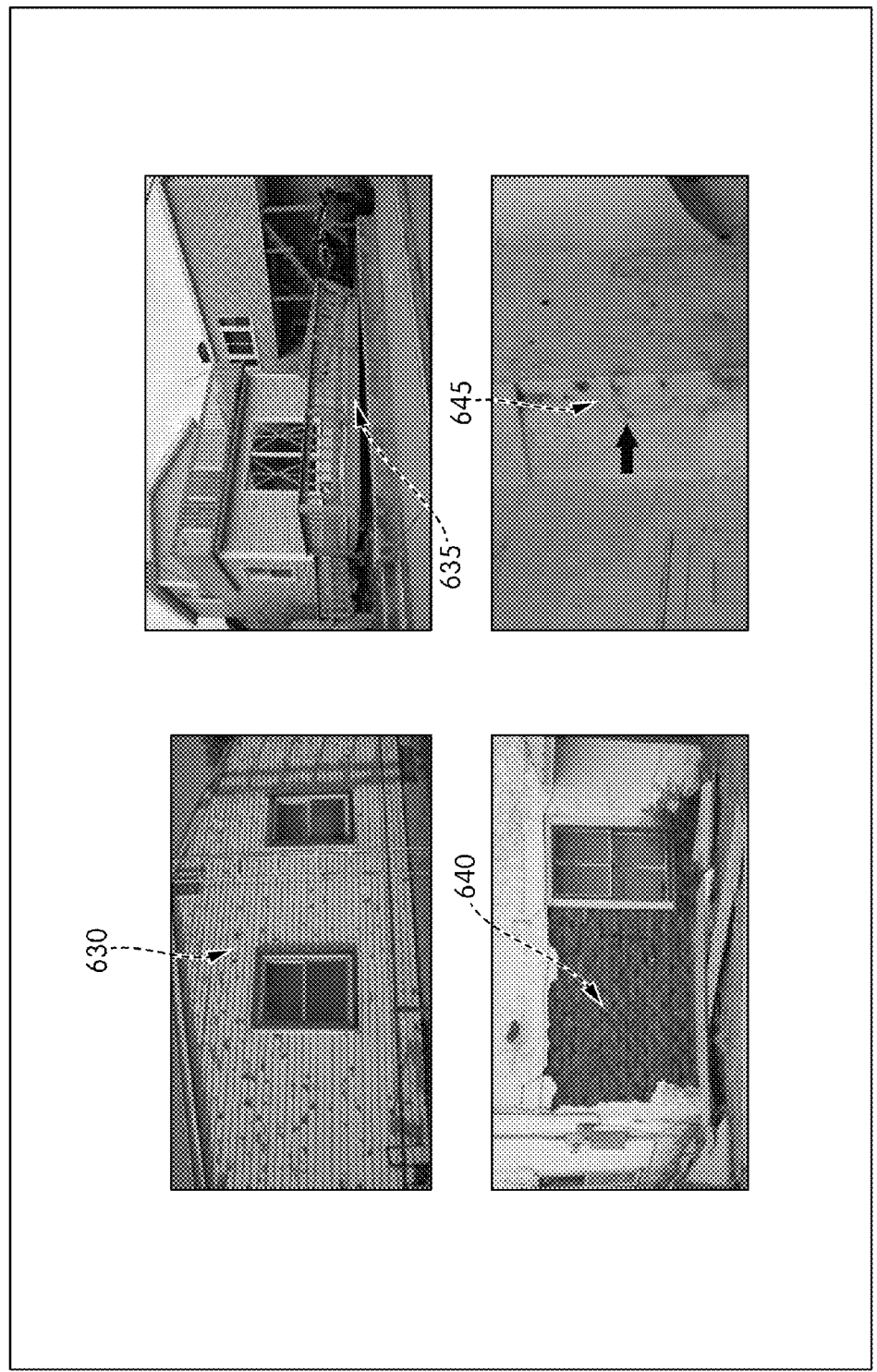

Examples of the types of attributes and conditions that can be used for training the classifier are illustrated in FIGS. 6A-6B. As seen there, a first structure is in very distressed condition and is boarded up in some places, as evidenced by elements 605 which are boards superimposed over a window. This element 605 has both an irregular orientation, and overlaps with a window element, making it an unusual feature that can be detected. Elements 610 illustrate examples of broken windows which can also be easily identified by distinct and detectable image features. Other examples are shown as well in FIGS. 6A-6B including:

damaged/exposed roof elements 615
    chain link fencing 618
    burned out areas 620
    overgrown weeds/plant growth 625
    peeling paint 630
    damaged—deformed porch and patio 635
    exposed—broken façade 640
    water stains (abrupt changes in color)—rotting 645

As is apparent from these clear examples, these elements represent tell tale signs or signatures of damage, aging, weathering, neglect, etc. to a building structure, and which can be readily identified in image data. In general, since humans are very adept at picking out inconsistencies or visual errors in an otherwise homogeneous texture, it is expected that relevant training samples are easy to obtain. Other examples will be apparent to those skilled in the art from the present teachings.

Figure 3A:
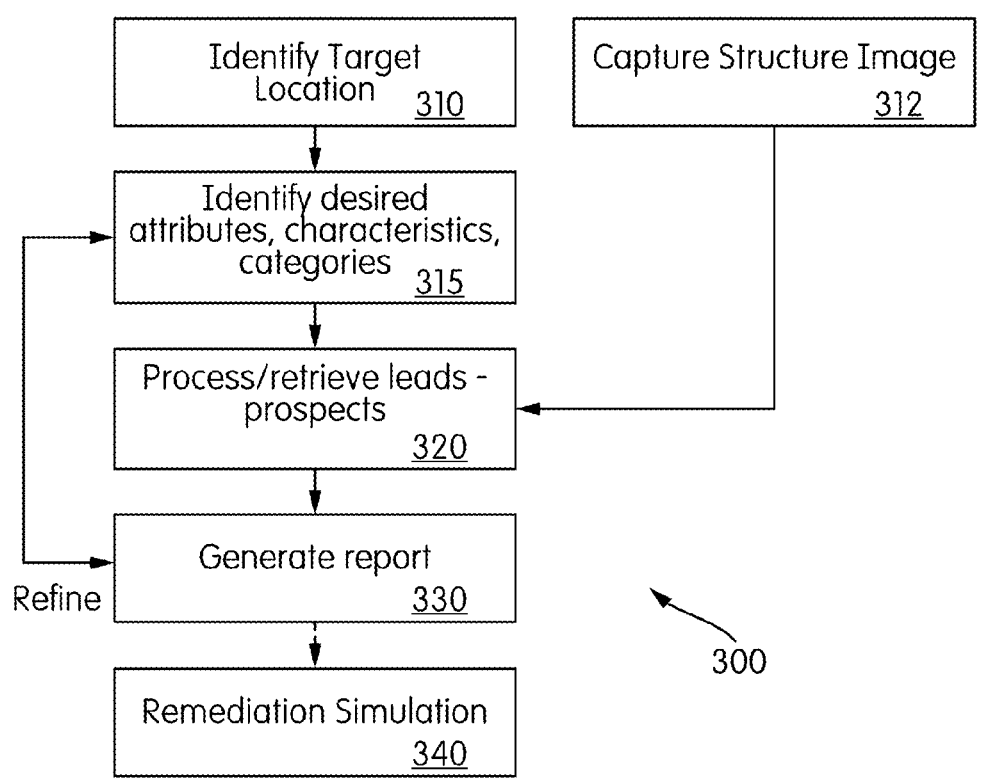
FIGS. 3A-3C illustrate an exemplary method used for identifying and reporting on real estate leads in accordance with the present teachings.

FIG. 3A depicts a process 300 by which users can search for real estate/building stock that meets particular criteria of interest, including certain visual aesthetics, architectural features, predicted occupancy criteria, etc. This is done preferably through providing search parameters to Lead Generator Engine 160 (FIG. 1) which then identifies matching properties and outputs reports through Report Logic 170 to a client device 112.

As seen in FIG. 3A a target location is optionally provided at step 310, such as a City, neighborhood, zip code, street, or any other desired geographical qualifier. Other attributes, characteristics, categories, etc., can be specified at step 315 to the Lead Generator Engine 160 as desired to filter appropriate results. Matching leads are then identified at step 320 from property prospect database 142 along with building images 312 in appropriate cases.

At step 330 a report of the results is presented to the user in accordance with the filtering parameters specified, and any desired formatting, sorting, etc. For example results presented on a mobile handset may vary dramatically from that shown on a webpage to a desktop user. The output results can be tailored for a particular platform using known techniques. If the user wishes to refine the results or search with different parameters, they can refine the query appropriately.

One further aspect that can be optionally employed in some embodiments is a remediation simulation function 340 implemented by module 175. For example a user may find a target property that is in dilapidated condition, and may desire to understand better what such structure would look like if it were improved. As noted above the present invention preferably stores reference images of structures similar to the target images reviewed by the user, and is also able to characterize or model the effects of aging or weathering. Alternatively different types of noise reduction, removal or image enhancement can be performed to smooth out and improve the image. Consequently it is a simple matter to "reverse" some of the effects of such aging or weathering and/or simulate correcting many of the attribute impairments in the target image using conventional image filtering and processing. The simulation can be controlled selectively to correct particular damage or attributes, such as façade/siding cracks, paint irregularities, roof damage, etc. or other basic building elements. Note that this feature is handy and could be employed by painters, contractors, etc., who are presenting or bidding on remodeling of a property. The Remediation Simulation Logic 175 thus outputs a simulated image of a remediated version of the target structure. The corrected image version of the building structure can be shared, emailed, etc. in any conventional fashion.

Figure 3B:

The selection of search parameters shown in process 300 can be achieved through an interactive interface 350 seen in FIG. 3B, which in a preferred embodiment is implemented as part of an interactive web page presented by interface logic 120 (FIG. 1) and viewable within a browser on device 112. Nonetheless it could also be implemented as part of an app executing on a smartphone device as alluded to above.

This selection screen 350 includes a number of query selection boxes, buttons, pull-down elements, etc. which may become active with mouse-overs and other techniques known in the art. The user can specify a location for the property in query box 360, in this case selected to be San Francisco, or some other geographical region (city, state, neighborhood, zip code, etc.) In addition the user can qualify whether the property in question is in fact for sale or not in box 361. Other options may specify that other properties not on the market should be included so as to increase the range of prospects. The condition of the property can also be specified in query box 362 which may be presented in the form of a sliding scale, descriptors, etc. which permit a wide range of building stock to be searched, from "new" all the way to "extreme fixer upper" or some other similar moniker.

Occupancy rating query box 363 allows the user to again filter or control the types of properties presented, based on a calculated occupancy score for the properties in question. As noted above, in some instances a potential purchaser may be interested in pursuing unconventional or otherwise unexploited opportunities by looking for properties that appear to be unoccupied. The type of ratings, scores and selection mechanisms for this function can be varied in accordance with any desired capability or performance. For example a degree of confidence in the occupancy of the structure could range from "known occupied" to "known vacant" and several grades in between. As seen in FIG. 3B the user can select from a slide bar, a set of designated buttons, or any other convenient scheme.

In query box 364 users can further specify an architectural "style" for the house as well if they wish. To make the query easier to formulate, it can include visual clues or objects as parameters as many people do not know the names of building elements, or the types of architecture, etc., but do know what they like aesthetically when they see it. In this instance the user has selected "Victorian" as the style of house they wish to peruse.

Query box 366 allows a user to specify other property elements, including architectural subtypes (there are many types of Victorians, including Eastlake Stick for example), specific attribute styles for façades (clapboard style, fishscale, style, etc.) ornamental features common to that architectural style (finials, sunbursts, etc.) and other desirable property features (landscaping, trees, lawn, etc.) In this instance the user has indicated that they are interested in properties that have a sunburst element, which was a common ornamental embellishment in housing stock built in the late $19^{th}$ century.

Figure 7B:
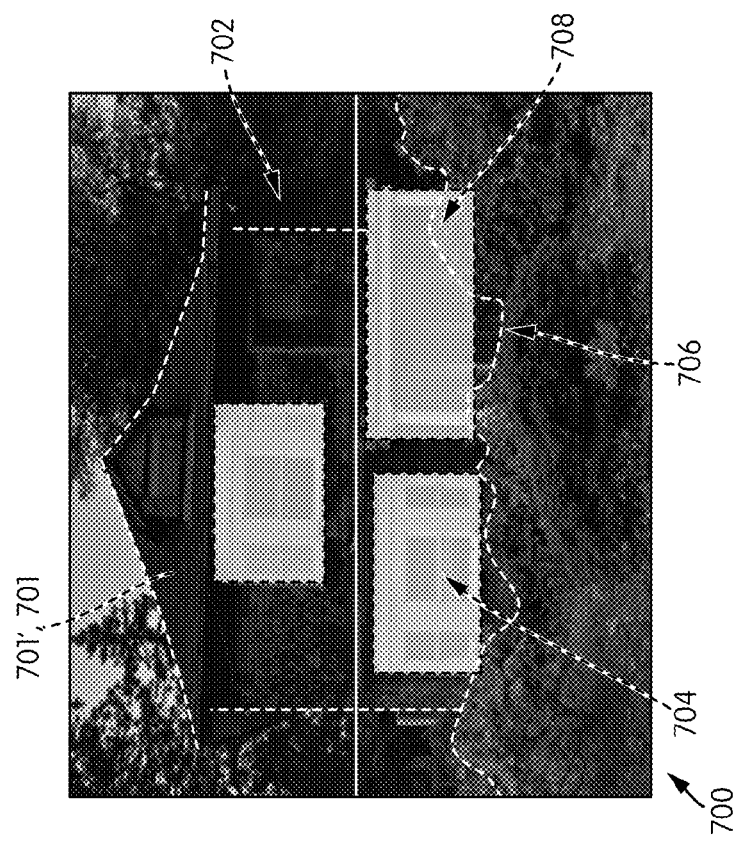

An output 370 in interface 350 can take any convenient form known in the art, including by identifying the locations of listings on a map (virtual pins) or by presenting visual listings with building images, addresses, and similar real estate data as alluded above. Information about a listing agent may be included as well, and the search results can be shared, emailed, saved etc. in any convention manner. By selecting one of the entries the user can be provided with any other useful details pertaining to the property, including the type of information maintained by such entities as Zillow, Trulia, Redfin and/or a listing broker/agent. In addition the user can be provided with additional classifying details about the building structure such as highlighted, tagged or annotated version of the building structure identified in FIG. 7E. This allows the user to quickly see the assessment of the property as performed by Building Classifier Engine 150 and/or human editors.

Consequently embodiments of the invention include a visual search engine (FIG. 3B) that assists a user in constructing and configuring a virtual target exemplar building in accordance with user criteria. The user can construct a model of a desired house from various building parameters (architectural types, roof types, façade types, etc.) color, condition, etc., and then query against database 142 to find one or more closest matches. In some instances it may be desirable to set aside a portion of the interface 350 to behave as a virtual canvass (not shown) so the user is permitted to see a virtual model of the housing structure they are creating for reference purposes.

To make the query process easier, the options presented for additional structural elements presented in box 366 can be selected/filtered automatically within the interface so that only appropriate choices for a selected structure from box 364 are presented. For example in selecting a Victorian there would be different façade and structural elements than those presented for a Colonial, Craftsman, etc.

While the selection parameters/icons are shown as thumbnail photos for simplicity, it may be desirable to use uniform sized black/white artist-rendered impressions of the various attributes, or to create more isolated/focussed versions of the attributes instead. This would give a more consistent look to the options although it may be less informative absent other contextual details provided by a complete image of a building structure. Again a default of ALL can also be included as an option in most instances to allow a wider range of search results.

It will be understood that these are just examples of a query interface and accompanying query tools, and that other variants with different forms, formats and variables could be implemented as well consistent with the present teachings.

Figure 3C:
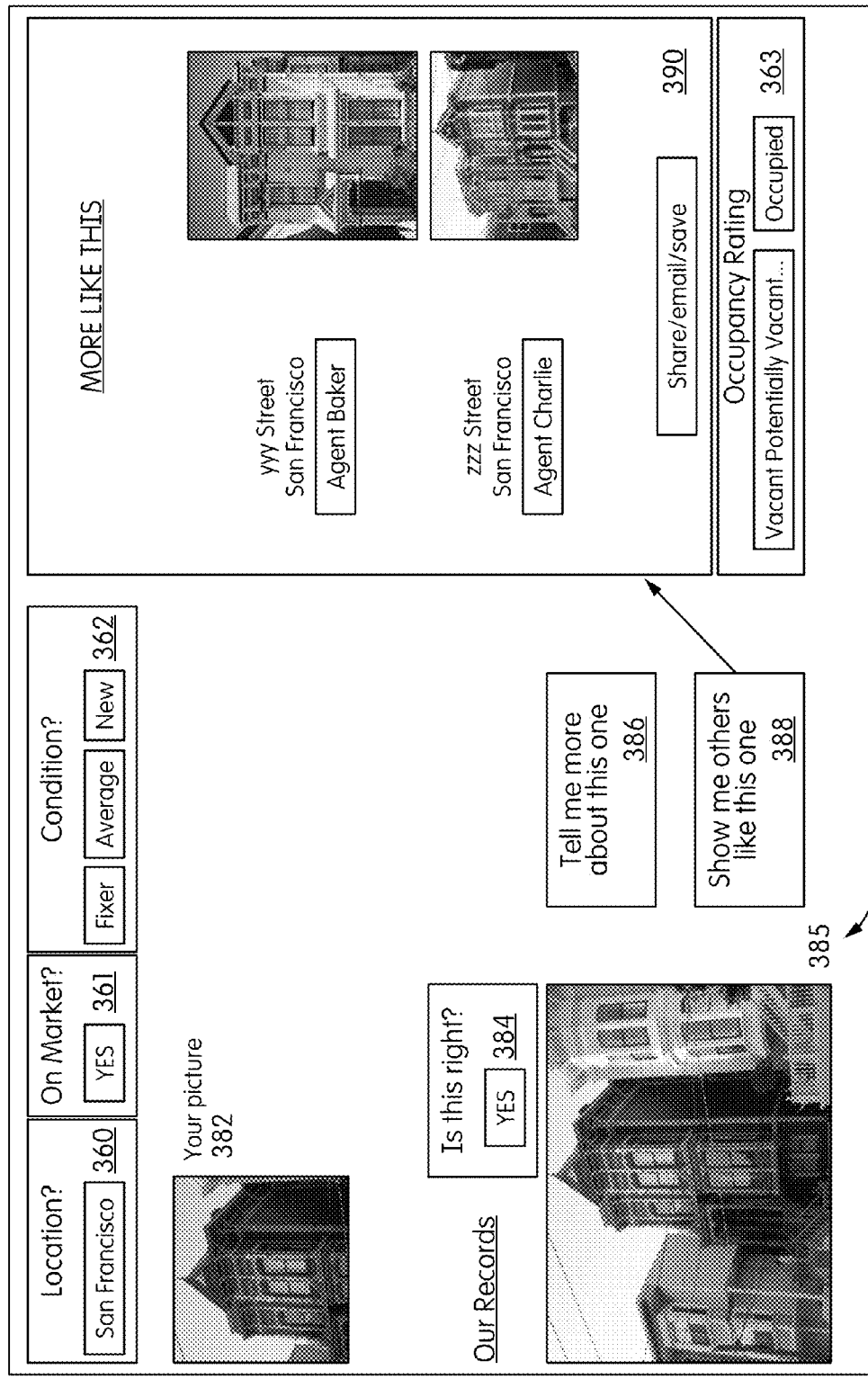

FIG. 3C shows an interactive interface 380 presented within a mobile computing device such as a smartphone, along with an additional level of functionality that permits rapid, on the spot identification and review of property details. In this embodiment Lead Generator Engine 160 is distributed and incorporated (at least in part) within code and part of an app running on a smartphone. The app integrates with the device's built-in camera (not shown) so that the user simply captures an image of a target property 382 as they see it on location. This can include both interior and exterior images of course. The image and other useful data (such as location data) is uploaded to a server side component of Lead Generator Engine 160, which queries database 142 to locate a match. As noted above, image matching for building structures can be accomplished in any number of ways by adapting existing recognition algorithms to recognize the types of objects of interest here. Further details about the target property 382 can then be presented within portion 385 or 390 of an interface 380 presented on their respective computing device.

As most smartphones also capture geolocation data, the present system can utilize such data to better match or correlate the captured structure image to entries in databases 142 and 144. If the user's location is known, then the range of image data that must be scanned to identify the property is significantly reduced, and the accuracy is also significantly enhanced. Nevertheless even in the absence of explicit geolocation data the user's image data of the property can easily be broken down and analyzed for attributes, features, etc. by Classifier Engine 150 to identify likely matches from the preexisting stock of building structures in database 142 in a similar manner as discussed above, even if it takes more time.

The match is retrieved for the user within portion 385 of an interface of their mobile computing device. The user can be prompted to confirm that the match is correct by checking selection box 384. Other aspects of the records in database 142 can also be confirmed directly from the user on site, including by presenting them with an output such as seen in FIG. 7E, and asking them to confirm, modify or reject any condition designated for a particular building element. In such embodiments the database can be populated effectively through user contributed content, or so-called crowd sourced data.

Again after confirming the identification of the target property the user can be prompted to see if they want to see more details (box 386) which would permit them to see the kinds of data discussed earlier for FIG. 3B. Alternatively since the property attributes are known from database 142, the user can also query against such records to find other matches 388 (filtered by location, availability, condition as before) that are aesthetically similar to the target property image they have captured. These can be presented within section 390 to permit the user to find similar leads based on their personal tastes. As further refinements the user can be provided with additional filtering options such as noted above (box 366) f they want to constrain the search result list further by building characteristic/element, property features, distance from the target property/user's location, etc.

The query "input" to a property prospect engine therefore can be in the form of a direct visual image provided by the user, so that the process operates to locate other building structures that are most similar to the one identified by the user. This is useful because in many instances users/purchasers frequently desire a particular visual look in a house, and the invention can help them find other stock that matches their target appearance, and which may be available (or more likely to be available) for purchase.

In some embodiments the retrieved entry from database 142 and 144 is presented in interface 380 along with visual tags or selectable overlays, so that the user can further define or refine a target building structure. For example the user may desire a different type of façade (stucco instead of shingle) a different color (white instead of dark brown) or a different roof type (slate instead of shingle), etc. These can be presented as drop-down menus to form a final query that is then processed by Lead Generation Engine 160 to retrieve corresponding entries. The entries can then be presented as noted earlier in map form, listing form, etc. with any desired accompanying data. The user can also be prompted to confirm information in database 142 concerning building attributes, associated conditions, etc., for a particular target property.

In addition it may be useful to log and compile data on particular properties that are the subject of such data captures, by property identification, building type, neighborhood, city, etc. to glean insights into the current mindset of prospective home buyers, and for other similar marketing or research purposes. To collect information first hand on building stock inventory, mobile handset users can be solicited to directly rate the quality or aesthetic appeal of a building structure that they are viewing on location within interface 380 as well using any convenient scale. A frequency, average score, or popularity of buildings within a City or neighborhood captured in images can be identified with a heat map or other convenient visual indicator. Similarly the queries made by users with Lead Generator Engine 160 can be logged, categorized and mined to identify trends in tastes for architectural types, building elements, building aesthetics, etc.

FIG. 4 illustrates an example of a record 400 containing a number of relevant data fields generated by Classifier Engine 150 (or which can include human annotations in some instances) and maintained in database 142 for each property. Each property preferably has a unique ID stored in field 402. The property ID could also store data logging details such as the dates of image captures, which helps to understand a currency of any recorded data.

A property structure style field 405 identifies an architectural type (Victorian, Craftsman, etc.) as discussed earlier. Structural element fields 410 including an identification of each structural element presented in the property, a condition of such element, a rating/weighting of such condition, and an image location for such particular element. It will be understood that a particular property ID may have multiple structural elements, and in fact several of the same type of structural element, each of which can have its own pertinent particulars. The same information is made for appurtenant elements with fields 412, including for example ancillary buildings, fences, garages, vehicles, foliage, etc.

One or more overall structure ratings is provided in field 415 which is generated by Building Classifier Engine 150 using a number of factors in accordance with features desired for a particular application. For example structure ratings may be derived on a granular, attribute-by-attribute basis, or based on an entire collection of elements present in a structure. Since each attribute may be considered a different dimension of the property data, the ratings may be based on or constitute multi-dimensional vectors representing a particular structural element, or group of elements, or of an entire structure. In this form they can be more easily compared to other property structures as well for purposes of grouping, classification and querying. Those skilled in the art will appreciate that many variations of ratings can be employed by a system 100 for purposes of improving and optimizing individual property assessments and comparisons.

Occupancy Prediction field 420 stores a score (of any convenient range) generated by system 100 identifying a likelihood of current occupancy of the structure. As noted earlier this score may be associated or mapped to other content labels, such as "confirmed vacant" or "confirmed occupied," etc. Preferably the prediction should have some reasonable range to help differentiate structures, as well as a confidence score. Thus there may be other ratings or predictions such as likely vacant, uncertain, likely occupied, and so on. As noted above where this information is already known with certainty by reference to public records it can be included here. Since it is not usually known, however, the invention derives a prediction of occupancy by comparing the property structural element conditions, scores, etc. against other known examples for properties in which the properties are confirmed occupied (at one end of the spectrum) and other examples in which the properties are confirmed vacant, abandoned, etc.

Data fields 442 (address, geolocation) 444 (owner, occupant data) 446 (image links) and 448 (transaction, tax records) can be obtained usually from any number of public records or commercial resources. In other instances, as noted below, it is expected that interested persons will capture and communicate this type of data (including image data, aesthetic ratings, attribute ratings, etc.) from mobile devices directly. While not shown here it is possible of course to integrate or cross-reference to other data tables to indicate a registered agent/broker associated with the property. It will be understood that the database could be adapted differently and that any particular commercial implementation is likely to have significant variations.

FIG. 5 depicts an exemplary building attribute/condition assessment process 500 that employs image processing that is suitable for embodiments of the present invention. General aspects of the image processing are also shown in FIGS. 7A-7D.

Figure 7A:
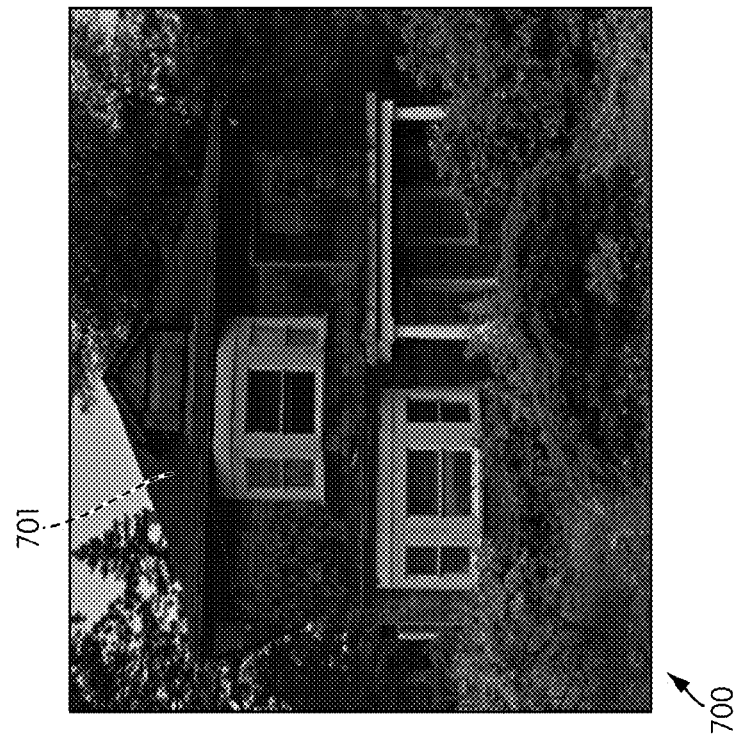

As seen in FIG. 7A an image 700 is retrieved from database 144 (or derived from other source) and is divided into distinct regions or blocks 701 at step 510 (FIG. 5). While only one block is shown it will be understood that any and all parts of the image can be divided and treated this way. The size and shape of the blocks 701 can be varied of course using conventional techniques such as discussed above and it will be understood that FIG. 7A's depiction is not necessarily drawn to scale and is merely illustrative to help facilitate understanding of the invention.

A building envelope 702 (FIG. 7B) is identified at step 520 (FIG. 5) by image processing adapted to detect edges of structures. The envelope information (and similar profile data) is useful and can be used for identifying an architectural type descriptor for the target structure, for defining regions of blocks to be used within the envelope for further evaluation, etc. The building envelope information can be employed to define a building structure grid (not shown) from which the individual examination blocks can then be derived. Since different architectural types can have different grids, this grid information can be used as well to improve block definition, attribute identification, etc., as it will be determined statistically that a particular grid element in a first building type will contain very different structure attributes than a corresponding element in a second building type. Other boundaries for other objects such as landscaping 706, trees 708, etc., can also be determined and logged.

At step 525 an identification is performed to determine structural elements presented in a first block 701, including such attributes as roof elements, window elements, façade elements, etc. Again the identification of such attributes (and their types) can be performed in any number of ways by Classifier Engine 150 after it has been trained, including by pattern recognition techniques and statistical image processing using models, templates, etc. Preferably each block is assessed to see if it contains one or more of a set of target structural elements or attributes. For example the first block 701 may be coded to denote that an attribute {roof} with type {pitched} and {shingle} is contained, and so on. The first block can also be color coded as well, so that abrupt changes within the block or between blocks can also be used as an indicator of an irregularity, defect, damage or the like.

Confidence scores and similar measures can be employed and recorded with each attribute/type pair to improve performance. Attribute characteristics can be identified, generated and stored as part of such process. For example an attribute {roof} would be expected to have a certain attribute size/shape relative to the building structure and an attribute orientation. These attribute codings can be used to identify and confirm the existence and extent of an element in the target building structure. Consequently data from adjacent blocks (of which 701' is an example) can be used to influence and score a confidence rating as well. Thus, for instance if a first block is tentatively coded as noted above, and a second adjacent block is also tentatively coded the same way, the likelihood is high that the attribute identified is correct because the {roof} attribute in question is known to have characteristics matching the observed block data.

Similarly as additional blocks of the property image are processed, and depending on an identified architectural type, it might be unlikely to have an attribute in a particular block. For example a roof attribute would be uncommon below a certain level (line 705) in a building structure. Conversely, doors are uncommon at a rooftop level, and so on. These statistical observations can be gleaned and used to train the classifier as well so that it weights the presence of attributes in each block in accordance with the location of the attribute, the type of architectural type identified, and so on.

At step 530 a tentative condition score is computed for the detected attribute. Again it is preferable to assess the condition of the attribute against a reference set of conditions to determine an appropriate rating. In this instance the dark or irregular color may cause a roof element to score poorly. As before it is possible in some embodiments to use adjacent block coding scores, so that the detection of a roof in poor condition in one block is likely to mean that a second adjacent block with such attribute is likely to be scored in a poor condition. A window element may be detected with reference to blocks at 704, and with a condition of {no covering} which may be an indication of abandonment (since most people prefer some kind of privacy/covering if they inhabit a structure). Landscaping 706 occludes structure 700 and is irregular, and thus may be classified in this manner along with other appropriate plant/tree identifiers and condition descriptors for the same as noted earlier.

Figure 7D:
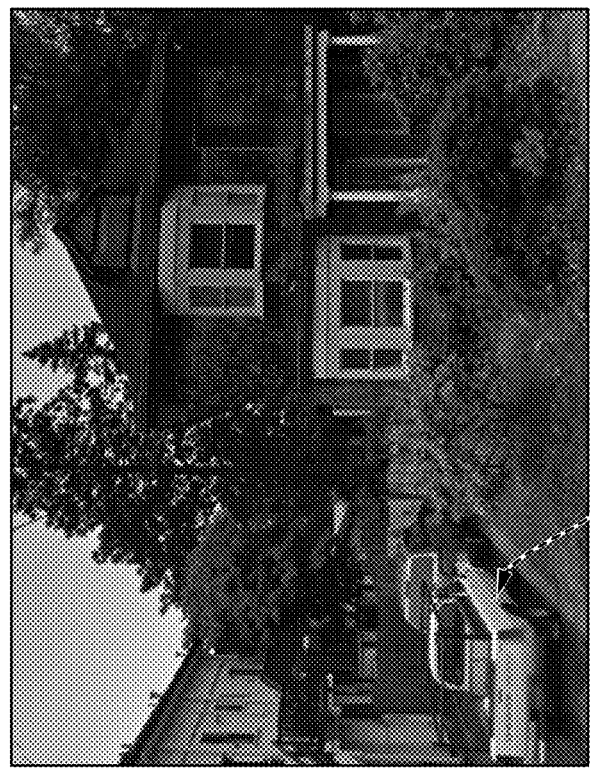
Figure 7C:
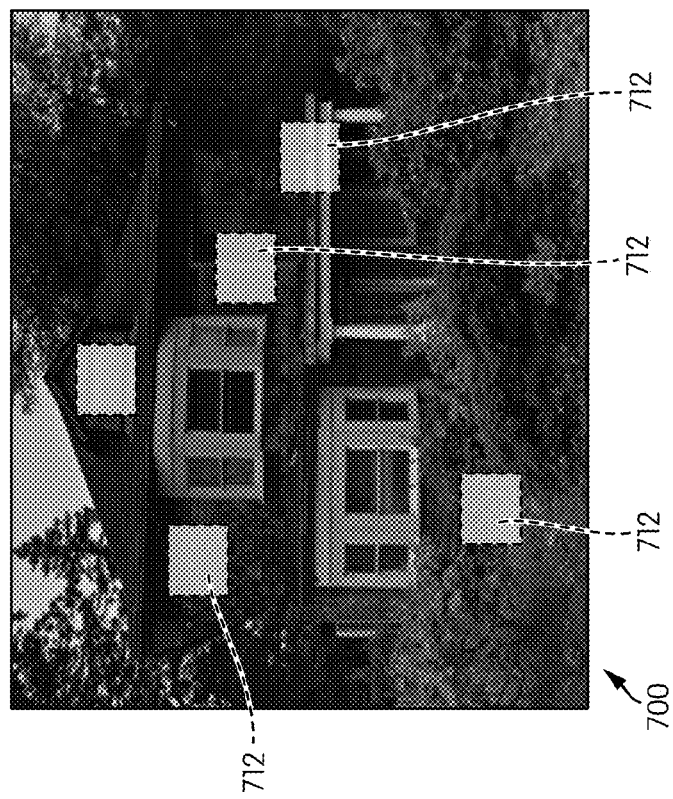

If Classifier Engine 150 identifies an attribute, condition and location with an acceptable confidence in block 701 (which again can be calibrated as needed) at step 535 then the data is coded in a tentative tag table at step 540, along with an indication of the block id, location id, or similar coding. If the attribute is not confirmed, the process simply loops around and looks to see if another element may be present. This is done repeatedly (see FIG. 7C) to identify any number of elements 712 (siding, dormers, fascias, overgrowth, water stains, missing windows, etc.) in poor condition. As seen in FIG. 7D information concerning the existence of a vehicle 714 vehicle models, types, etc. can also be captured as part of the process.

While the blocks do not have to overlap, in some embodiments the process can be repeated with different sized blocks, with overlapping blocks, etc., so as to increase a confidence in the attribute tagging process. Furthermore it is expected that in many instances there will be multiple images of the same target property and each can be assessed individually to contribute to the overall structural rating. This may be desirable particularly in instances where shading, light intensity, etc. may vary significantly between images.

At step 545 the entire table of attributes is reviewed in automated process for consistency, final scoring, etc. As alluded above some smoothing of the data or the like may be performed.

A visual assessment report 730 can be generated (see FIG. 7E) at step 550 (FIG. 5) which preferably identifies at least those attributes identified by the system as having some measure of damage, impairment, aging, weathering, etc., This data is presented in a list and visual form for a human reviewer, and within an interface may have interactive tags so that the tagged elements/conditions may be further reviewed, modified, etc. by the human operator. Intensity information can be provided by way of color coding to denote a degree of severity of the identified condition, along with location information.

An initial tentative architectural designation is also identified in field 735, along with a tentative inhabited score field 740. This latter score may be derived by examining and comparing any number of identified defects in the property structure against reference examples. Correlations may be derived based on individual elements, combinations of elements, etc.—for example absence of window coverings on multiple windows may be strongly correlated with abandonment or vacancy. Overgrowth of landscaping or extremely weathered siding may be correlated with aged occupants, and so on. A number of statistical observations can be derived and used to determine an estimate of the likelihood of occupancy of the structure, and whether is occupied by a renter or owner, etc. Other fields, data can be presented of course and the invention is not limited in this respect.

During step 550 (FIG. 5) a human reviewer can accept or modify the initial classification presented in visual assessment report 730. As alluded to earlier in some embodiments the visual information report may be incorporated as part of a CAPTCHA so that a human user is requested to confirm or verify the presence (and/or location) of certain building elements in the image that are impaired/damaged/aged/weathered, etc., to crowd-source the assessment of the target properties, or the reference templates used to rate the target properties.

The final structure assessment data is then recorded at step 555 with the property information in database 142 as noted above. Based on the assessment of individual elements, their condition, etc., and collectively over all the elements, an overall assessment or rating of the exterior physical condition can be assigned to the building structure. This rating or score can be normalized by reference to other specific buildings have the same architectural type as well for better comparison. A structure may be ranked or rated for condition relative to peer structures in an immediate, specified target region. "Peer" structures may include all structures, or a subset having the same architectural style, or a predetermined number of common features, etc. A "target region" may include a street, block, zip code, city, or any other desired benchmark.

By correlating each of the impairments to repair or improvement figures, and summing over all the attribute conditions, an overall estimate can also be generated to identify a cost to restore the building structure to a nominal target state. Using sales data for similar structures in a similar condition, and other similar parameters a purchase prospect score can also be assigned. This and similar data can be stored in database 142 as part of a structure rating 415. Since the image data is regularly updated, long term evaluations over defined time periods can be made as well to identify changes in a property condition.

Figure 8:
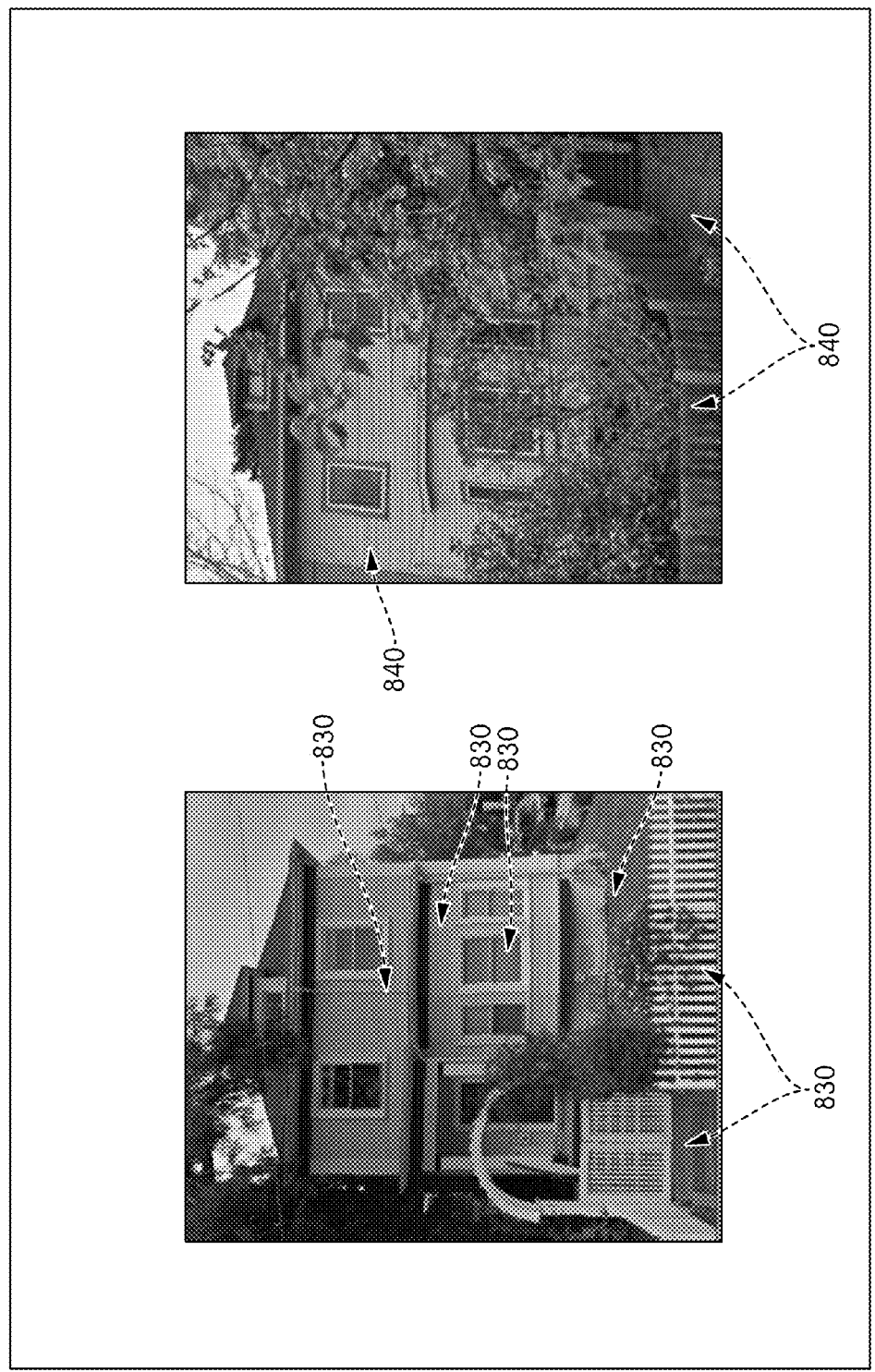
FIG. 8 illustrates an example of a reference structure and image/feature processing that can be employed with embodiments of the present invention.

FIG. 8 illustrates further examples of reference property structure images that can be used in embodiments of the present invention and coded in database 142. The attributes of reference property 830 and reference property 840 identified here include examples of siding, windows, downspouts, walkways, fencing, lawns which can be classified as corresponding to a positive or high end of a condition scale, i.e., being in top condition and lacking any noticeable weathering or aging. In contrast reference property's walkway is notably less "clean" (i.e., includes plant overgrowth) and the fence is discolored and weather. Extreme examples of each building element can be captured and analyzed statistically in this way to help characterize elements having opposite valued ratings. In addition, botanical elements such as particular trees (maple, willow) can be seen in these images along with particular notable flowering and climbing plants that could be identified and logged as part of a reference database.

Figure 9:
FIG. 9 illustrates examples of prior art advertising and marketing to home/property owners for products and services.

FIG. 9 illustrates different examples of prior art advertising materials in the general areas of home improvement. As is apparent from a cursory glance, these marketing materials are at best relevant on a macro scale approaching a city or zip code level, but little if anything about these materials is tailored or customized for any particular neighborhood block, let alone for a specific domicile, residence or building. For this reason these flyers or *circulars* have little appeal or relevance to any particular homeowner, and the targeting appears to be little more than hit or miss. At best it is based on "seasonal" improvements generally seen in particular geographic regions, meaning it is more likely a resident of Chicago will see a pool supply ad in early summer rather than mid winter. Similar generalized advertising is presented online as well in response to search queries, so that a homeowner querying "windows" is given at most generic advertising from a vendor near their location.

Figure 10:
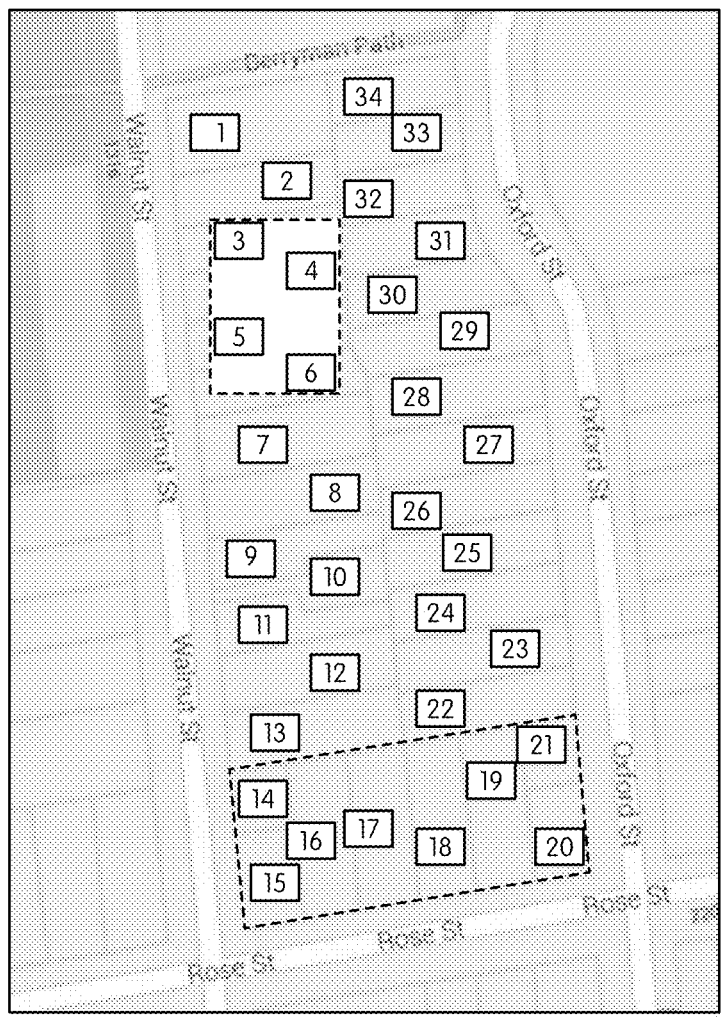
FIG. 10 shows a typical city sized block in a residential neighborhood which can be assessed and targeted in accordance with embodiments of the present teachings.

FIG. 10 shows a typical city sized block in a residential neighborhood which can be assessed and targeted with better marketing materials in accordance with embodiments of the present teachings. The individual buildings and lots have been identified with unique numbers in this block to make it easier to understand the present discussion. It will be understood that the residential and commercial housing stock of any particular city, town, etc., can be divided in this fashion by the computing system of FIG. 1 using a number of automated procedures based on computer records, address data, etc. and/or using some other convenient scheme for purposes of achieving the objectives set forth herein.

Furthermore it will be apparent that the size of the block can be adjusted as needed or desired for any particular assessment, advertising campaign or group offer. For example it may be determined that as concerns marketing for window products, the target size of a group block or offer should include about N separate buildings (see logical block encompassing structures 3-6) while the target size of a group block for landscape or roofing services should be about M separate structures (see logical block encompassing structures 14-21). Other logical groupings that do not require contiguous boundaries are also possible of course. The present teachings can be used to glean such optimal group sizings and clustering to better increase an adoption rate for particular campaigns.

Furthermore by observing and logging participation rates by individual homeowners embodiments of the present invention can identify and optimize logical groupings in any block for any particular product or service. For example it may be determined by a computing system that homeowners in lots 7, 10 and 12 are frequent purchasers of paint products. A database 140 of structures, owners and specific products can be maintained to log such purchases. If all three purchased products within a period T1-T2, and a predetermined or calculated update period T3 for such product is approaching or has expired, these individuals can be targeted with a group discount or coupon to increase their odds of participation. By analyzing owner purchase histories and expected product lifetimes the computing system 100 can pair and aggregate similarly behaving owners in a particular block with similar needs to create customized targeted group advertising. On a larger level of course groups of blocks too can be analyzed for optimal targeting.

FIG. 11 identifies examples of structural features, parameters, conditions, etc. that can be identified, assessed, tagged, coded and stored for a particular building structure in a city block in accordance with embodiments of the present teachings. It will be understood that these are but examples of course, and other features could be classified as well. In a preferred embodiment, each structure is classified in accordance with at least N different mandatory features, and potentially with an additional M optional features. For example it may be required to capture at least the street address from a sign on the structure, from sidewalk markings or other similar indicators. The number of distinct visible stories can be logged (1, 1.5, 2, etc.) Landscaping and vehicle data may be optional, and so forth. The number of features to be coded will vary in accordance with a desired purpose of the data being captured. In some instances a particular entity may want to capture additional customized data, such as the presence of a sign indicating an alarm system. In other instances a homeowner can be encouraged or induced (including through online surveys) to contribute interior photographs as well of specific rooms. Thus images of kitchens, bathrooms, bedrooms, and surroundings—floors, walls, ceilings, fixtures (lights, appliances) can be captured and coded as well. This can be used as a feeder to an online user home improvement interface. For example a property owner desiring a kitchen renovation could upload photos of a current kitchen to get an assessment, evaluation, etc. by competing vendors or contractors desiring to take the job. A homeowner may similarly contribute such interior information as quid pro quo for access to a full exterior report as described herein.

As noted above, preferably the presence of the feature, type and condition is coded and collected and stored in digital form. For example, feature "facade" has a type "stucco" and a condition "good." Other forms of classification and annotating will be apparent to those skilled in the art. Information on the type of structure, the presence, type and condition of facades, roofs, awnings, porticos, landscaping, flags, exterior fixtures, vehicles, yards, articles, garages, building types, air conditioners, fuel storage tanks, window bars, security signs, security lights, flower pots, flower boxes, fire escapes, amount of tree/building shading, street obstruction, and even colors of objects can be collected. For commercial establishments, the type of business can be tagged and stored as well (dry cleaner, restaurant, bar, convenience store, etc.) Grafitti can also be identified in this manner. The types of private-public trees, to the extent discernable, can also be collected as such data can be used for a number of purposes as well. For example certain types of trees produce sap or other droppings that cause damage to vehicles on a seasonal basis, and cluttering of gutters. Knowing the time(s) of year when trees flower or are likely to produce droppings is another item of information that can be exploited for targeting optimal structures, homeowners and times for marketing cleaning products, car wash entities, gutter/window cleaning, etc.

The existence of public or private utility poles, boxes (lights, phone, cable) and cable wires, telephone wires, common fences or open areas between structures can be noted for each structure. In some instances the existence of open parking spaces, and public street signage can be identified and logged as well. An overall density, availability, etc. of street parking relative to private driveway parking can be estimated as well. This data can be aggregated and used for determining potential parking places for persons unfamiliar with an area. The existence and condition of fire hydrants, street parking signs, school signs, can be compiled for any convenient purpose.

Relative sizes and areas of objects in the image data can also be collected if desired. This data can have further utility in assessing the overall features of a structure and potential for different products/services. For example, dimensions such as a size of a roof area, amount of landscaping, height/size of trees, hedges, a size of a driveway, size of window openings, sidewalks, etc. can also be collected and stored for each structure. To facilitate such measurements, additional scales, tools, etc., could be included in the interface of FIG. 11 to assist a human rater/coder. An amount of height displacement from street level can also be measured if desired. While some images may allow only for one/two dimensional measurements it is expected that additional data could be gleaned from other perspectives obtained by other image capturing systems, or from public records which identify the layout of building envelopes on each lot. Accordingly a front-on shot may identify a dimension of X feet width for a yard, and a public record may indicate a setback of Y feet from a public street. From such combined data it is possible therefor to glean additional site characteristics.

An overall structural rating can be identified as well, along with a relative target area rating indicating a comparison other structures in the area. Many times prospective investors, home owners, etc., want to know a ranking of a structure relative to other homes in a particular neighborhood.

To improve data accuracy it is expected that multiple human coders could be employed to review any particular structure. This will increase accuracy and coverage through crowdsourcing of such tasks. A voting algorithm can weigh the contributions from individual coders in assessing and attributing the presence of features, their type and condition. Since the image data is in electronic form it is expected that such human classifiers could be trained and do such work from any location that has computer access, including in remote or foreign locations where labor costs may be significantly lower. As noted above it is expected that with sufficient training an automated classifier could participate in the process, if not perform the entire process of classifying structural features. To make it easier for human coders, a visual palette can be presented with the features on the screen. As a coder completes one feature, a corresponding box could turn from red to green. Pulldown menus can be employed as seen in FIG. 11 to assist with the coding parameters. Again, as noted above in some instances these features can be pre-computed by a preprocessing operation and given a tentative designation for human confirmation.

FIG. 12 identifies further examples of structural features, parameters, conditions, etc. that can be identified, assessed, tagged, coded and stored for another structure in a city block in accordance with embodiments of the present teachings. Information on the type of structure, the presence, type and condition of yards, articles, garages, number of stories, and building types can be collected. An electronic interface may be optionally configured primarily or solely for the purpose of identifying defects, wear or other hazards. Alternatively the coding process may be targeted primarily or solely for identifying structural improvements, such as the presence of a new fence, new roof, new paint job, etc. This may be preferable for some implementations in which it is desired to get a first pass at a set of building stock, and/or where it is not necessary to capture more than a few features. Tags and other annotations can be conveniently added and stored using an automated computing system programmed in accordance with the present teachings.

Figure 17A:
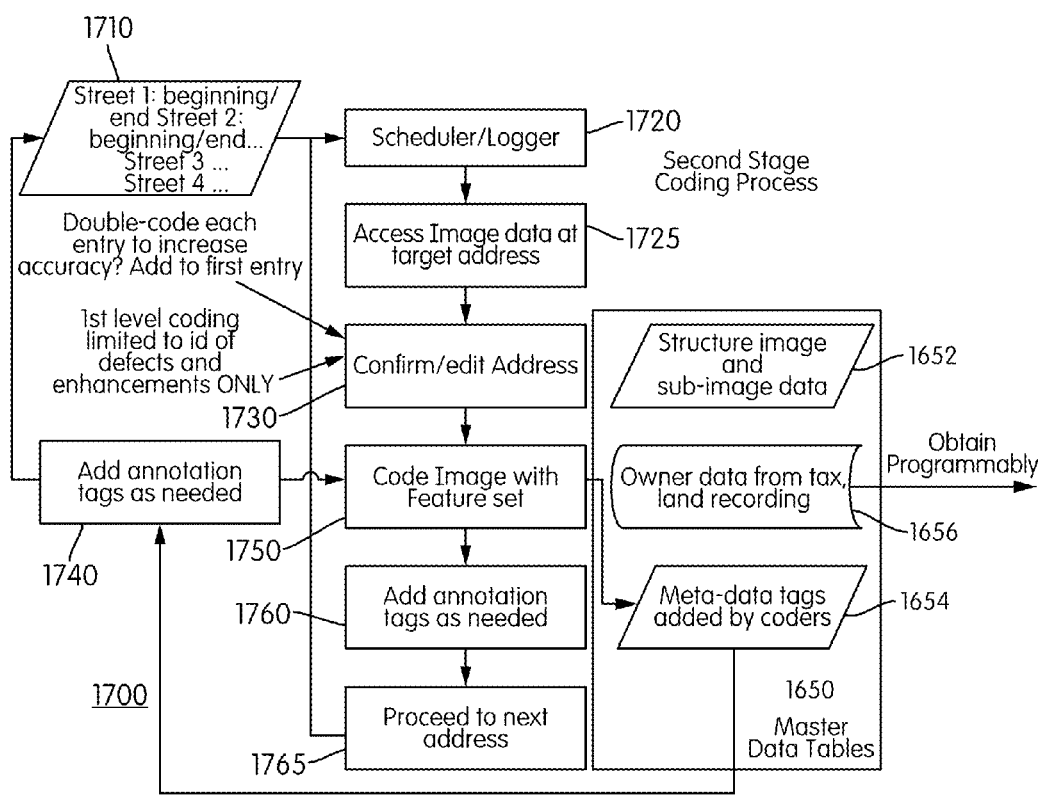
FIG. 17A illustrates a preferred embodiment of a structure coding process used by a classifier of the present invention for building structures in a target city.
Figure 17B:

FIG. 17B illustrates a typical structure coding as it would be performed in accordance with embodiments of the present invention. In this instance both defects and property improvements have been annotated and highlighted. Again other variations for items to be coded, and tools for doing so will be apparent to those skilled in the art. The implementation of such customized electronic tool can be achieved in any number of ways known in the art based on the present teachings.

Figure 13:
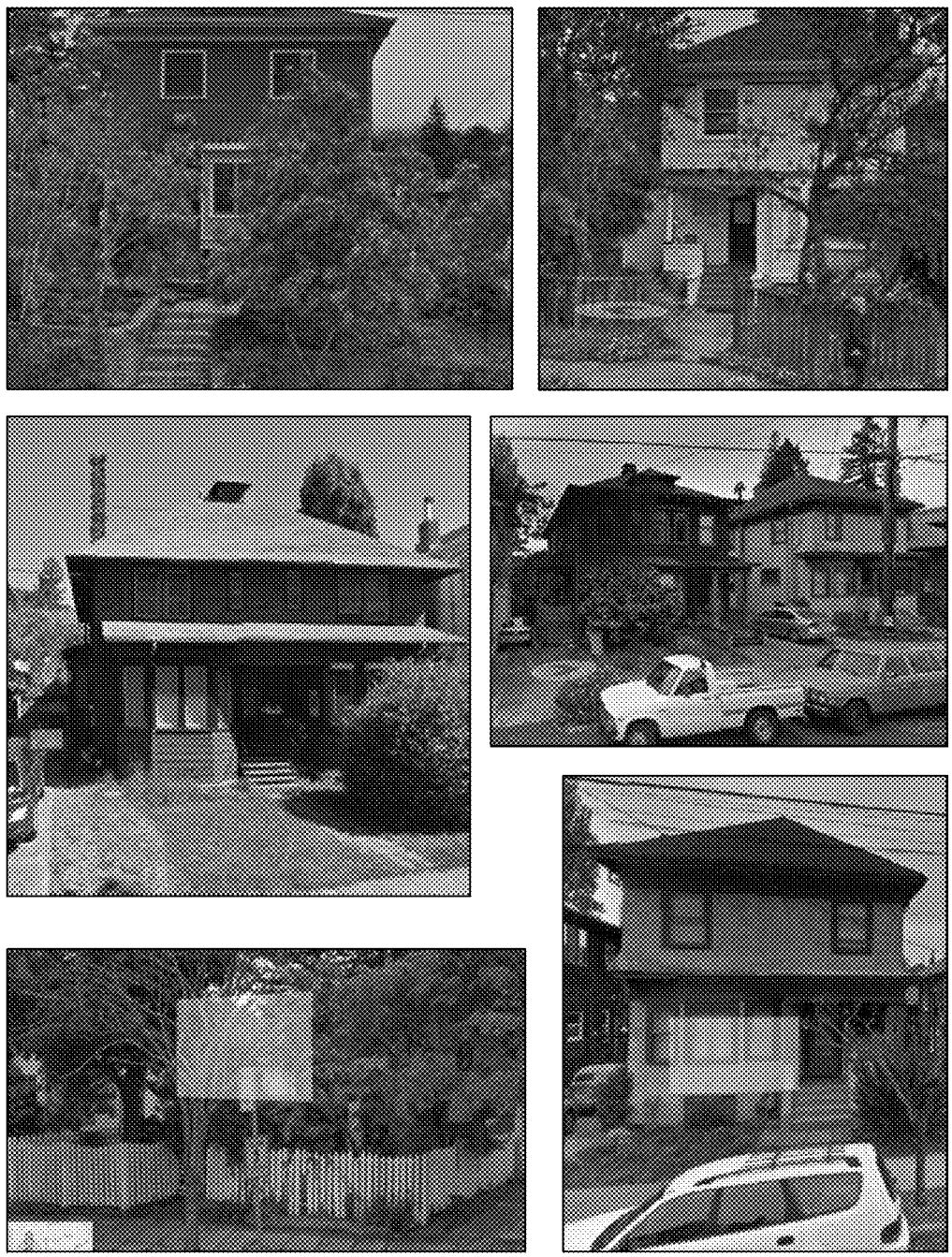
FIG. 13 identifies other aspects of structural features that can be classified in accordance with embodiments of the present teachings.

FIG. 13 identifies other aspects of structural features that can be classified in accordance with embodiments of the present teachings. For example the presence of chimneys, fire damage, defective windows, inferior fencing, weathered paint, overgrown or unkempt yards, etc. can all be tagged and logged into a database. These structures correspond to other numbered lots in the block of FIG. 10. While the preferred embodiment uses an existing database of images from a third party supplier, it will be apparent that the images could be obtained directly using conventional processes and sources as well at different angles, elevations and profiles to increase building coverage and feature currency/accuracy. For example, as noted below, it is contemplated that crowdsourcing and/or aerial drone, satellite and/or low altitude dirigible technology could be employed usefully for such purposes.

Figure 14:
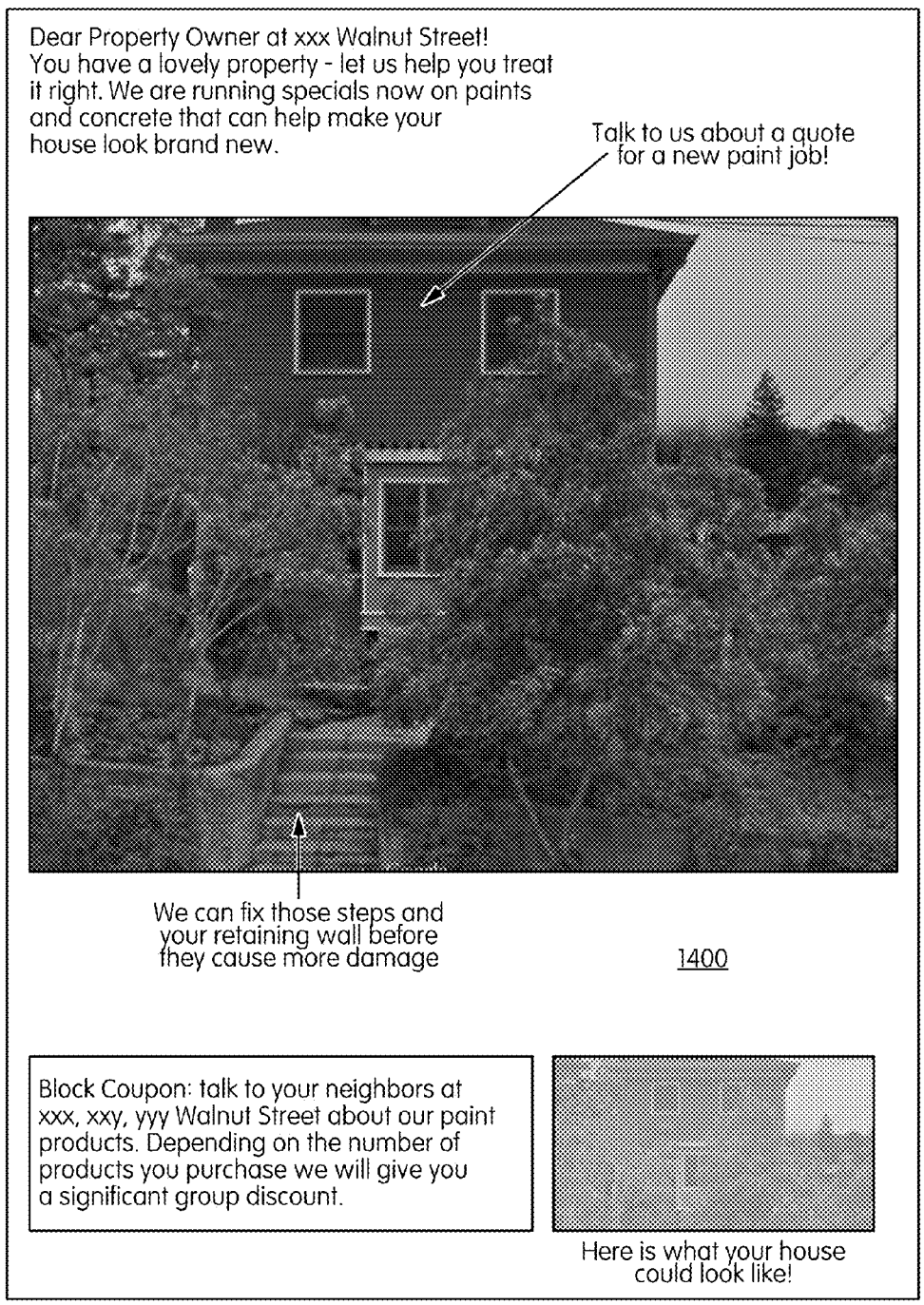
FIG. 14 provides an exemplary embodiment of a targeted advertisement generated for a property owner identifying a specific structure and specific improvements identified by a classification system of the present invention.

FIG. 14 provides an exemplary embodiment of a targeted advertisement 1400 (preferably generated by the computing system of FIG. 1) for a property owner containing multiple targeted and customizable content sections. Among other things these separate sections identify a specific structure and specific improvements identified by a classification system of the present invention. The content for this marketing material can be synthesized from a variety of sources, including the original image database, the annotations added by human coders, and other tailored content appropriate to the features and conditions of the building structure. Preferably the marketing and/or advertisement 1400 includes a first section containing a current image of the structure, an identification section for the owner's name or other identifier, a targeted message section to the owner identifying the address of the structure, identification of defects or imperfections at the site, and additional sections for customized offers and/or messages addressing such defects/imperfections. Correspondence and contact information would preferably be included as well in these or other sections of the targeted material. While this material is shown here in printed form, it will be understood of course that a full report containing such information may be made accessible to a user online, and/or presented as part of a targeted electronic ad.

In addition the targeted ad may include a "group" discount coupon portion (see bottom left of FIG. 14) that informs the structure owner of group discounts, including other specific building owners in their area that can be solicited to achieve a group discount rate for a qualified set of participants. In this manner the homeowner can be engaged and motivated to interact and obtain group discounts by cooperating with their neighbors who are determined by the computing system to have similar needs or interests. A group offer can be specified in detail in another section of the targeted ad, and can include any number of criteria tailored by a vendor. For example it may require that at least X participants purchase $Y of products within a period P to obtain a discount D. For example if two neighbors purchase products exceeding $1000 within 30 days they may achieve 20% discount/refund, and so on. The format of the group offer and extent of discount may be adjusted concomitantly with the number of participants, type of products, etc.

In a preferred approach the computing system identified above (FIG. 1) keeps track of a group of owners {S1, S2 . . . } who "opt in" to a proposed discount, and gives them a grace period (T) of a certain number of days to solicit commitments by other participants so as to qualify for the group offer. Small refundable deposits are collected from each participant to secure participation in the group discounts. As the period expires the system can send reminders to the non-opting participants, additional enhancements or discounts, etc. or qualify the existing set of participants for the discount. The deposits are then applied towards purchase of the goods or services. If the group does not achieve the target size or set the deposits are simply refunded in part or whole. Other variants will be apparent to those skilled in the art.

This type of targeted neighborhood group coupon should have reasonable and improved adoption rates and benefits since the needs of the individual owners are accounted for and aggregated in the grouping of the offers. Stated another way, rather than simply targeting every house in the block with the same random offer by mailers or emails (as is done by most group advertising technology), the present invention can identify particular houses with particular needs, group such entities, and present a specific offer to such entities based on stored profiles for such structures and owners. It will be understood that this is only an example, and the format of such advertisement could take any number of forms, styles in accordance with the present teachings.

Also shown in the bottom right of FIG. 14 (in thumbnail form) is a remediation simulation segment or portion of the marketing materials 1400. In this section the computing system provides a visual simulated version of the homeowner's structure as it could appear if remediated using the products/services proffered in the marketing materials. The remediation and/or rendering simulation software can take as an input the image file for the structure in question and using conventional image processing techniques imitate the effects of different types of improvements.

Other examples and formats of the simulation/remediation section and other sections of the targeted advertising will be apparent to those skilled in the art from the present teachings. Again while shown in hard copy form it is apparent that such targeted advertising 1400 could be created on a structure by structure basis and maintained/presented electronically. A virtual flyer/ad could thus be constructed and viewed online at a website by a homeowner or other authorized user, with the same sections noted in FIG. 14. This information could be accessed online by a homeowner in the same manner that they can currently access or edit information online for certain real estate listing sites. By specifying a particular address, and providing suitable credentials, a user/homeowner could access his/her tailored/customized data for their structure using a general query engine. The annotated structure data and all other sections would be presented within a conventional browser or mobile equivalent for perusal. The tags, coupons and other sections could similarly include active link portions to engage with the owner directly through more interactive electronic tools.

Figure 15A:
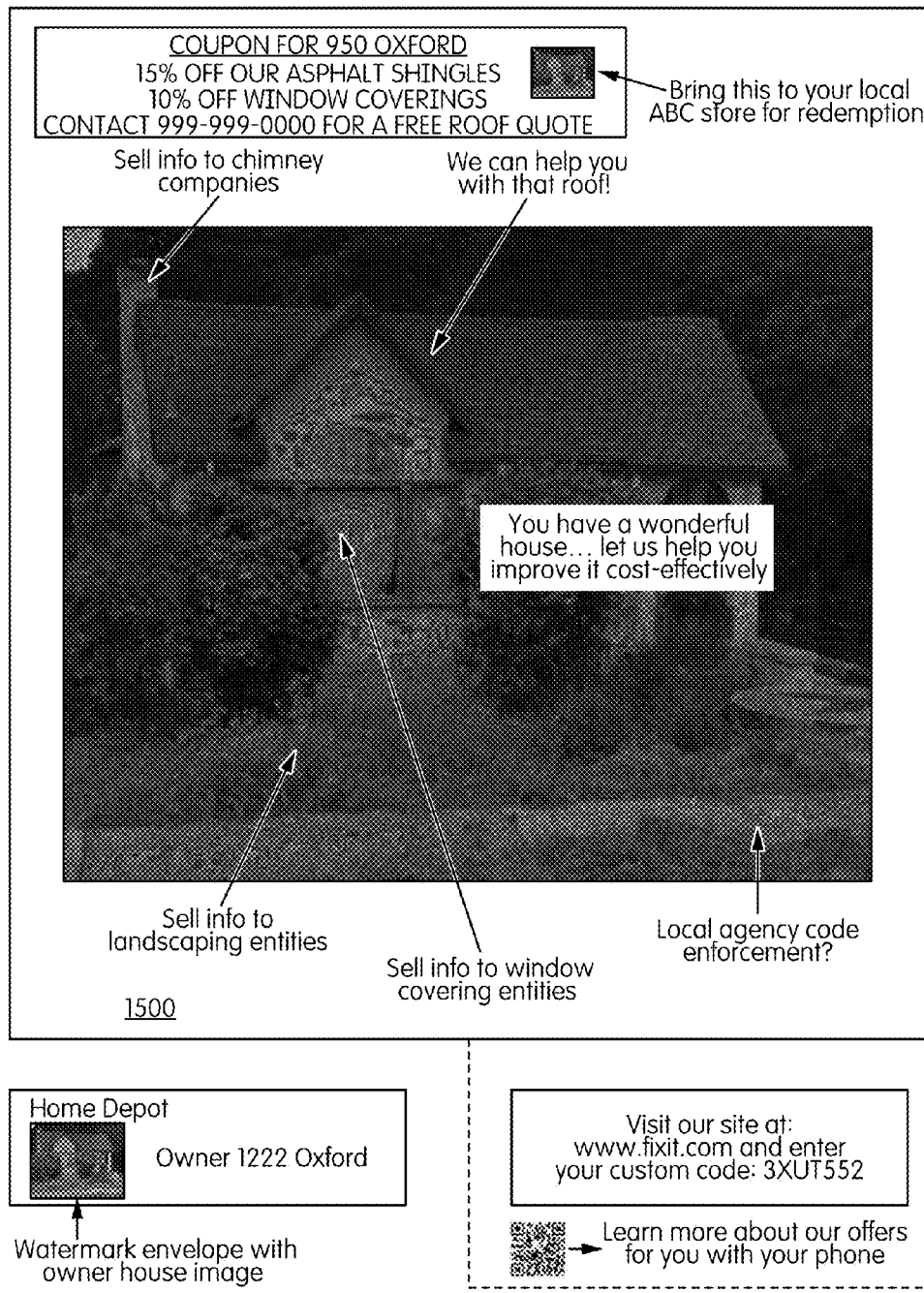
FIG. 15A provides an exemplary embodiment of a second variant of a targeted advertisement, customized delivery envelope and customized coupons generated for a property owner for a specific structure, products, services, etc. in accordance with embodiments of the present invention.
Figure 15B:
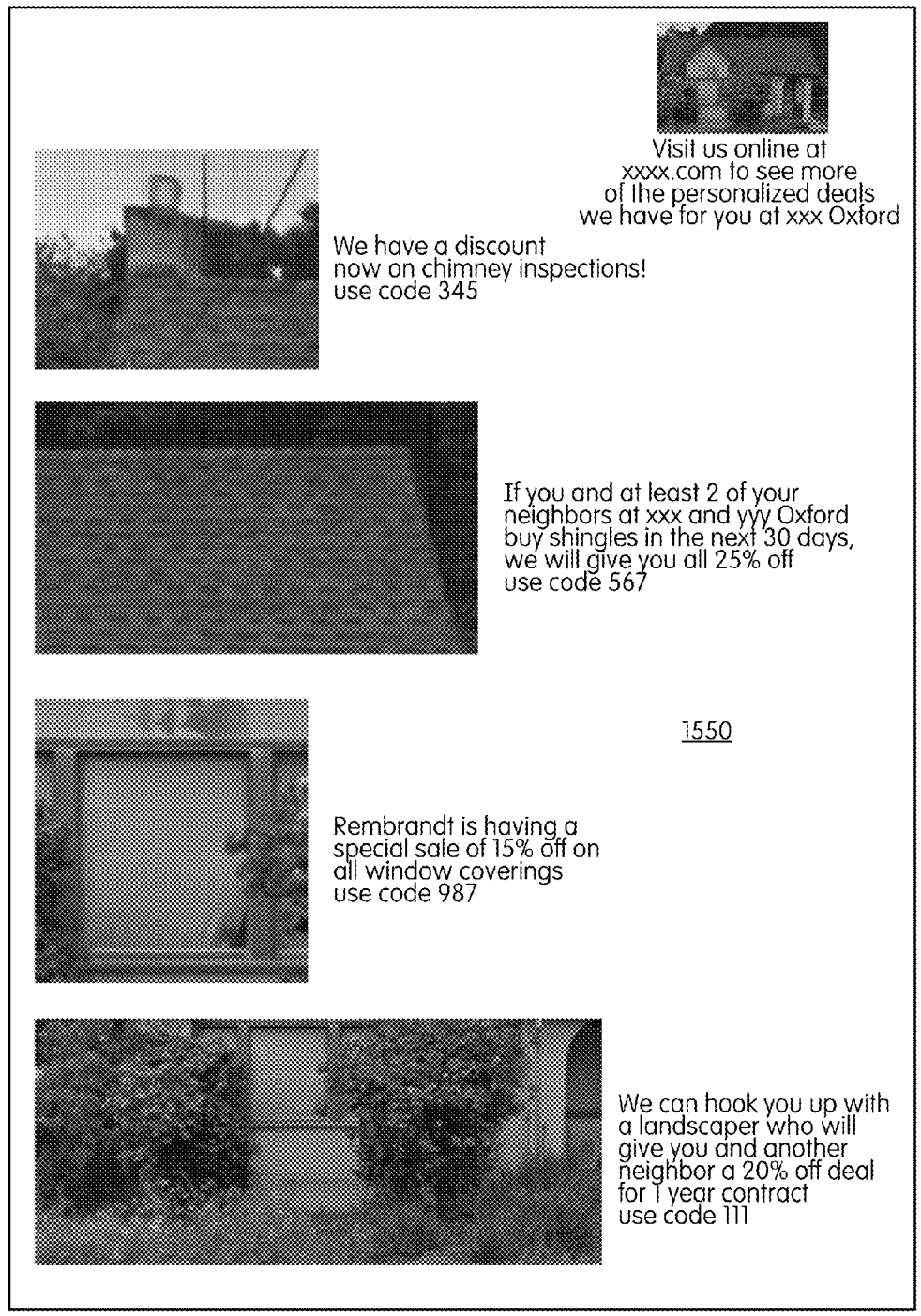
FIG. 15B provides an exemplary embodiment of a third variant of a targeted advertisement for a property owner for a specific structure, products, services, etc. in accordance with embodiments of the present invention.

FIG. 15B provides an exemplary embodiment of a second variant of a targeted advertisement 1550 with numerous customized sections including customized coupons generated for a property owner for a specific structure, products, services, etc. in accordance with embodiments of the present invention. In addition, a separate customized delivery envelope can be employed as well (see bottom left of FIG. 15A) to further personalize the message. As with FIG. 14 and the other embodiments, this information could be accessed and presented electronically as well within a conventional Internet-accessible interface.

This figure illustrates further that different components and aspects of the coded data can be customized and monetized for use by different service/product companies. For example information on chimneys, roofs, landscaping, windows, etc. can be captured and segmented for analysis and targeted marketing. Interior features can be captured and coded in the same fashion (hardware floors, carpeting, linoleum, tiles, etc.) As seen at the top section of the targeted ad, a coupon can be customized and generated with offers and discounts matched to particular conditions observed and identified at the particular structure. The content can be further tailored based on prior purchase and/or engagement behavior of the owner.

An owner of such property, therefore, can receive a different flyer and targeted advertisement based on the particular condition of their living structure, which may be entirely different than their adjacent neighbor(s). Each flyer or targeted advertisement may have different sections (identification, structure details, coupons, remediations, etc.) and with different content in each section. In this manner the present invention can micro-target advertising for specific individuals on a building by building basis to achieve superior results over generic mass marketing techniques. Conversely product and service companies can quickly and accurately identify promising leads for their business using more relevant information.

Other interaction mechanisms with the owner can be included in the advertisement as well, including URLs, barcodes and QR codes in another section of the advertisement (see bottom right of FIG. 15) that can be scanned by a smartphone to access content, and web based codes useable at an entity's website as well. These additional access points allow an owner to quickly and rapidly see additional targeted and tailored materials appropriate for their structure. Again group offers can be presented on such advertisement as well.

As alluded to above the marketing materials are preferably further customized for the homeowner by including a small graphic, image or icon of their structure directly on an envelope or similar mailer/flyer. This further reinforces the personalization factor and attractiveness of the materials for the individuals being targeted. Rather than receiving a generic flyer with their name and address, the present invention can present high quality, structure-specific content appropriate for their situation.

FIG. 15A provides an exemplary embodiment of a second variant of a targeted advertisement 1500 with numerous customized sections including customized coupons generated for a property owner for a specific structure, products, services, etc. in accordance with embodiments of the present invention. In addition, a separate customized delivery envelope can be employed as well (see bottom left of FIG. 15) to further personalize the message. As with FIG. 14 and the other embodiments, this information could be accessed and presented electronically as well within a conventional Internet-accessible interface.

Figure 16:
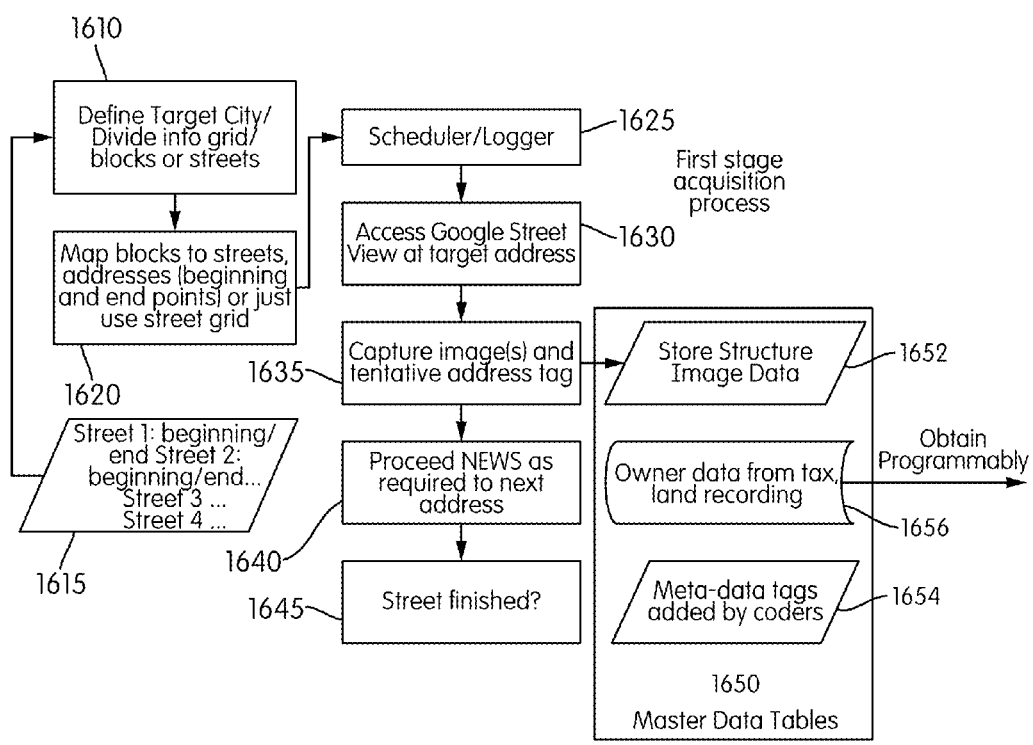
FIG. 16 illustrates a preferred embodiment of a data acquisition process used by a classifier of the present invention for building structures in a target city.

FIG. 16 illustrates a preferred embodiment of a data acquisition process 1600 used by a classifier of the present invention for building structures in a target city as it would be implemented on a customized structure assessment—targeted marketing computing system. The general purpose of this specialized computing module is to acquire appropriate image data for structures within a target area, along with accompanying address and owner biographical and purchase profile data if available. It is expected that the critical steps identified in this process can be implemented into executable software routines and modules using any number of ways by skilled artisans based on the present teachings.

At step 1610 a target city (or other convenient population unit) is divided into grids, blocks and streets by a human and/or an automated software program. Information identifying a beginning and end of each individual street, road, alley, etc, is used as well at step 1615 from any convenient database or similar source.

At step 1620 customized logical blocks are constructed by the computing system either from actual physical residential/commercial blocks, from boundaries established by street address ranges, or by any other convenient scheme that facilitates the present objectives. An automated scheduler/logger routine is also used at step 1625 to keep track of the progress and status of processing of each street, block, etc.

During step 1630 image data (and other similar machine captured data) for the building structure is retrieved for the target address in question. Again in a preferred approach this data is obtained from a third party vendor, but it can be generated as needed as well using any conventional techniques. For example it is expected that aerial drones, satellite, balloon and similar technology can be used in certain areas to easily capture structure image data from a variety of perspectives, and at different times. Because such devices can obtain image data different elevations, this will also facilitate building out a comprehensive image database. By taking pictures at later hours (including at night) such devices could also identify whether structures are inhabited or not based on the presence of lighting and other similar signatures. Appropriate safeguards could be implemented of course to ameliorate or at least reduce privacy concerns.

The building image and tentative address 1635 are tentatively tagged and stored as part of a set of master data tables 1650, including in a structure image database 1652. The structure image database can also include structure sub-images, which are based on automatically dividing the original image into separate blocks, or separate areas corresponding to distinct building elements using an image computing device. The subimages can then be used in targeted marketing for the target property instead of an entire structure image in some circumstances where it is desirable to highlight or focus on one or more particular elements, or where it may be considered less intrusive to the homeowner's privacy.

Owner data for such structure can be accessed automatically and stored in a database 1656 as well, along with optional prior home improvement data (building permits), vendor historical purchase data, line of credit data where it is available, etc. Metadata tags for each structure are stored in a database 1654 as they are coded. It will be understood that the format and routines required to access and store such data can be implemented in any number of ways based on the present teachings.

The automated process continues at step 1640 by proceeding to a subsequent address. Again this may be done programmatically or can even be done manually by a human operator navigating and accessing an image view of a street under consideration. When a street is completed at step 1645 the process can continue by selecting a different street until an entire target area is completed. To optimize targeting the scheduler logic may be programmed to discontinue image and data access when a density of structures falls below some threshold minimum. For example, in some suburbs and rural areas the benefits of logging and assessing specific structures may be less because of a lack of critical targeting mass. Conversely in large cities it may be less desirable to analyze large apartment buildings, and instead prioritize based on single family residences and small businesses. This approach may yield less comprehensive coverage for some areas, but can be employed to prioritize assessment and marketing. It will be understood that some steps are simplified for purposes of elucidating the key points of the present teachings and that many other steps could be implemented in accordance with any particular commercial application.

FIG. 17A illustrates a preferred embodiment of a structure coding process 1700 used by a classifier of the present invention for analyzing building structures in a target city. This process is used to capture and annotate data within an interface such as shown in FIGS. 10-13. It mirrors the process of FIG. 16 in many respects, and like reference numbers are intended to refer to like processes and structures. For example structures 1650, 1652 (image data), 1654 (metadata tags) and 1656 (owner data, profiles) are the same.

At step 1710 a coding process initiates preferably at one endpoint of an identified street. A scheduler/logging step 1720 keeps track of a completion process for any particular target area and street—address range set.

The image data for a particular target address is obtained at step 1725, along with a tentative address tag. Preferably this address information for the structure is confirmed at step 1730 to ensure that the targeted marketing materials (ads, flyers and envelopes) contain accurate information for a particular address.

At step 1740 an input coding overlay or coding template is presented to a human coder to facilitate annotating, scoring, etc. of a target structure image. This template tool can take any convenient form suitable for assisting a coder, and may have a number of pop up fields, pre-designated tags, and image recognition capability, etc. for performing a coding process. For example when a coder places a mouse over a roof portion of the structure, the image data may include some pre-processing areas with preexisting tentative feature designations to facilitate data input. Other features may already be automatically tentatively classified as noted above, so that the human coder is mostly used in a verification role. When a coder selects a portion of this area the template can present a tag already populated with the appropriate feature label, or a set of labels predicted to be present in the designated region. Preferably the tool includes predictive and error-control logic so that the user is constrained to use predesignated labels for features, types and conditions that become active as the user enters data into particular fields. It will be understood that any number of different techniques can be employed to collect the image feature data and the invention is not limited in this respect.

During step 1750 the input template is used by a coder to identify, classify and rate a condition of features in an image for a structure. Again in a first pass it may be desirable simply to identify only defects or only improvements. In some embodiments it may be desirable to code each image with contributions from multiple observers. For some applications it may be sufficient to collect data from volunteers contributing information ad hoc based on their informal surveys of structures conducted on a portable device such as a smartphone, tablet, etc., while they are in the vicinity or in the location of the structure in question. Any number of techniques can be used for this purpose.

During step 1760 a coder provides annotation tags as required by the template, and according to their visual inspection of the structure in question. Again because a significant amount of structural information—particularly defects or impairments—can be gleaned rapidly and easily by the human eye, the coding is expected to be relatively easy to perform, even for unskilled workers.

As alluded to above a structure image database 1652 can also include structure sub-images. During or after the coding process, the image for the structure can be automatically divided by an image processing system into different sub-images of different size, location, etc., which correspond to distinct building elements. Thus the coding database preferably includes both a tag, as well as a corresponding sub-image of a desired size to identify the element and its condition. The size and content of the image can be made uniform, or it can adjusted based on the type of element, selected by the coder manually using a conventional image cropping tool, or automatically identified and bounded by an automated classifier as noted above. Again these subimages can then be used in reports, responding to queries, creating targeted marketing for the target property (instead of an entire structure image) and so on.

The automated process then proceeds to the next address at step 1765 to facilitate further data entry by the coder. This is repeated by until each structure is coded as needed for a particular application. Again in some instances it may be desirable to divide the coding of structural information into distinct coder "experts" so that individuals with experience and understanding of facades may be employed to do that kind of work, while persons familiar with landscaping or roofing could be used for other components, and so on. By hyper-segmenting the identification/classification task, it may be faster and easier for certain coders to obtain proficiency at certain tasks and improve accuracy, rather than requiring them to master all identification tasks. A first team of coders may be dedicated to roofs, with another team to fences, landscaping, facades, vehicles, etc. Accordingly, a number of different coders can work on the same image data and provide a number of separate tags and annotations for the same structure serially or in parallel. The data can then be aggregated and updated as needed in metadata tag database 1654.

As alluded to above, in some instances an automated classifier can be trained to locate the features of interest, either as a complete data capture, or even simply as an initial pre-coded template that is reviewed by a human coder for accuracy and completeness. The final meta data template can be tweaked, edited, augmented etc. by a human operator. In this cooperative approach a machine can perform the bulk of difficult annotating/tagging and a human can do more of the fine-tuning of the results.

Figure 18A:
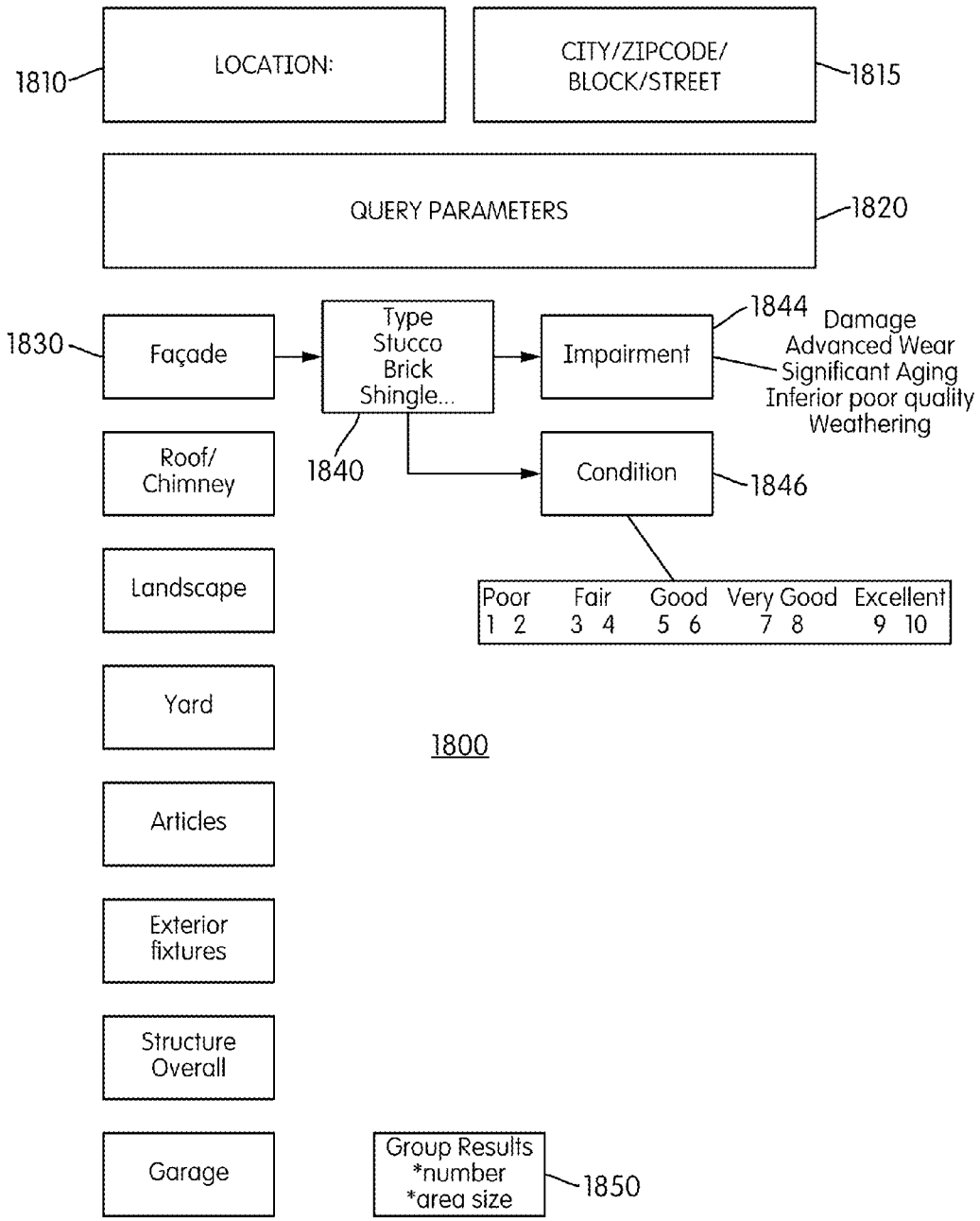
FIG. 18A depicts an exemplary embodiment of a query engine and interface that can be implemented in accordance with the present teachings to facilitate identifying relevant properties matching a particular target structural profile.

FIG. 18A depicts an exemplary embodiment of a query engine and interface 1800 that can be implemented in accordance with the present teachings to facilitate identifying relevant properties and homeowners matching a particular target structural profile. It is expected that this type of search tool can be used online over the Internet or some other network by vendors and service providers in any number of different industries to identify leads, generate reports and customized, targeted advertising such as seen in FIGS. 14 and 15.

As seen in FIG. 18A, a location 1810 can be specified, and, if desired, a particular zip code, city block, street, 1815 etc. Other query parameters can be provided within a search field 1820 and the invention is only limited by the features that are captured or derivable from the coding data. For example a vendor or user may filter leads by whether they are already existing customers or not of such vendor. Other income, demographic and similar owner profile data can be incorporated as desired as well.

To facilitate use, the search engine may include a number of predefined fields 1830 corresponding to coded searchable features in a building—structure set. The features can be associated and filtered by type field 1840, as well as preferably by an impairment 1844, condition 1846, etc. In some applications a vendor can be given a visual search field for a query based on impairments 1844 and/or condition 1846, so that a variety of exemplar images are presented corresponding to each categorized condition. The vendor therefore can thus easily glean what types of conditions are associated with a particular feature across a spectrum of classified values—i.e., what constitutes a poor condition shingle (level 1) an excellent condition shingle (level 10) and so on. For example a user can specify that they would like a result set of all structures in Berkeley, zip code 94709 which have shingle facades and that are below average condition (level 5). Other default values could be used to review all structures in a particular area, with sorting and reporting capability as well.

Furthermore a vendor can specify that a result set should be grouped using a query construct selector 1850. For example the vendor can specify that a result set from the query engine should logically group structures within a particular area (e.g., a cluster of 4-5 houses or an entire city block) and in a particular number (say 10) which share a common feature, type and/or condition or rating. This information can be used as leads for developing group discounts and promotions.

FIG. 18B depicts a typical report 1860 as it could be generated by a query engine 1800, in response to a basic query such as identifying all structures in a particular city block that have shingles as a facade, and which are below average in condition. The report can identify the fields listed, as well as any other desired data maintained by the platform for vendors. Preferably the specific address or other contact information is masked in most instances to prevent poaching of the data by competitors or the vendors. In some instances it may be desirable to allow vendors to see at least partial image information to confirm that they want to target the customer in question. This depiction of a sample report 1860 is not intended to be exhaustive of course, and other formats, fields, and features will be apparent to those skilled in the art from the present teachings.

The specialized interface and functions of structure feature query engine 1800 and report generation can be implemented using appropriate computing systems adapted with software to perform such functions in accordance with the present teachings.

Figure 19:
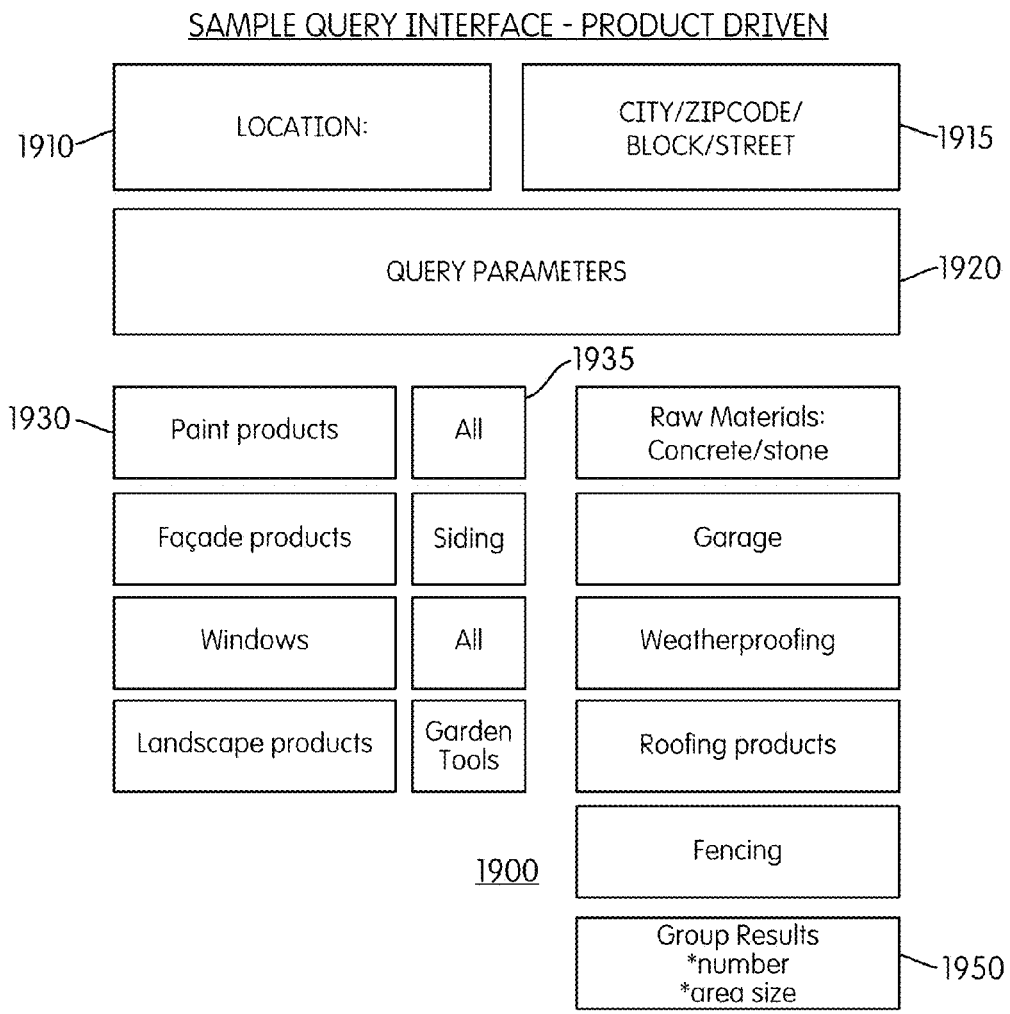
FIG. 19 depicts an exemplary embodiment of a query engine and interface that can be implemented in accordance with the present teachings to facilitate identifying relevant properties matching a particular target product profile.

Looking at it from another perspective, FIG. 19 depicts an exemplary embodiment of a query engine and interface 1900 that can be implemented in accordance with the present teachings to facilitate identifying relevant properties matching a particular target product profile. Where apparent, like reference numbers are intended to refer to similar structures and functions identified in FIGS. 18A and 18B. For example a vendor/service provider could specify a particular location 1910 (a city) and/or narrowed to a particular area 1915 (zip code, street, block) and specify a variety of search parameters 1920. In the example of a home improvement entity, they could request a result list that included leads for product field 1930 such as "paint" with a type field 1935 of "all," or structures that require siding facades, and so on. As with the interface of FIGS. 18A and 18B, this logic could be implemented on a webpage at a website in any convenient form and accessed through a browser or mobile device. Similar queries for building stock matching other criteria can be solicited according to vendor product categories, such as weatherproofing, raw materials, etc. A result set could look like that shown in FIG. 18B, but instead include a ranked listing of structures in the designated area according to a predicted need for the product in question.

Furthermore as alluded to above, a vendor can specify that the result set should be grouped using a query construct selector 1950. For example the vendor can specify that a result set should logically group structures within a particular area (e.g., a cluster of 4-5 houses or an entire city block) and in a particular number (say 10) which may be good leads for a specified product or service. This information can be used as leads for developing group discounts and promotions. The interface and functions of structure feature query engine 1900 similarly can be implemented using appropriate computing systems adapted with software to perform such functions in accordance with the present teachings. It will be understood of course that other features could be implemented in such interface(s) as well.

Figure 20A:
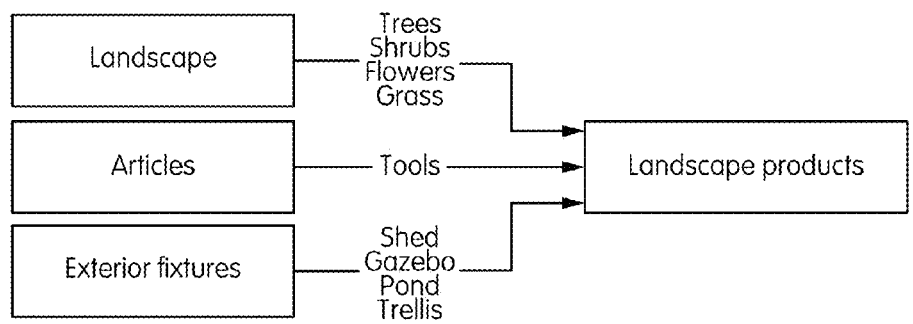
FIG. 20A depicts an exemplary taxonomy that can be employed to map structure features, impairments, etc., categories to respective product/service categories, or vice versa to facilitate responding to queries and identifying prospects for customized advertising.

To facilitate the operations of search engines 1800 and 1900, FIG. 20A depicts an exemplary taxonomy that can be employed to map structure features, impairments, etc., categories to respective product/service categories, or vice versa to facilitate responding to queries and identifying prospects for customized advertising. This taxonomy may be centralized and made generic for basic mappings, but it is expected that each vendor will customize or tailor a mapping of a set of features, types and conditions to their particular product line. This can be gleaned by such vendor using their own proprietary logic for ascertaining the correlation of identified features and their product line(s). For example a landscape company may determine through correlating products and features that their targeting should be made to specific structures which have certain landscape annotations, include certain articles (garden tools) and/or which have particular exterior features (sheds, gazebos, ponds, trellis) etc. A roofing company may consider not only a type and state of a roof but also whether other prominent improvements are present, potentially indicating a homeowner predisposed to invest in improving their property. An insurance company may determine that owners with well-kept properties file fewer claims, and so on. Other companies may employ their own taxonomy and correlations to define appropriate queries that best map to their customer intelligence data. The present invention enables a large ecosystem of prediction—recommendation approaches to be used in the final matching process because it collects a large number of diverse feature items which can be analyzed in a myriad of ways.

In addition to exterior features it is possible of course to identify and map opportunities for interior projects using embodiments of the present invention. For example, a homeowner may be interested in a new kitchen floor, new cabinets, new countertops, new fixtures, etc., or a new bathroom, bedroom, etc.

To assist the homeowner, a pre-configured digital image template can be presented, with all necessary or available features presented and coded for the user's review and input online. As seen in FIG. 20B for example a user wishing to do a remodel is offered either to start with a brand new model kitchen, or to work from an existing kitchen. A mock-up is the presented to the user to allow them to see what items can be replaced, upgraded, etc. The user simply has to identify each feature in their own particular situation that they want to address, and provide some basic information on type, condition, etc. For example a user can identify that a current flooring is linoleum, and a desired replacement is tile. This data can be implemented much in the same way the coding tool described above is implemented for capturing exterior condition data. The homeowner can be directed or walked through an image capture process that is tailored to the particular project or room. The precise parameters for each project can be specified by the merchants or service providers, or the ad serving platform.

Figure 20C:
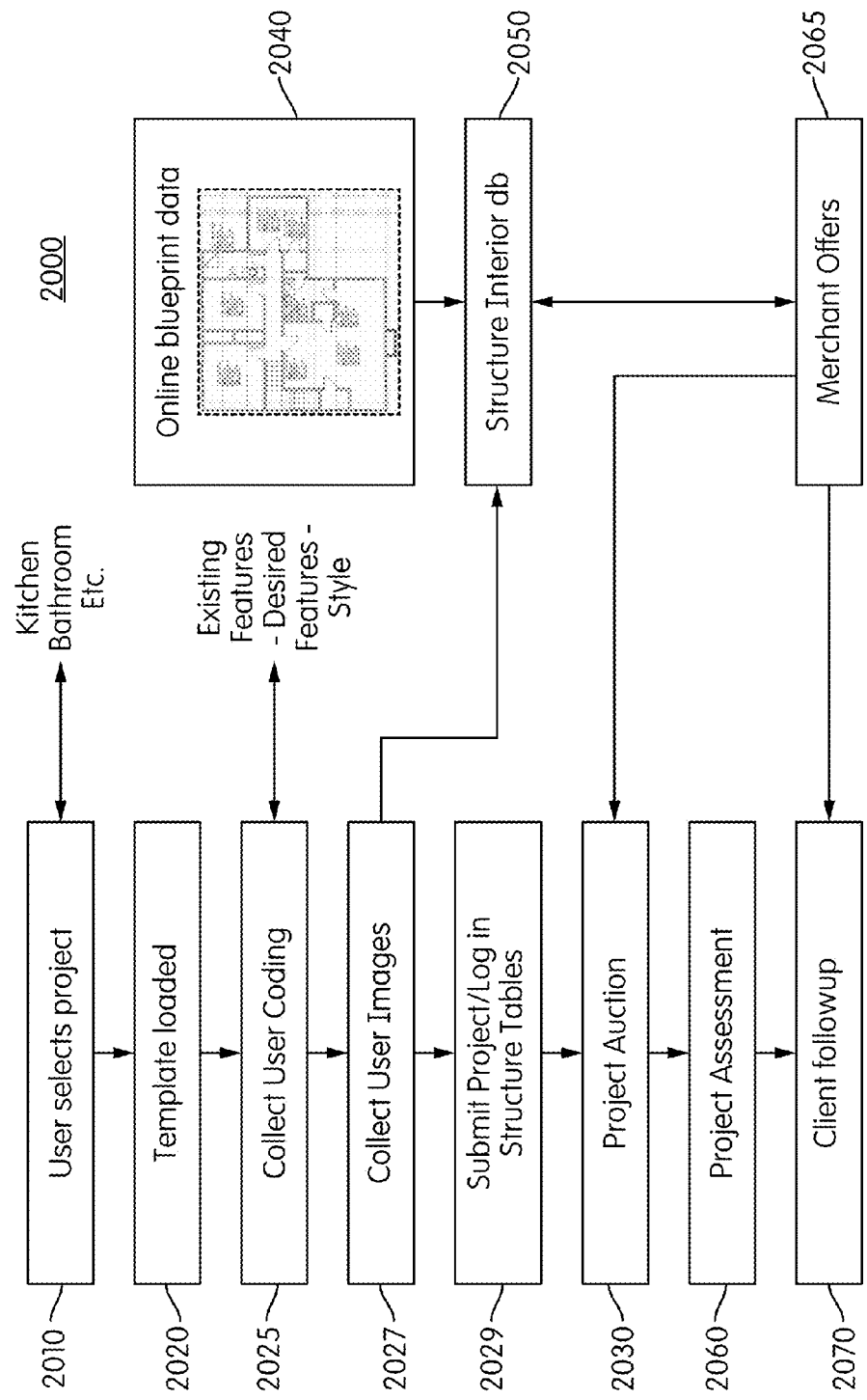
FIG. 20C shows a block diagram of an exemplary automated computing process that can be employed to assist homeowners and merchants coordinate for remodeling and renovation projects.

An example is shown in FIG. 20C of an exemplary automated computing process that can be employed to assist homeowners and merchants coordinate for remodeling and renovation projects. All of these steps, again, can be implemented on a customized computing system adapted with appropriate software modules to execute code to effectuate the steps noted in FIG. 20B and render customized, targeted advertising material for the user. The result is a report, an estimate, or an offer from a merchant that is again custom tailored to the user's particular circumstances.

As seen in FIG. 20C a user selects a desired project at step 2010, which may be an interior project, or an exterior project. In this example the user may select to remodel a kitchen as seen in FIG. 20B. A template 2020 is then automatically loaded within the user's browser or other viewing platform to permit them to code their desired remodel with appropriate parameters. Images from the user's existing property may be collected at step 2027, either directly from the user (through a mobile device, a local camera or other means) and/or from a structure database 2050. The latter may be supplemented with online blueprint data 2040 as discussed below.

The user then preferably identifies specifically both an existing feature, condition, etc., and a target or desired feature, type, condition, etc. This is repeated until the user has coded all the features they wish to be targeted and addressed by merchants and contractors. During step 2029 the user submits the project (preferably online) which updates all structure tables as well.

During step 2030, which may be done in real-time or off-line, a series of one or more project auctions are conducted (see discussion below for FIG. 25A, process 2530) to identify winning merchants, contractors etc. who are permitted or qualified to view or bid on the user's project. The merchants may bid against each other in the manner described below for FIG. 25A. Merchants who participate and succeed in such auction can then process the project data to make assessment at step 2060. For example a vendor may determine that the project exceeds a certain desired threshold, or alternatively is too small and may decline to participate further. In any event the processing of the project data may be done with reference to any number of standard techniques that are used for estimating renovation costs.

Should the merchant wish to propose an offer, they may elect to do so at step 2065. This offer is then presented to the client and follow up can commence at step 2070. It will be understood of course that multiple merchants may bid on the same project, and/or that the projects may be partitioned automatically into separate pieces or categories depending on the renovation. For example a floor job and materials may be separated out and bid on separately from a fixture renovation, cabinet replacement, etc.

While the example of a kitchen renovation is given, it will be apparent that improvements for other interior aspects can be similarly designed in a manner that permits a homeowner or user to quickly identify and define a condition of an existing structure, and desired remediation. For example to provide a remodel or closet upgrade, photos or data of the existing closets can be uploaded, with sufficient onsite information (size, shape, etc.) to assist user in capturing relevant data in an interface (see FIG. 20B) and assist a merchant/contractor in assessing the lead and providing a reasonable estimate of repair or renovation.

By capturing and analyzing the information ahead of time, a merchant and/or local contractor can rapidly assess and present a meaningful review and proposal to a homeowner at a first meeting, rather than waste time collecting onsite information during an initial visit.

In some instances where online information exists for the structure in question—such as electronic blueprints—it may be possible to process and consult such data at step 2040 as well as part of an estimation service. Many local agencies require that homeowners provide such detailed drawings as part of remodels. From this layout/schematic information the identity, size and shape of rooms is typically identified for individual property structures. If metadata or other data is available and/or can be derived from such repositories, a merchant or service provider can better assess opportunities as well by calculating a number of square feet of each room, a number of windows, number and size of closets, patios, and so forth. A layout database of such features can be compiled, either directly from such blueprint data, and/or from other sites that have interior information contributed by occupants of such structures (homeowners or tenants).

In other instances a user's social networking account can be mined for relevant interests and possessions. For example pictures of an individual may include background scenes, identifiable objects, etc. With the user's permission these items can be image processed, and tagged to identify relevant items.

Any form of image data associated with a user profile, or user collected data, can be compiled and targeted by an advertiser. For example user or member photos on a social networking site can be analyzed, dissected, etc., to identify relevant objects, concepts, etc.

An advertiser on such network can designate to be matched against such recognized objects, and/or to be matched (based on some threshold) by comparing the advertiser's reference object image to a potential customer's captured image (or sub-image). For example an advertiser may want to target homeowners/users who have certain breeds of dogs; by analyzing photos of users' dogs, and matching them to a profile provided by the advertiser, an index can be determined of potential candidate matches.

Similarly in most advertising contexts an advertiser knows the value of the item they are promoting to the user. In the case of an unconfirmed property prospect, a vendor must rely on estimates of the economic advantage afforded by the lead. Accordingly a property prospect file should contain sufficient information to permit a vendor to accurately estimate a value of an opportunity presented.

Figure 21:
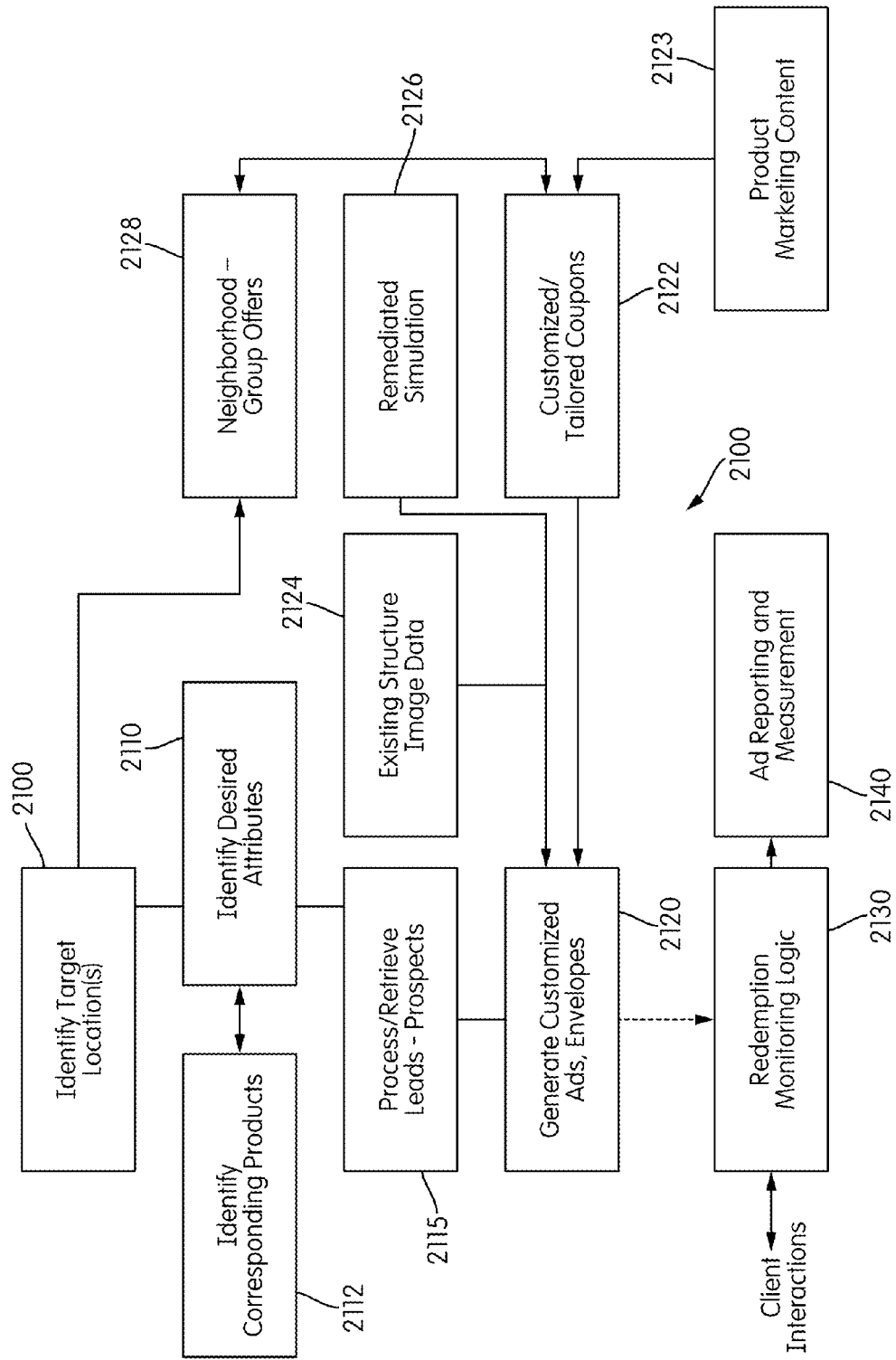
FIG. 21 depicts a preferred embodiment of a preferred tailored advertisement marketing engine implement in accordance with the present teachings.

FIG. 21 depicts a preferred embodiment of a preferred tailored advertisement marketing process 2100 implement in accordance with the present teachings. A marketing engine preferably runs on a customized computing system adapted with appropriate software modules to execute code to effectuate the steps noted in FIG. 21 and render customized, targeted advertising material such as shown in FIGS. 14-15.

As see in FIG. 21 target locations 2100 are specified by a vendor. Desired structure features (FIG. 18) and/or product attributes (FIG. 19) are specified as well at step 2110. For each targeted feature, a corresponding product or service can be automatically associated by the vendor using step 2112. An automated process then retrieves a matching set of prospects at step 2115. The matching set can take any form, including with details on the structures such as size, type of house, a listing of impairments, partial image information, etc., broken down by any convenient field, including location (city, block, zip code, etc.)

For some or all of these prospects a customized ad and mailing envelope is generated and prepared at step 2120, with exemplary embodiments shown in FIGS. 14 and 15 or any other suitable form. The marketing materials are synthesized from a set of structure image data 2124, and include a set of customized—tailored coupons 2122. The content for the ads, coupons, etc., is preferably provided by the individual vendors at step 2123, so that it can be integrated and presented in a form suitable and compatible with their branding, marketing look etc. If desired a simulated remediation image can be generated at step 2126 and presented with the marketing materials, to help a homeowner visualize a proposed new state based on the offer provided. Neighborhood or other group offers can be generated as discussed herein and incorporated at step 2128 as shown as well.

The advertising-marketing materials are then distributed in any convenient form, including hard copy, electronically, through email, etc. Redemption monitoring logic preferably identifies engagements made by homeowners, records types and dates of product/service purchases, group behaviors, and develops homeowner profiles during a step 2130. These interactions can be measured and reported on by another automated process at step 2140 to provide feedback to vendors and to update structure and homeowner profiles.

Figure 22:
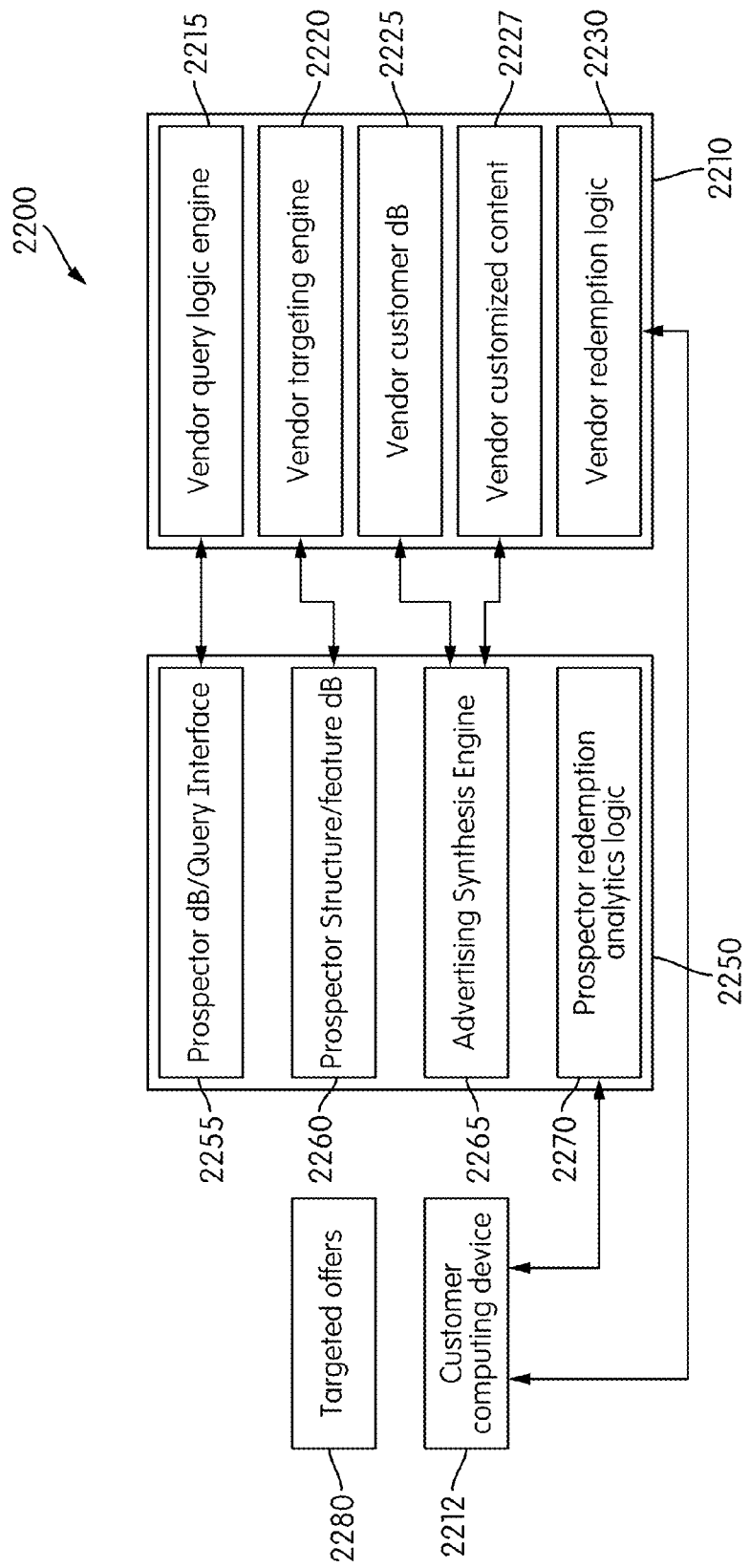
FIG. 22 shows a block diagram of a preferred embodiment of an overall direct marketing system implemented in accordance with the present teachings.

FIG. 22 shows an overall architecture of a direct customized—targeted marketing system 2200 implemented in accordance with the present teachings. In this system there are three main participants: 1) customers; 2) targeted advertising providers; 3) vendors. While these labels are used for purposes of explaining the present invention(s) it will be apparent that other identifiers could be used for these entities.

As seen in this diagram, Customers interact through their computing devices 2212 with a vendor computing system 2210 and a direct targeted advertising platform 2250. These computing systems are include servers, routers, storage devices, databases and customized program code adapted to implement the functions noted herein.

A vendor computing platform 2210 includes a number of components, and may be coupled or associated to a vendor website. As noted above, Vendors may be providers of products and services as noted above. As such they have their own proprietary database 2225 of customers, transactions, etc., which can take any number of forms.

A customer targeting engine 2220 is configured with inputs and analytics that are unique to the vendor, in that they identify, quantify and correlate customer behavior, adoption and engagement with that vendor's products/services. This automated logic informs and drives a vendor's marketing logic, in that it identifies and optimizes marketing and advertising for an existing and targeted customer base. This information may be derived from external sources as well, including surveys. For example, a company selling high end window products may target existing homes in particular zip codes based on weather characteristics, home owner income, time of year, etc. Other forms of targeting can be considered as well.

In some embodiments a vendor may be given other options as well to "piggyback" on a targeted flyer or advertisement with vendors of other products that do not directly compete. To achieve this a vendor may be given a white list of products that are acceptable for co-marketing, or even a set of products or co-vendors that are preferable for partnering. As an example a provider of pool products may designate that they prefer to partner with providers of landscaping products, and so on. Conversely a vendor may be given an option to exclude co-marketing with specific entities, products, etc. in accordance with their own advertising campaign(s).

A vendor can engage with a direct marketing platform 2250 with a query logic engine 2215 (see FIGS. 18, 19) that is informed and programmed with inputs from the targeting engine. That is, the query logic can be configured to automatically solicit leads from platform 2250 through prospector interface 2255 that match one or more vendor specific criteria. For example, a query may specify that the desired lead or result list should include houses with new roofs but broken fences in a particular city, and so on. This information is extracted from prospector structure/feature dB 2260 in the manner noted above. Again the variety of queries and targeting options is expected to vary in accordance with each vendor's specific knowledge set of its customers' behavior, needs, purchases, etc. Regularly updated feeds of lead data may be provided by platform 2250 as well. As will be apparent to those skilled in the art, the vendor platform 2210 may be repeated in distinct discrete installations or as part of a grouped cloud configuration servicing a number of different vendors.

Platform 2250 facilitates and informs operation of targeting engine 2220 and the two can cooperate to educate and optimize a vendor's marketing. Access to platform 2250 is preferably controlled and monetized with each vendor on a query basis, a subscription basis, a lead/result basis, a type of query, etc. For example queries directed to certain types of high end products may be priced differently than for less expensive bulk products. Note that if the results of the marketing, advertising efforts are successful, an operator of platform 2250 may be further compensated in accordance with monetization events achieved from direct marketing efforts made on behalf of vendors, including through flat rate payments, commissions, etc.

Note further that to preserve its proprietary data and correlation intelligence an independent marketing platform 2250 operator can provide a sanitized or redacted lead list to a vendor, which report contains sufficient information to inform the latter of a matching list of structures that meet desired criteria, but does not include all address, structure or owner information. This prevents usurpation of the efforts and systems of the direct marketer. For example a vendor of façade products could be given a list identifying a number and ID of houses in a particular zip code, block or city that uses shingles, or both shingles and stucco, and so on. In some instances partial or whole images of the leads could be presented as it may be difficult or at least not commercially impractical for a vendor to reverse engineer an address from an image alone, especially if it has been masked appropriately to prevent identification of an address. This information nonetheless informs and permits a vendor to determine if such leads should be targeted, and, if so, how. The vendor can further generate their own correlations, as well, based on such reports and feedback from redemptions with logic 2230, to determine how to optimize their marketing.

In addition a vendor can elect to share at least limited portions of its own customer db 2225 with the advertising platform to improve correlations and targeting. By providing such data to an advertising platform 2250, the latter can correlate specific customers to specific purchases, behavior, etc. and provide additional insights. For example a vendor may want to know that in a result set of structures in a city that have shingles and stucco, a significant portion of such owners also purchased another set of one or more specific products from such vendor. Absent being able to cross-correlate address and owner information, it would be much harder to glean such useful insights.

Over time of course a marketing platform 2250 will build and construct its own redemption/behavior database as a result of engagements with customers of the vendor. Thus it is expected that the two operations and collections will overlap to some degree over time and they do not have to be mutually exclusive. By sharing selected information the two entities can achieve significant synergy.

To create a desired look and feel for targeted offers 2280 (see FIGS. 14 and 15) a vendor may have their own customized content 2227 that they can insert into the targeted sections shown in these mailers, flyers (whether in hard copy or electronic form). For example the wording of a marketing pitch, specific images/graphics, etc. can be specified by a vendor for inclusion in a targeted advertisement. This information is then used by an advertising synthesis engine 2265 which combines the data from the vendor (and potentially other compatible co-marketing vendors) to generate a tentative targeted offer (not shown) for entities in a particular result set. In some implementations a vendor is then permitted to inspect the content for the targeted material in advance to approve or veto the final product. This process can be iterated until a desired format and substance is achieved. In the end targeted offers 2280 (in the form shown in FIGS. 14, 15, etc.) are delivered by mail, electronically, etc. to individual customers.

In some embodiments an advertising synthesis engine 2265 includes an automated auction component. This auction logic can be implemented in applications where multiple vendors are attempting to target the same or similar products to the same or similar structure prospects. For example two different vendors A and B may desire to target window products X and Y respectively to structures/owners which meet a certain threshold condition. The auction logic can be programmed so that for any particular time window, or batch of targeted offers, only one vendor is permitted to be included in such 2280. Alternatively the offers may be time or batch "blended" so that multiple vendors can pitch the same product to different structures in a target set, or even the same structure. Thus an offer 2280 in hard copy form may include targeted advertising from multiple vendors for the same product matched to the same building element/condition. In another instance an offer 2280 may make reference only to the structural element/impairment in the structure, and invite the owner with a designated code to visit an online site to see further information. This designated code is used to identify the owner, the structure, etc., and helps to facilitate targeted advertising by one or more interested vendors.

An auction process 2500 for matching vendor products to targeted structures is depicted in FIG. 25 and may be implemented in a similar process to that used in other environments which include automated bidding for ad impressions to users. For example Google's E-commerce Platform allows vendors to list items on Google's shopping engine in exchange for such entities bidding on keywords in queries.

In the present embodiments if the user is already registered as the owner (see FIG. 23) they can identify themselves directly at step 2510 and the auction engine can use this data to determine the target structure profile at step 2520. In instances where the user has received a targeted printed flyer, one or more control codes can be used to identify the user and property uniquely. In still other instances, a user's exact location can be determined with geolocation data from their smartphone or other mobile device, and this can be converted into address—property information. Accordingly a target structure, owner, etc., can be identified during servicing of a generic query presented at a conventional search engine site that is directed to home improvement products, even in the absence of direct knowledge of the user's identity. Note that customized ads generated in accordance with the present teachings can be presented as ancillary or supplemental property specific ads for a user, in the instance of a generic search query made by a user directed to other product data that may not even be directly related to home improvements. In other words a user making a query for product X (where X may be clothing or some ancillary item) at a search engine may be presented with personalized ads for home improvement products created based on the present teachings and which are micro-targeted to their particular living domicile—habitat. Alternatively the user may be targeted while they are on a third party site, a social networking site, etc. and their location is determined and used, and so on. This can be done even if the user is merely a tenant, as he/she may still then be motivated to implement the proffered improvements, and/or to alert/notify an owner of such offers so that they are followed up.

Figure 25A:
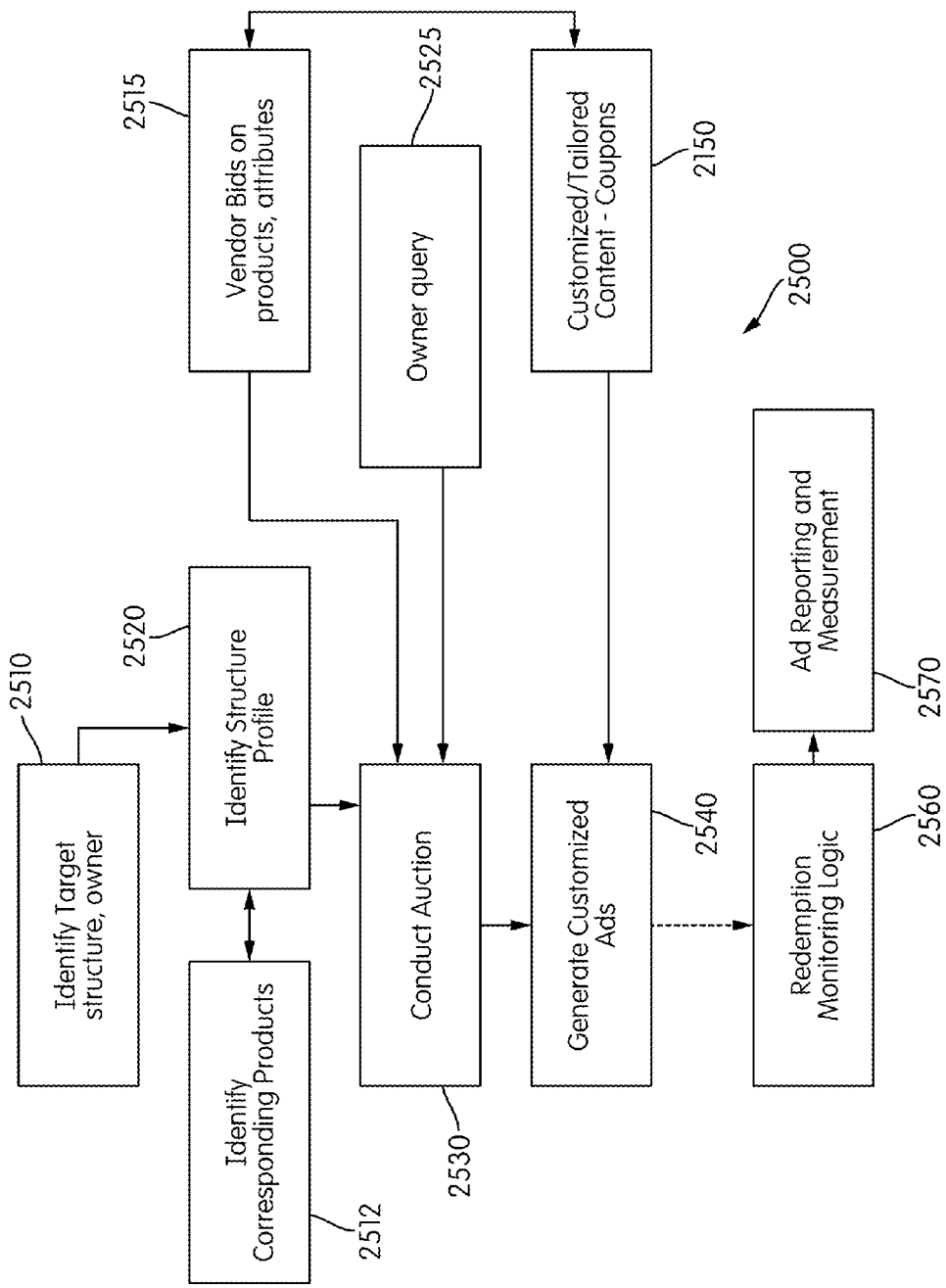
FIGS. 25A and 25B depict an exemplary auction process for matching vendor products to targeted structures in response to queries, including general keyword queries at a conventional search engine.
Figure 25B:
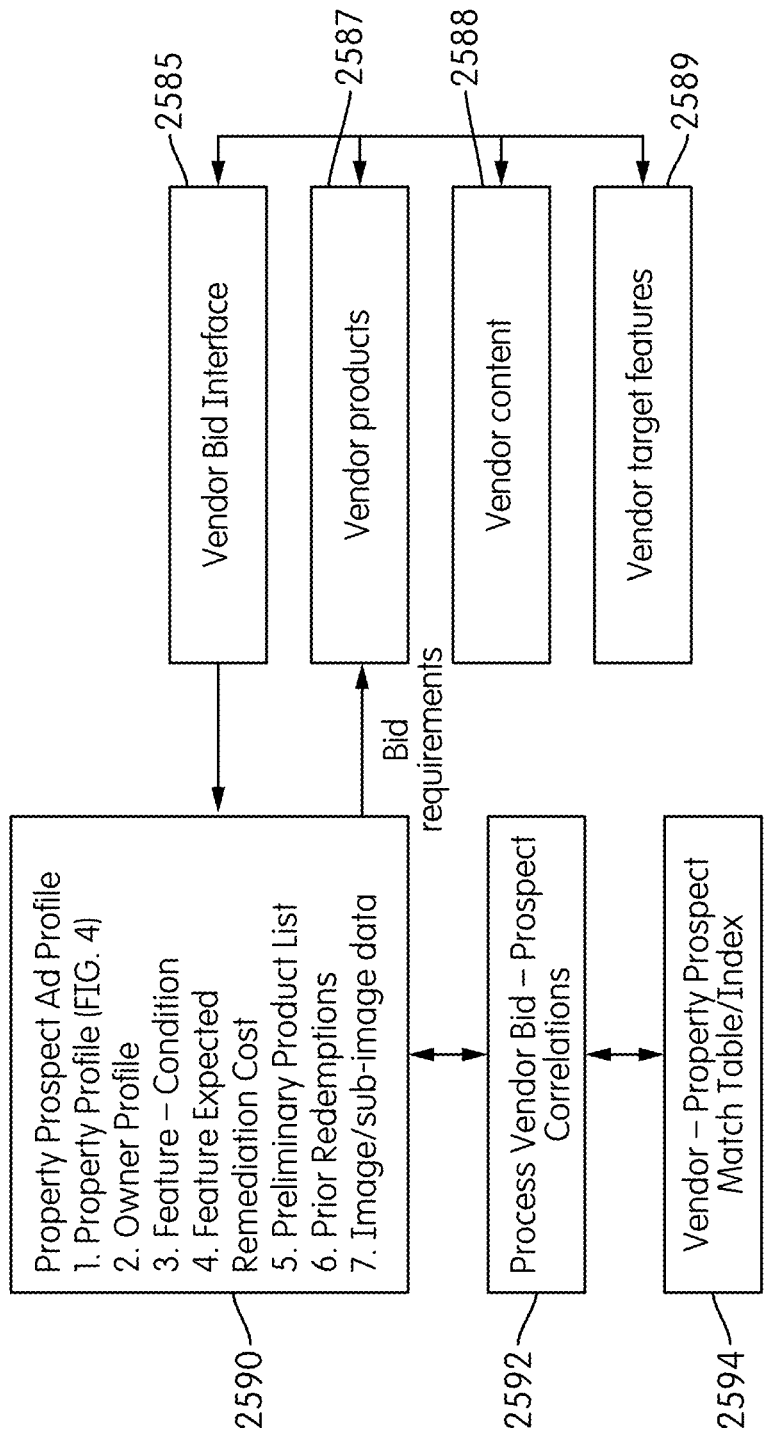

A preexisting tentative list of matching products may be pre-computed and used to classify target structure as well at step 2512 using the classifications and taxonomy described earlier (FIG. 20). At step 2515 vendors provide electronic bid inputs to the auction engine for specific products, structure/property attributes, conditions, or some combination thereof. This process is shown further in FIG. 25B. A vendor bid interface 2585 allows a vendor to upload vendor product information 2587, vendor content 2588 and vendor targeting features 2589. The vendor can then target property characteristics as shown at 2590, which are matched in a correlation step 2592 against a set of prospects. The prospects are then stored at step 2594 in a database for later use by an auction process such as shown in FIG. 25A.

Given the identity of the structure, an auction engine then conducts an auction amongst various vendors at step 2530. Unlike prior art keyword auctions, the auction in this instance is preferably based on bids made by vendors in accordance with: 1) existence of a particular building element or feature derived during the structure coding noted above; 2) a particular element type; 3) a particular condition; 4) one or more identified products predetermined and pre-computed to be germane to the target structure. For example a vendor may bid a price X to be permitted to present an ad for product Y to criteria that include a target structure meeting certain profile parameters, product needs, being located in a particular area, and so on. In still other embodiments, an estimated cost of repairs for a particular element, or an aggregate cost of repairs for an entire structure can be used as well for targeting. As noted above, estimate repair costs can be stored for a structure in database 142 as part of a structure rating 415. Thus a property profile may include information on a potential commercial remediation score, or value, either on a product-by-product or service basis. These individual scores can be targeted, either alone or in aggregate. For example a vendor can specify that they only want to target properties in which a particular product estimated net return is $X, or a total remediation estimate for the entire structure exceeds $Y and so on. An auction process can divide and tier the structures into distinct bins which can then be targeted to specifically by vendors and service providers. A final auction price therefore can be based on an expected potential return for the property lead in question. During step 2540 the customized advertisement is served to the user dynamically and on the fly in the form shown in FIGS. 14, 15A, 15B, etc., i.e., preferably in a blended form which includes both content from the owner's structure, and personalized content from the vendor integrated into a single document (here, a webpage).

In this manner embodiments of the present invention can effectuate new and unique forms of targeted advertising to users/consumers using criteria not used before. Other parameters will be apparent to those skilled in the art. The user can also optionally directly specify a query in the interface at step 2525 to receive offers on other products offered by such vendors. In some applications a vendor may elect to present an electronic coupon as part of the advertisement at step 2150, in the manner noted above. Redemption logic 2560 and reporting logic 2570 include similar functionality to their counterparts discussed below.

Returning to FIG. 22 a redemptions analytics logic engine 2270 monitors customer engagement with the offers, discounts, etc. Conversions can be identified and recorded in a proprietary database on platform 2250 and/or on vendor platform 2210. Because platform 2250 sits between different types of vendors and their customers, it is able to assemble and compile extensive competitive intelligence in cross-trade services and products. For instance, vendors who market pool products have little or no information or insights into housing paint marketing techniques or insights. Over time embodiments of the platform acquire massive amounts of cross-trade data that can be mined and exploited for identifying useful correlations and relationships which in turn can become a source of monetization. As an example it may be identified that purchase of certain products or services (P1, S2) presage or predict (by some correlation value R) the adoption by product P2 or service S2 within a mean time period T. The data may be further filtered or correlated according to city, zip code, street, or other geographic parameter. With such data in hand platform 2250 can optimize and speculatively market specific products to certain owners ahead of competitors. Other useful correlations can be gleaned of course as well.

While no system is foolproof or immune from data theft, embodiments of a preferred marketing platform 2250 have enhanced protection from commercial usurpations by customers or competitor misappropriation of lead/prospect data. In part this is due to the fact that the results reports (FIG. 18B) cannot be easily correlated to later customer redemptions. For example a window hardware vendor working from a prospect list that identifies 10 k leads in a small city may receive 500 responses. From these responses of course it determines an address of the customer, but it cannot readily match such response data to a corresponding lead on the prospect list (1860). Other techniques for protecting the platform's unique data and analytics (i.e., monitoring for data mining, throttling, etc.) can be implemented and/or will be apparent from the present teachings.

In some applications it may be desirable to let a user/owner register a specific property to receive a customized/targeted improvement package of proposed improvements, discounts, etc. for a structure at such location in real-time. This obviates the need for a user to request and then physically receive a solicitation at a registered owner property address. More importantly, a homeowner may wish to see a comprehensive evaluation that they cannot perform on their own. The owner can be incentivized by a "free" evaluation to engage with marketers of products and services they may never have considered.

However since it may be difficult to determine if a requesting user is indeed a property owner of the structure in question, an optional verification process can be employed to assist. Such procedures are already used by some online real estate marketing companies, such as Zillow, Redfin, Trulia, and others. Typically such verifications require a user to confirm or provide details specific to a property that are most likely known to the property owner but not to others. For example questions directed to an amount of a tax bill, a purchase price/date, etc.

As seen in FIG. 23, embodiments of the present invention can also implement a property/structure verification process 2300 to increase engagement with owners. This process preferably implicates multiple computing systems including a verification processor computing system, a user's mobile device, and other network connection devices (not shown). The verification system can be located either within the mobile device, and/or in part at a remote server computing system (not shown). Such systems can be programmed or coded using conventional techniques to receive, process and communicate to achieve the objectives set forth herein.

The preferred process primarily relies on an automated "proof of presence" determination that confirms that a user (or their device) is physically in or near the property of interest within an acceptable threshold of accuracy or risk. While this is of course not 100% reliable or determinative of ownership of a particular structure, it is a reasonably useful test in combination with other mechanisms to confirm or deny access to a customized structure report. This proof of presence technique can be used for other applications as well, including for verifying local residency for public benefits (schooling, mental health, other public programs).

At step 2310 a user identifies a particular property or address for which they want to see or gain access to a customized report such as those presented above in FIGS. 14-15 and so on. If the user is already registered and authenticated they can supply a password of course at step 2315 to an automated verification system and achieve access that way. In the absence of an existing account and verified access a user is prompted instead to provide contact information for a mobile device, such as a smartphone. During step 2320 a verification challenge is then presented to the user by a verification computing system, which challenge may take any number of different forms and implicate different data types, user knowledge base(s) and real-time feedback.

At step 2322 a cell/smartphone or other mobile device's location is determined. This can be achieved by an automated verification system using any number of techniques known in the art, including through identifying and processing GPS, cell-tower triangulations, Wifi network signals, etc. It is expected that in some embodiments a location determination process may employ random periodic sampling, meaning that the user is informed that the verification process may not occur in real-time, and instead may require a period of some fixed length, say 12-24 hours. In those instances the device can be interrogated randomly during different times, including at late hours when it is expected that the user will not be at some other physical location. Thus by exploiting the fact that the user is likely to be at home at such times (say 3-4 a.m.) the present verification process can confirm with reasonable certainty that such person is probably an owner or at least an occupant of the structure in question. Again this electronic challenge can be used with other applications, such as confirming that a person is residing in a particular school district. The user can be prompted as well to complete and confirm receipt of such confirmation codes to further bolster a robustness of the challenge.

In other instances a user may be requested to complete a challenge that involves a structured series or location varied set of steps. For example the user is prompted to depress a "find me" or "verify" virtual button on their device at different physical locations of the property. By comparing the different signals received at the different locations (for example at four corners of a lot) based on the measured strength of different WiFi systems at such different locations, or different GPS, etc.) a verifications system at step 2324 can assess if the user is likely present at the structure in question. Alternatively a user can be asked to provide input at locations both inside and outside the structure in question, which should again cause the signal strength to vary. Other forms of inducing measurable and significant signal variations unique to a location will be apparent to skilled artisans.

In yet other variants a user can be solicited to provide details about the structure (i.e., answer questions about features) or alternatively provide one or more real-time, time stamped photo(s) of the structure for verification purposes. A virtual outline image of the property can be presented in the user's camera viewfinder. The verification test can require the user to register an actual outline of the structure within such template in the viewfinder to confirm they are present at such location. Other examples will be apparent to those skilled in the art. Since embodiments of the present invention include data records containing image and other feature data, a verification challenge can leverage and incorporate comparisons to such preexisting data for improved accuracy.

Accordingly at step 2325 a location verification process is performed and completed using one or more of the above criteria, tests, etc. Again this particular test can be supplemented with additional conventional verification processes at step 2330, which may take the form noted earlier used in the prior art. During step 2340 a final determination is made to grant or deny access to the customized property report. Again in some implementations this may be made in real time when there are supplemental corroborating indicators of ownership, or it may be delayed pending resolution of further checks.

While it is of course preferable to ensure that only an authorized owner receives access to a customized structure report, it should be noted that the degree or extent of risk is reduced in the present applications because the discounts and/or promotions are tied to the structure in question, and/or are personalized to an owner of record. Accordingly there is little incentive for a third party to engage maliciously to impersonate an owner of a structure since they cannot avail themselves of the benefits of the customized promotions.

Figure 24A:
FIGS. 24A and 24B show a preferred embodiment of a vendor interface that can be used by a vendor to identify, create and target particular property structures in a geographic area.

FIG. 24A depicts a preferred embodiment of a vendor interface 2400 that can be used by a vendor to identify, create and target particular property structures with personalized content for particular products in a particular geographic area. Preferably this interface for creating personalized marketing campaigns is presented within a browser of a conventional small client computing device (desktop, laptop, tablet, etc.) and is supported and implemented by a number of software routines operating on a specially configured hardware computing system (such as shown in FIG. 1) that includes functionality as described herein. It will be understood that mobile versions of the interface can be implemented as well on smaller screens.

As seen in FIG. 24A, a vendor's product offerings are presented in textual and/or visual form in a first portion of the interface. Any one (or all) of the products can be selected for targeting to a particular geographic area.

A campaign planner for the vendor can preferably specify also in a second portion of the interface whether they desire to run independent or integrated campaigns for each product. For example, if the vendor selects three products, they can choose to independently target the prospects with separate campaigns for each product. In an integrated campaign the vendor can elect to have multiple products promoted and pitched in a single flyer. Similarly a vendor can opt-in to a shared or co-marketing campaign with other vendors for non-competing products as noted earlier.

In a third portion of the interface a result set is presented to the vendor for leads in the particular area, here a particular zip code. The leads can be presented visually in any desired form, an example here shown as green (good leads), yellow (average leads) or red (less promising leads). Other formats will be apparent to those skilled in the art, and in this respect the outputs of FIGS. 18A, 18B and 19 could be presented for example. The interface preferably permits a vendor to simply click/select any one or more of the regions in the lead spectrum to target such result set. A bottom lead indicator provides feedback on a total number of leads or prospects that match one or more of the targeted products. In other implementations other logic could be used, so that the lead list is constrained to those structures which require two or all of the products, and so on. The third portion of the interface is preferably capable of adapting dynamically to vendor selections in the search query portion, so that they can immediately get a sense of how many prospects are possible for particular products.

Figure 24B:
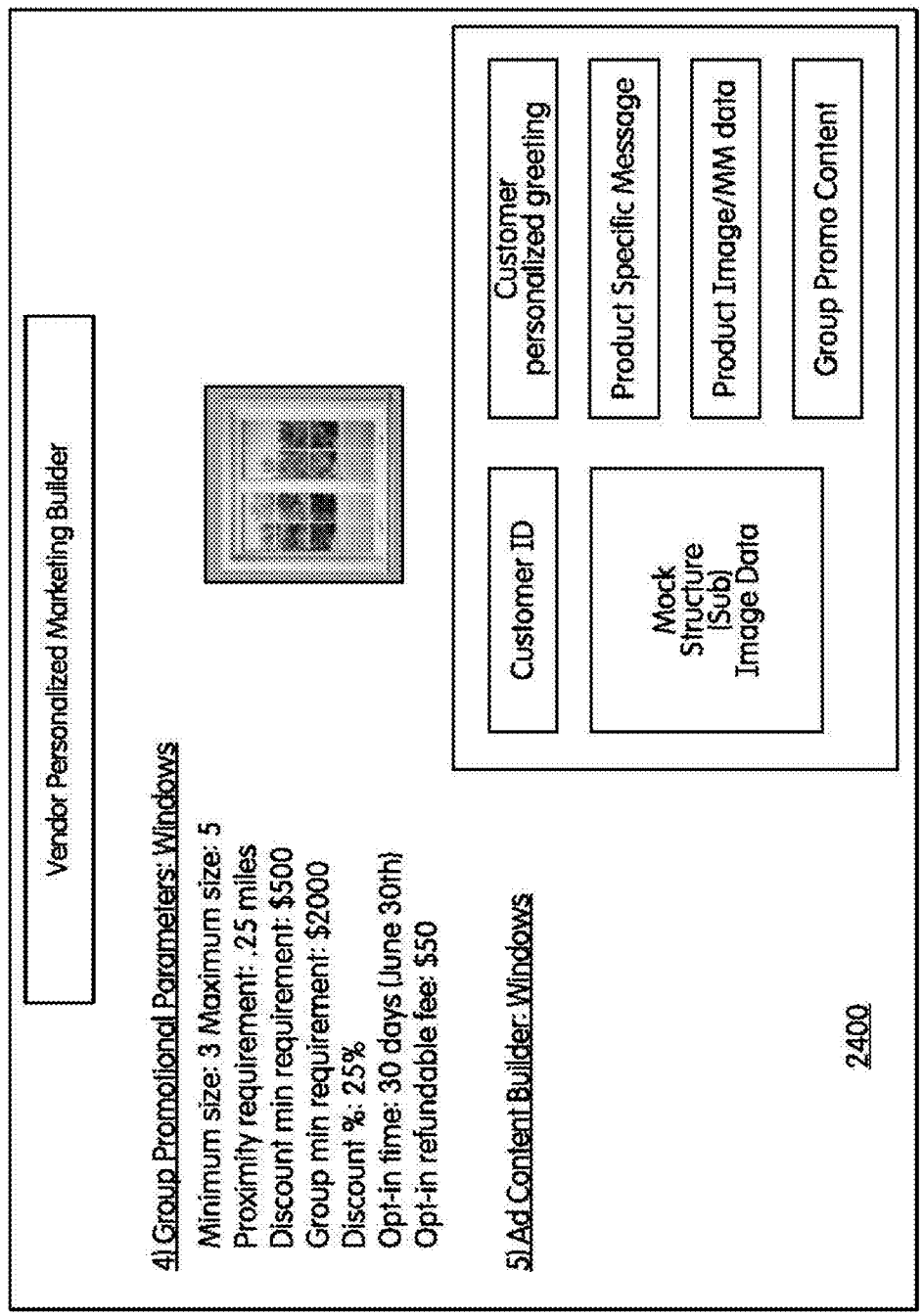

As seen in the second sheet of FIG. 24B a vendor can also specify group discount or coupon parameters in another portion of the interface 2400, on a product by product basis, as alluded to above. In the example shown, the vendor can choose a Minimum/Maximum size of the group clusterings, a group Proximity requirement, an individual participant minimum purchase requirement, a group minimum purchase requirement, a proffered discount, an opt-in time limit, an opt-in fee, and so on. In other instances where multiple products are combined, the group offer may require purchase of both products/services. Other examples and parameters will be apparent.

Finally an ad content builder can also be provided to a vendor to allow them to visually see a simulated mock-up of their content, and how it will be presented in final form by the advertising platform 2250 to an end customer. Ad content builders are available in other industries for creating customized materials, and such tools could be integrated herein as well. Preferably the advertising platform operator 2250 provides a format, layout and arrangement of the different content regions. A mock-up or placeholder for the particular structure-specific image data that will accompany the advertisement is presented in a first portion shown on the left. Additional areas for an address, customer ID, etc., are preferably reserved at well in some convention location. A vendor therefore can customize the advertisement to their liking with particular customer-specific personalized greetings, a product specific message (text, pricing, availability, etc.) product image data, product QR codes, URLs, and other references to help a customer perceive the relevance to the particular targeted structure. If elected by the vendor other Group promotional content is included as well, which may identify neighbors generally in a particular area, and/or by specific address in some cases. Again other examples of advertising/marketing building tools which are suited for exploiting the features and functions afforded by the invention(s) will be apparent from the present teachings.

Embodiments of the invention thus permit assessment of and predictions for building stock, including occupancy, individual and aggregate element condition, prospects for purchase, etc. While the main application is described in connection with assisting property seekers, real estate personnel and others to assess and develop leads for real estate prospects for single family residences, a number of other uses can be made of the data captured and processed by embodiments of the present invention, including:

1) Insurance: policy premiums, risk assessments, etc., can be based on an evaluation of an upkeep/maintenance evidenced for a particular property; in this respect correlations may be developed between property condition ratings, occupancy estimates and number of claims filed, type of claim, severity, etc. For example a property insurer is likely to be interested in knowing if a building is vacant and thus more likely to be vandalized or have a higher risk of arson, etc. Other potential hazards (trees that are too close or overgrown, dilapidated ancillary structures adjacent to a structure, undesirable and dangerous fixtures (trampolines etc.) can be identified by insurers and used to adjust premiums on a structure by structure basis. Other similar uses will be apparent to skilled artisans;

2) Air quality/pollution estimation: government agencies and other stakeholders are likely to benefit from long term, longitudinal studies of building structure appearances, as they can reflect air pollution and presence of other chemicals in the air deleterious to building façades (and potentially humans). The invention can be used to study and examine differences in large numbers of structures located in particular neighborhoods at different time intervals for this purpose.

3) Home improvement/construction: builders and suppliers of building materials will benefit from direct access to a database of building stock condition data. Queries can be made to determine particular conditions in particular building elements for enhanced targeted advertising. For example suppliers of paint products can quickly develop a targeted list of prospects likely to need renovation. Overall assessments and estimates can be made for repairs/improvements to an entire building structure simply from processing the image data. Other examples will be apparent from the present teachings.

4) Banks/appraisers: property "comps" for a particular target property can be based more accurately on other properties having an identical building envelope, architectural style, visual aesthetic, etc.

5) Aging of materials: if the image stock for the properties is updated, long term evaluations of wear/aging characteristics of individual building elements can be assessed over time. Estimates and predictions can then be made of the age of a particular façade element (paint, siding, roof) simply by comparing such elements to reference norms of a known age.

6) Plants/foliage: Frequently house seekers or other similarly interested parties desire more information on landscaping features of a property, such as the identity of particular trees, flowers, plants or other foliage. Again such information can be captured by the on site viewers using a camera and matched against entries already logged in database 142, or some other database. For example users may capture publicly viewable foliage information at a location, tag it with appropriate descriptors, and make it available to other persons. When a second user visits the site later, there may be preexisting entries for the foliage in question which can be queried against to identify plants, flowers, trees, etc. Alternatively in some embodiments it may be possible to perform an image match against a botanical image database (not shown) which can determine the identify of such plant items. In this manner the natural elements of a neighborhood may also be mapped out to allow for identification of particular types of flowers, trees or plants of interest. For example walking/nature tours could be divined from identifying specific property locations of prominent rose plants, oak trees, or other foliage in particular neighborhoods. This would facilitate further neighborhood exploration by local citizens interested in mapping out the natural elements of their environment and surroundings.

While the primary uses for some of the advertising materials are expected to be structure-specific, it is entirely possible that other providers of goods and services (doctors, dentists, etc.) may be able to exploit competitive intelligence in the aforementioned platform 2250 for purposes of piggybacking their own advertising content.

In general, by comparing publicly recorded owner data, including age and other demographics against building structure condition data, additional insights and useful correlations can be developed and exploited. It will be understood by those skilled in the art that the above are merely examples and that countless variations on the above can be implemented in accordance with the present teachings. A number of other conventional steps that would be included in a commercial application have been omitted, as well, to better emphasize the present teachings.

It will also be apparent to those skilled in the art that the modules of the present invention, including those illustrated in the figures can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore, in some instances, a portion of the hardware and software will be contained locally to a member's computing system, which can include a portable machine or a computing machine at the users premises, such as a personal computer, a PDA, digital video recorder, receiver, etc.

Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art. Such code, routines, etc. may be stored in any number of forms of machine readable media. The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of assessing building structures with a computing system comprising:
    a. providing a first reference file containing first image data for an outside portion of a first target building structure;
    b. providing an electronic structure classifier programmed and trained to process said first image data and perform at least the following operations:
        i. detect a plurality of different individual building elements in said first target building structure;
        ii. rate a condition associated with each of said plurality of different individual building elements;
        iii. assign a first rating to such first target building structure, which rating identifies one of an occupancy prediction, a purchase prospect score, or an overall exterior physical condition of such building structure;
        wherein said electronic structure classifier generates a preliminary first electronic building structure record that includes an identification of said different individual building elements and an associated rating condition;
    c. providing an electronic template within an interface adapted to permit a human operator to process and modify said preliminary first electronic building structure record, including:
        i. a first portion of said interface which displays first image data for said first target building structure including said plurality of different individual building elements;
        ii. a second portion of said interface which displays a template of building data fields accompanying said first image data, which fields are configured as human operator selectable options for capturing data parameters for said plurality of different individual building elements for said first target building structure, including:
            1) an operator specified identification of a building element;
            2) an operator specified building element type associated with such building element;
            3) an operator specified rating for such building element;
        wherein said electronic structure classifier is further adapted to perform an operation of generating a final first electronic structure building record based on data captured from a human operator reviewing said first target building structure within said electronic interface;
    d. performing a verification to determine that a user is an owner of said first target building structure;
    e. generating a report for said first target building structure on demand and in real-time in response to an owner request based on the results of said verification step.

2. The method of claim 1 further including a step: compiling a set of reference images containing said individual building elements and said condition, wherein said reference images include tags for said individual building elements and said condition.

3. The method of claim 2 further including a step: training said electronic structure classifier using said set of reference images.

4. The method of claim 1 wherein said detected individual building elements, associated conditions and first rating are stored in a database of properties.

5. The method of claim 1 wherein a database of building elements and attributes is compiled and consulted during step (b).

6. The method of claim 2 including a step: processing said set of reference images to identify a set of visual features associated with said individual building elements and said condition.

7. The method of claim 6 further including a step: processing said first image data as a set of individual blocks, wherein each block in said set is analyzed to identify one or more visual features.

8. The method of claim 6 wherein a building envelope is identified and defined for said first building structure.

9. The method of claim 7 further including a step: identifying one or more individual building elements and/or conditions in a block based on identifying said visual features.

10. The method of claim 7 wherein said individual building elements and/or conditions in a block are identified based on comparing said first image data to a noise-processed version of said first image data.

11. The method of claim 8 wherein a preliminary score is provided indicating a confidence in a presence of said individual building elements and said conditions.

12. The method of claim 9 further including a step: generating a visual output containing annotation data for said first image data identifying selected identified individual building elements and associated conditions for said first building structure.

13. The method of claim 12 further including a step: receiving confirmation data provided by a human confirming one or more of said annotation data.

14. The method of claim 1 further including a step: detecting and classifying other objects in said first image data correlated with occupancy of such building structure, including one or more of a vehicle, an living organism, person, or other personal property item.

15. The method of claim 1 further including a step: detecting and classifying other objects in said first image data, including one or more of trash, debris or other item correlated with an occupancy of such building structure.

16. The method of claim 1 further including a step: detecting and classifying an architectural type of said first building structure.

17. The method of claim 1 further including a step: processing a query to generate a search report identifying other building structures similar to said target building structure, including structures matching said occupancy prediction, said purchase prospect score, said overall exterior physical condition of such building structure, and/or a presence of one or more of said individual structure elements.

18. The method of claim 17 wherein said query is received from a mobile device, along with a first image captured by said device of said first building structure.

19. The method of claim 18 further including a step: processing said query to identify said first building structure, based on comparing said first image to other images for said first building structure stored in said first reference file.

20. The method of claim 1 further including a step of providing an automated scheduler which processes an address file to compute electronic building structure records for a set of houses within a predetermined area.

21. The method of claim 1 further including a step of providing an automated clustering routine which processes electronic building structure records for properties within a user selectable area and determines structure clusters comprised of properties having common elements, common element types and/or common element ratings.

22. The method of claim 1 wherein said electronic template is presented on a mobile device to permit crowd sourced input for said first target building structure by persons determined to be located at a site of said structure.

23. A method of assessing building structures with a computing system comprising:
  a. providing a first reference file containing first image data for an outside portion of a first target building structure;
  b. providing an electronic structure classifier programmed and trained to process said first image data and perform at least the following operations:
    i. detect a plurality of different individual building elements in said first target building structure;
    ii. rate a condition associated with each of said plurality of different individual building elements;
    iii. assign a first rating to such first target building structure, which rating identifies one of an occupancy prediction, a purchase prospect score, or an overall exterior physical condition of such building structure;

wherein said electronic structure classifier generates a preliminary first electronic building structure record that includes an identification of said different individual building elements and an associated rating condition;

c. providing an electronic template within an interface adapted to permit a human operator to process and modify said preliminary first electronic building structure record, including:
    i. a first portion of said interface which displays first image data for said first target building structure including said plurality of different individual building elements;
    ii. a second portion of said interface which displays a template of building data fields accompanying said first image data, which fields are configured as human operator selectable options for capturing data parameters for said plurality of different individual building elements for said first target building structure, including:
      1) an operator specified identification of a building element;
      2) an operator specified building element type associated with such building element;
      3) an operator specified rating for such building element;

wherein said electronic structure classifier is further adapted to perform an operation of generating a final first electronic structure building record based on data captured from a human operator reviewing said first target building structure within said electronic interface;

d. performing a verification to determine that a user is an owner of said first target building structure;
    wherein said verification is performed by monitoring a location of a smartphone associated with said user;
  e. generating a report for said first target building structure on demand and in real-time in response to an owner request based on the results of said verification step.

* * * * *